US012740658B2

(12) United States Patent
Yount

(10) Patent No.: US 12,740,658 B2
(45) Date of Patent: Sep. 22, 2026

(54) SYSTEM OF FOLDING DISPLAYS USING AN AUTOMATIC DISPLAY ASSEMBLY MACHINE AND METHOD OF USING THE SAME

(71) Applicant: Diamond Display Group, Inc., Royse City, TX (US)

(72) Inventor: Jacob Yount, Fort Worth, TX (US)

( * ) Notice: Subject to any disclaimer, the term of this patent is extended or adjusted under 35 U.S.C. 154(b) by 76 days.

(21) Appl. No.: 19/015,368

(22) Filed: Jan. 9, 2025

(65) Prior Publication Data

US 2026/0191343 A1 Jul. 9, 2026

(51) Int. Cl.

*B23P 19/04* (2006.01)
*A47F 5/10* (2006.01)
*B31B 50/78* (2017.01)
*A47F 5/11* (2006.01)
*B31B 50/73* (2017.01)

(52) U.S. Cl.

CPC ................ *A47F 5/10* (2013.01); *B23P 19/04* (2013.01); *B31B 50/78* (2017.08); *A47F 5/11* (2013.01); *A47F 5/116* (2013.01); *B31B 50/73* (2017.08)

(58) Field of Classification Search

CPC ...... A47F 5/10; A47F 5/11–112; A47F 5/116; B23P 11/00; B23P 19/00; B23P 19/04; B23P 21/002; B31B 50/26; B31B 50/73–734; B31B 50/78

See application file for complete search history.

(56) References Cited

U.S. PATENT DOCUMENTS 11,840,042 B1 * 12/2023 Liang .................. B31B 50/0042
2013/0203575 A1 * 8/2013 Ross ....................... B31B 50/52 493/162
2022/0143945 A1 * 5/2022 Maeyaert ................ B31B 50/07

FOREIGN PATENT DOCUMENTS

KR 102396368 B1 * 5/2022 ................ A47F 5/11

* cited by examiner

*Primary Examiner* — Matthew P Travers
(74) *Attorney, Agent, or Firm* — Amber Marie Crum Whigham

(57) ABSTRACT

A system for assembling flattened displays using an autofeeder and an Automatic Display Assembly Machine ("ADAM") with a pneumatic distribution assembly. The ADAM includes a frame surrounding a conveyor bed assembly with conveyor rollers for receiving the displays from the autofeeder, an injector assembly for squaring the displays, an erector assembly for erecting the displays, a main actuator assembly and head actuator assembly including a number of head beam assemblies with suction cups, and left and right side striker assemblies with flippers, components of which are actuated to create display front shelves with corresponding shelf support rails and which are locked into respective back shelf portions using a back striker assembly. The system further includes an ejector assembly for discharging assembled displays. The pneumatic distribution assembly controls air flow to pneumatic components of the injector assembly, erector assembly, main actuator assembly, head actuator assembly, and back striker assembly.

16 Claims, 54 Drawing Sheets

3500

SYSTEM OF FOLDING DISPLAYS USING AN AUTOMATIC DISPLAY ASSEMBLY MACHINE AND METHOD OF USING THE SAME

FIELD OF THE INVENTION

The present invention relates generally to PPW displays and the use of a system including an automatic display assembly machine ("ADAM") for folding PPW displays.

BACKGROUND

Machines for the folding and assembling of PPW displays traditionally require multiple operators to perform activities and/or intervene throughout the display assembling process, extending the timeline for completion and increasing cost. Accordingly, there exists a need for a system, and a method of using such a system, that is efficient, largely automated, and easily adaptable.

SUMMARY

An embodiment of this disclosure provides a method for folding displays using an Automatic Display Assembly Machine ("ADAM"), the method comprising inserting, using an autofeeder, a Pre-Packaged Weekender ("PPW") display into the ADAM for assembly; receiving, using an in-feed conveyor of the ADAM, the PPW display from the auto feeder and transporting it with conveyor rollers to a folding staged position; and squaring, using an injector assembly, the PPW display for erecting. The method further includes the operations of erecting, using an erector assembly comprising a side action beam and a bottom suction assembly, the PPW display to form a rectangular, erected PPW display, wherein the side action beam is a lateral beam comprising a number of suction cup rail assemblies disposed along a length thereof, and wherein the side action beam actuates 90 degrees and uses the number of suction cup rail assemblies to grab and erect the PPW display. The method further includes lowering a main actuator assembly and a head actuator assembly of the ADAM toward the erected PPW display; and capturing, using a number of suction cups of a number of head beam assemblies disposed on a downward facing surface of a center head beam of the head actuator assembly, a first face of the erected PPW display, wherein the first face of the erected PPW display comprises a number of front shelves corresponding to a number of back shelves disposed on a second face of the erected PPW display, and wherein an each front shelf of the number of front shelves corresponds to one of the number of head beam assemblies. The method further includes the operations of lifting, using the head beam assemblies, the number of front shelves of the erected PPW display, while collapsing, using side strikers of side action assemblies, left and right side-gussets of the number of front shelves, wherein the side action assemblies comprise flippers, flipper rotary pistons, and flipper stroke pistons; releasing, by removing suction from the number of suction cups of the number of head beam assemblies, the first face of the erected PPW display; holding, by lowering the head actuator assembly, the number of front shelves into place; forming and folding, using the flippers of the side action assemblies, shelf support rails corresponding to the number of front shelves; pressing, using tab strikers of the head beam assemblies, the number of front shelves into receiving pockets of the corresponding shelf support rails, to form latched front shelves; pushing, using back strikers of a number of back striker assemblies, the number of back shelves towards the number of front shelves; and lowering, using the head actuator assembly, the number of head beam assemblies toward the back striker assemblies. Finally, the method includes retracting the back striker assemblies while using the head beam assemblies to capture the back shelves and prevent them from lowering; locking the back shelves into the front shelves by actuating the tab strikers to press a thumb tab connected to an each back shelf into a receiving hold of the corresponding front shelf while using the flippers to hold the front shelves in place; holding, using the bottom suction assembly, the PPW display while retracting the tab strikers and the center head beam of the head actuator assembly along with the flippers of the erector assembly, creating an assembled PPW display; and discharging the assembled PPW display.

Another embodiment of this disclosure provides a system for folding displays, the system comprising an autofeeder, and an Automatic Display Assembly Machine ("ADAM"). The ADAM comprises a rectangular frame configured to surround and support a conveyor bed assembly, wherein the conveyor bed assembly includes an in-feed conveyor and conveyor rollers configured to receive a flattened, Pre-Packaged Weekender ("PPW") display from the autofeeder and transport the PPW display into a folding staged position on the conveyor rollers; an injector assembly configured to square the flattened PPW display for erecting by shifting the PPW display against a squaring bar positioned along a first side of the conveyor assembly; and an erector assembly comprising a side action beam and a bottom suction assembly, wherein the side action beam is a lateral beam comprising a number of suction cup rail assemblies attached along a length of the lateral beam, wherein the side action beam is configured to actuate 90 degrees and use the number of suction cup rail assemblies to grab and erect the PPW display, and wherein the erector assembly is configured to transform the PPW display into a rectangular, erected PPW display. The system further includes a main actuator assembly positioned above a head actuator assembly on the rectangular frame and configured to move vertically toward and away from the conveyor bed assembly; wherein the head actuator assembly comprises a number of head beam assemblies with suction cups disposed on a downward facing surface of a center head beam and a number of tab strikers disposed adjacent to the suction cups; wherein the suction cups are configured to capture a first face of the erected PPW display comprising a number of front shelves, and lift and lower the front face away from the conveyor rollers; wherein an each front shelf of the number of front shelves corresponds to one of the number of head beam assemblies. The system further includes left and right side striker assemblies, wherein an each of the left and the right side striker assemblies comprises side strikers mounted to an underside of a first horizontal beam of the rectangular frame and a number of side action sub-assemblies mounted to respective vertical beams attached to a second horizontal beam of the rectangular frame, wherein each of the number of side action sub-assemblies comprises a flipper stroke piston mounted above a flipper rotary piston, and a flipper disposed below the flipper rotary piston, wherein the side strikers are configured to actuate to collapse left and right side-gussets of the number of front shelves while the first face is lifted by the head actuator assembly and then the number of front shelves are configured to be held in place when the first face is lowered by the head actuator assembly, and wherein the number of side action sub-assemblies are utilized to create shelf support rails corresponding to the number of front shelves and the number of tab strikers are configured to actuate and press the number of front shelves into receiving pockets of the corresponding shelf support rails to form latched front shelves. The system further comprises a back striker assembly comprising back strikers positioned under the conveyor rollers, wherein the back strikers correspond to a number of back shelves disposed on a second face of the PPW display opposite the number of front shelves and the back strikers are configured to push the back shelves toward the front shelves; wherein the number of head beam assemblies are configured to lower toward the back striker assembly and capture the back shelves to prevent them from lowering when the back strikers are retracted; wherein the tab strikers are actuated to lock the back shelves into the front shelves by pressing a thumb tab connected to an each of the back shelves into a receiving hold of the corresponding front shelf while using the flippers to hold the front shelves in place, forming an assembled PPW display; and wherein the bottom suction assembly is configured to hold the assembled PPW display while the tab strikers, the center head beam, and the flippers are retracted. The system further includes an ejector assembly configured to discharge the assembled PPW display from the system; an electrical cabinet assembly comprising processors and memory for programming operations of the ADAM, power supplies, interface modules, and operator buttons; and a pneumatic distribution assembly configured to control air flow to pneumatic components of the injector assembly, the erector assembly, the main actuator assembly, the head actuator assembly, and the back striker assembly.

BRIEF DESCRIPTION OF THE DRAWINGS

Figure 1:
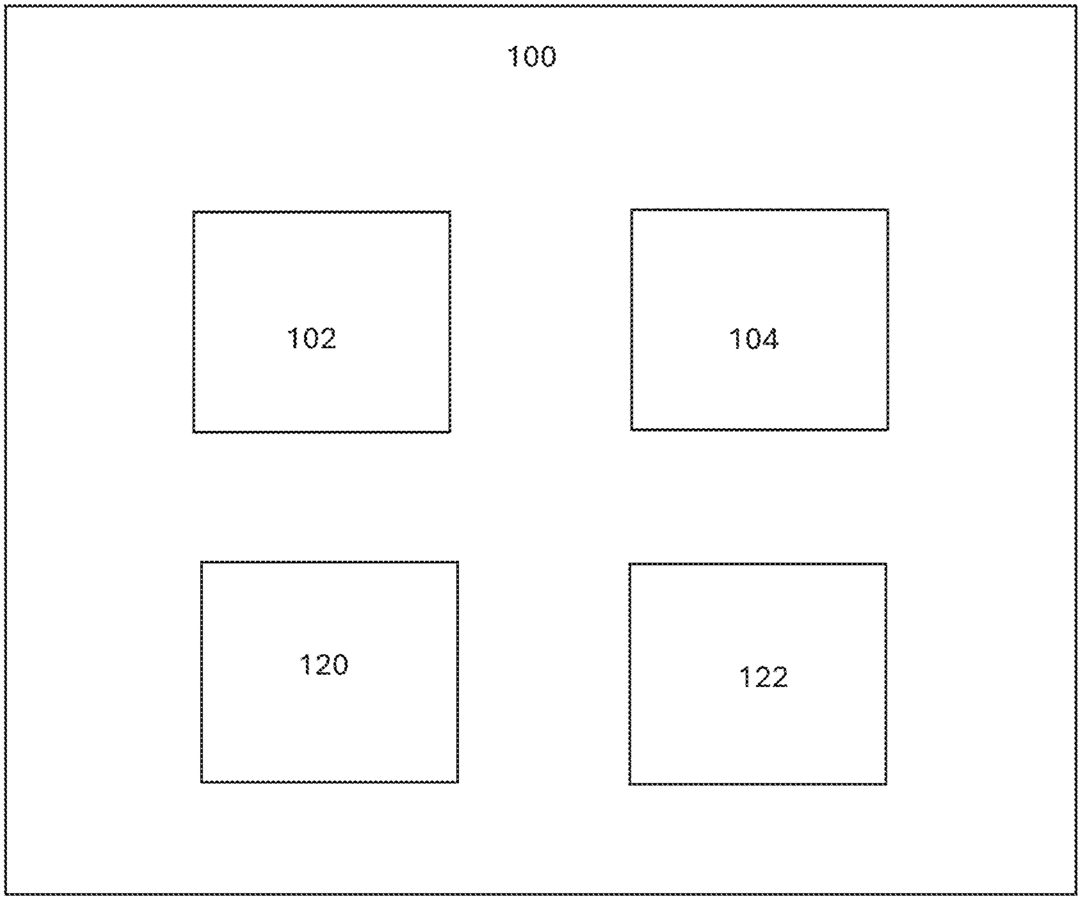
Figure 2:
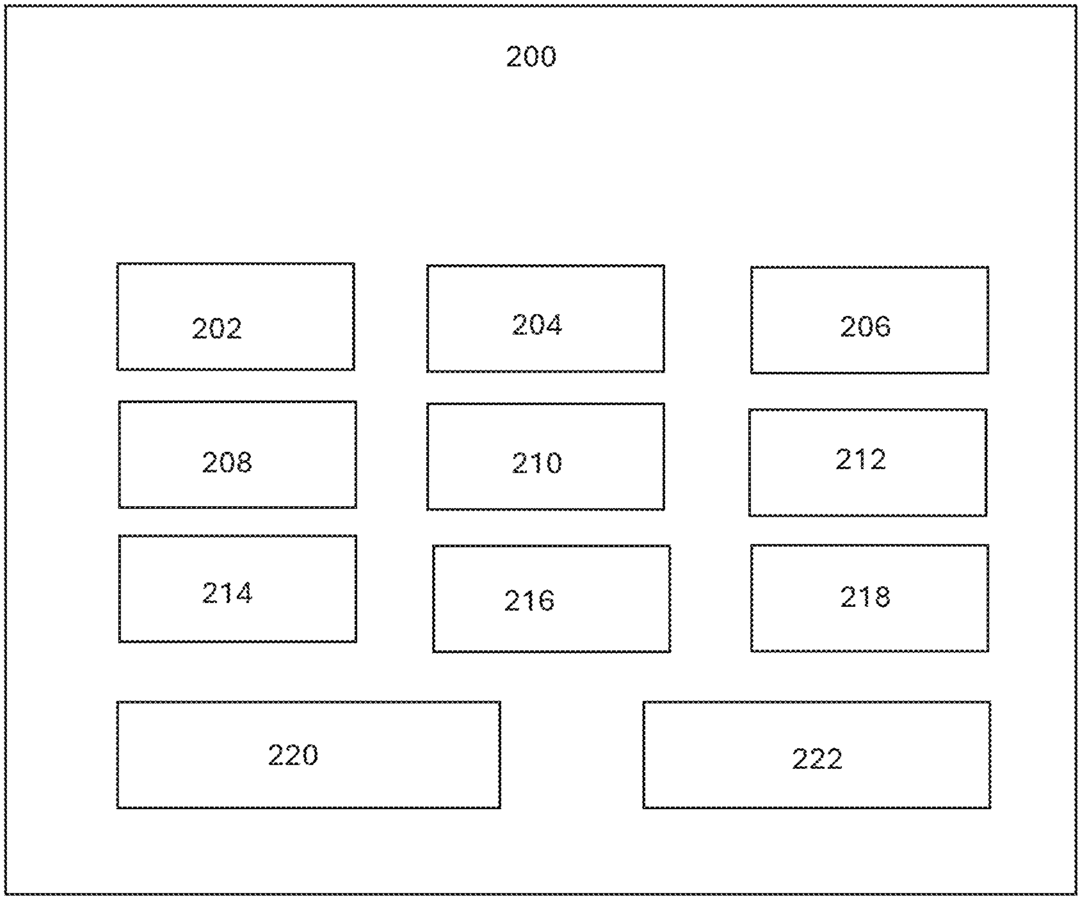
Figure 3:
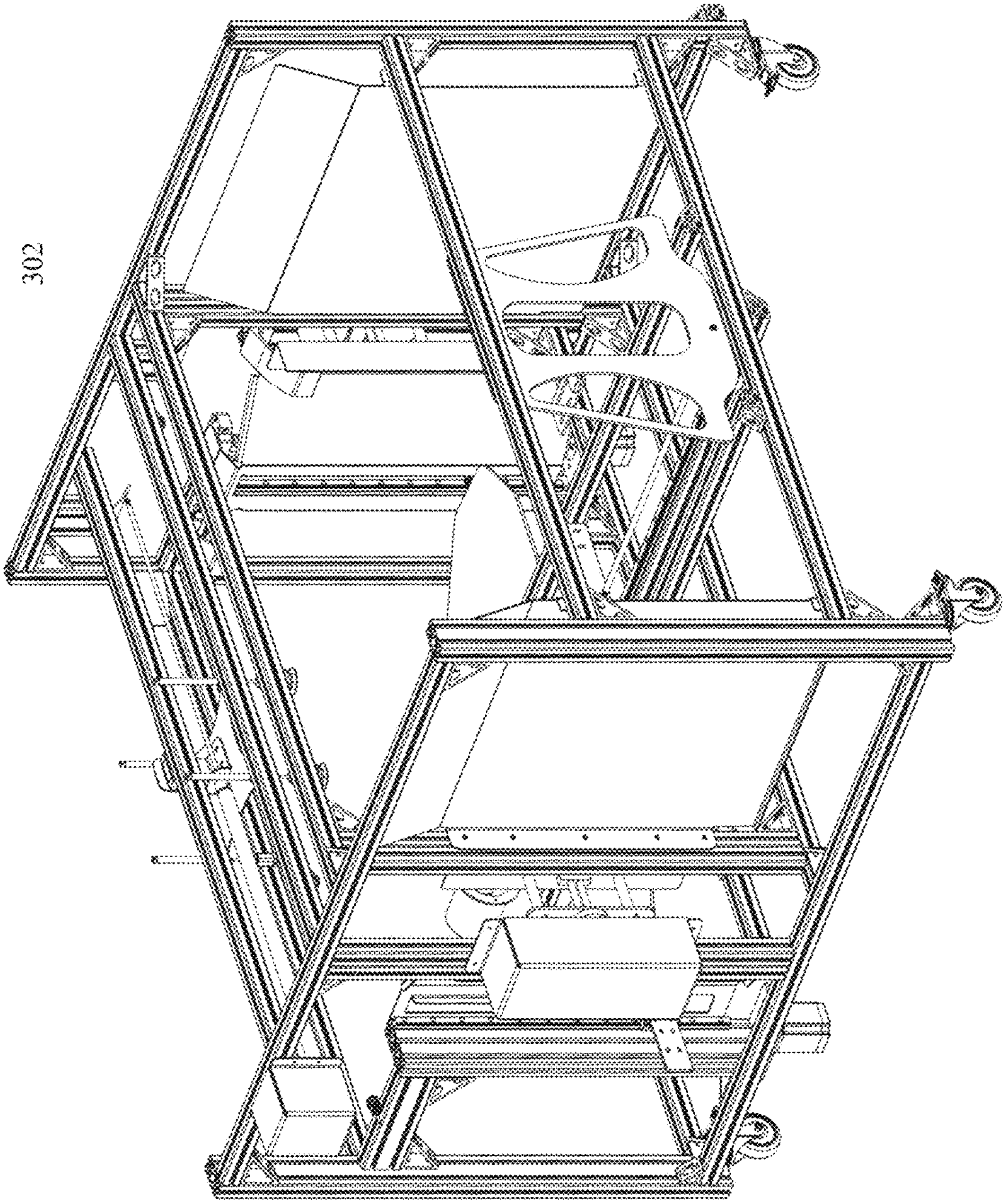
Figure 4:
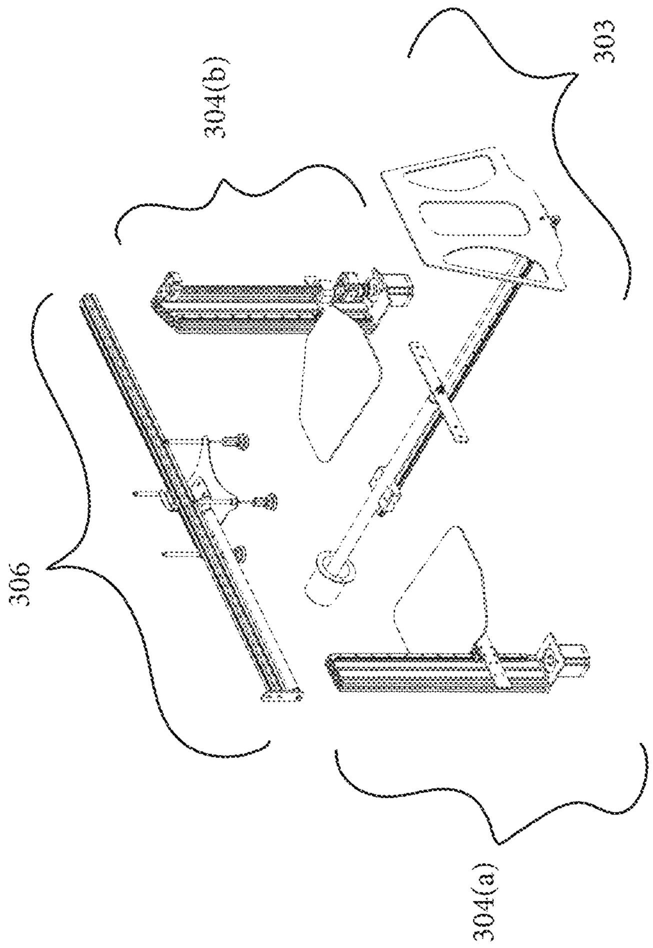
Figure 5:
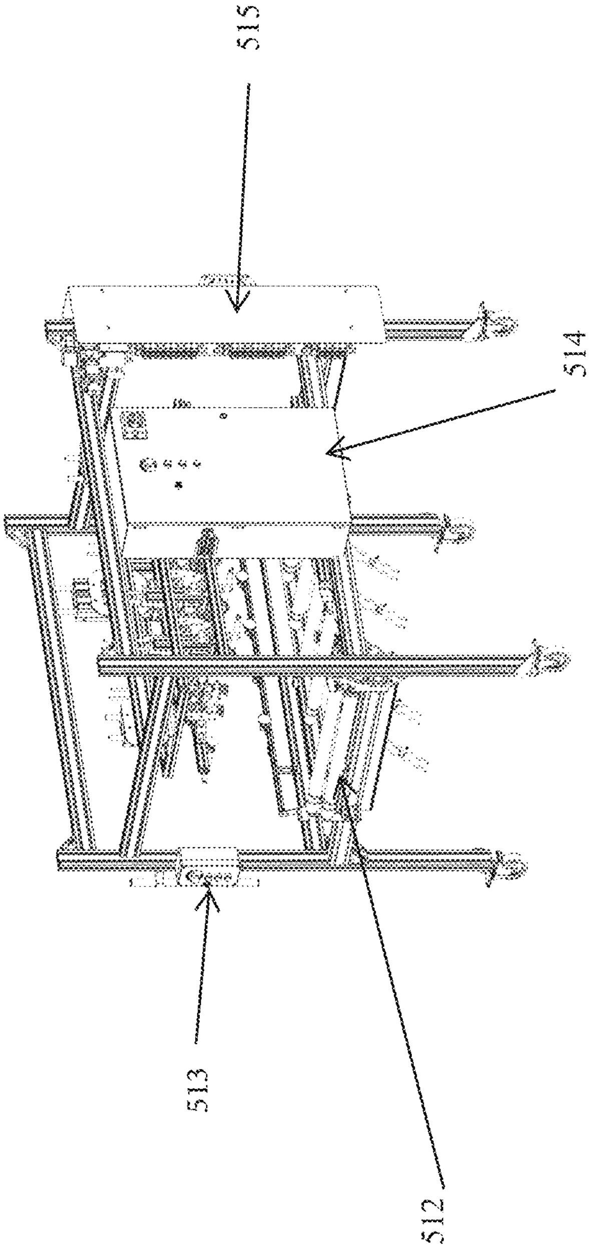
Figure 6:
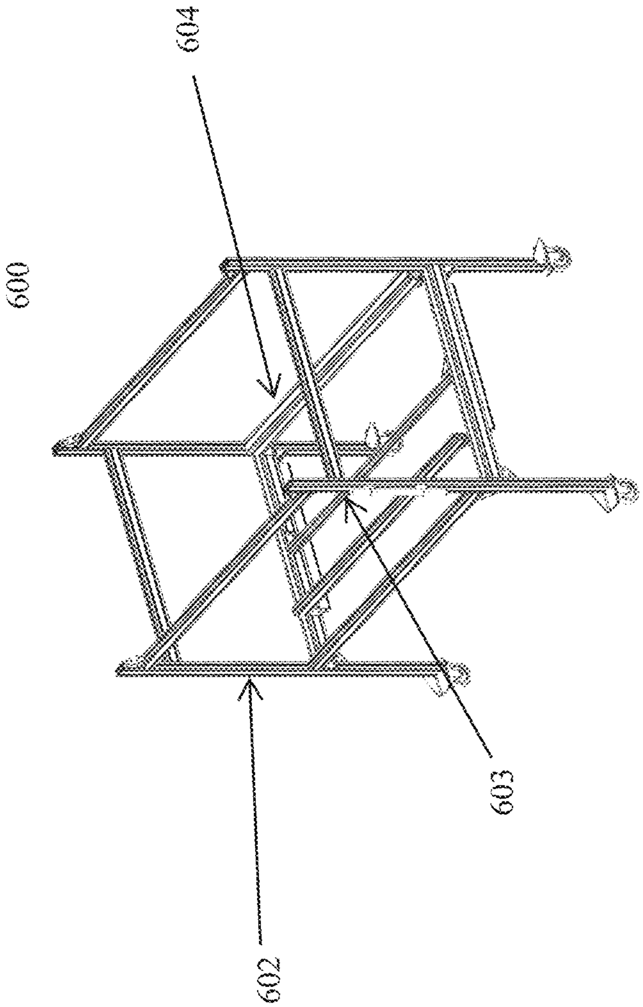
Figure 7:
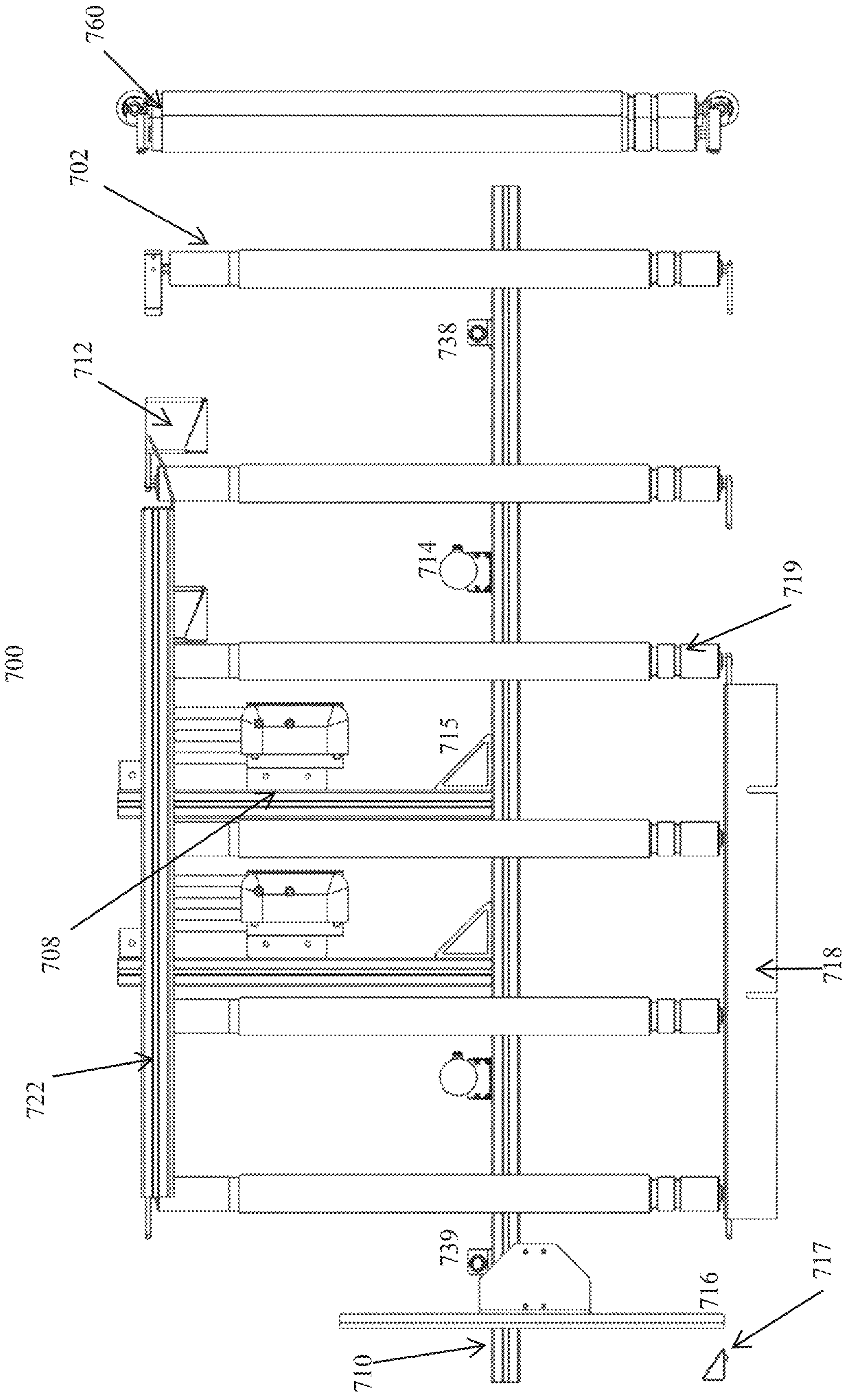
Figure 8:
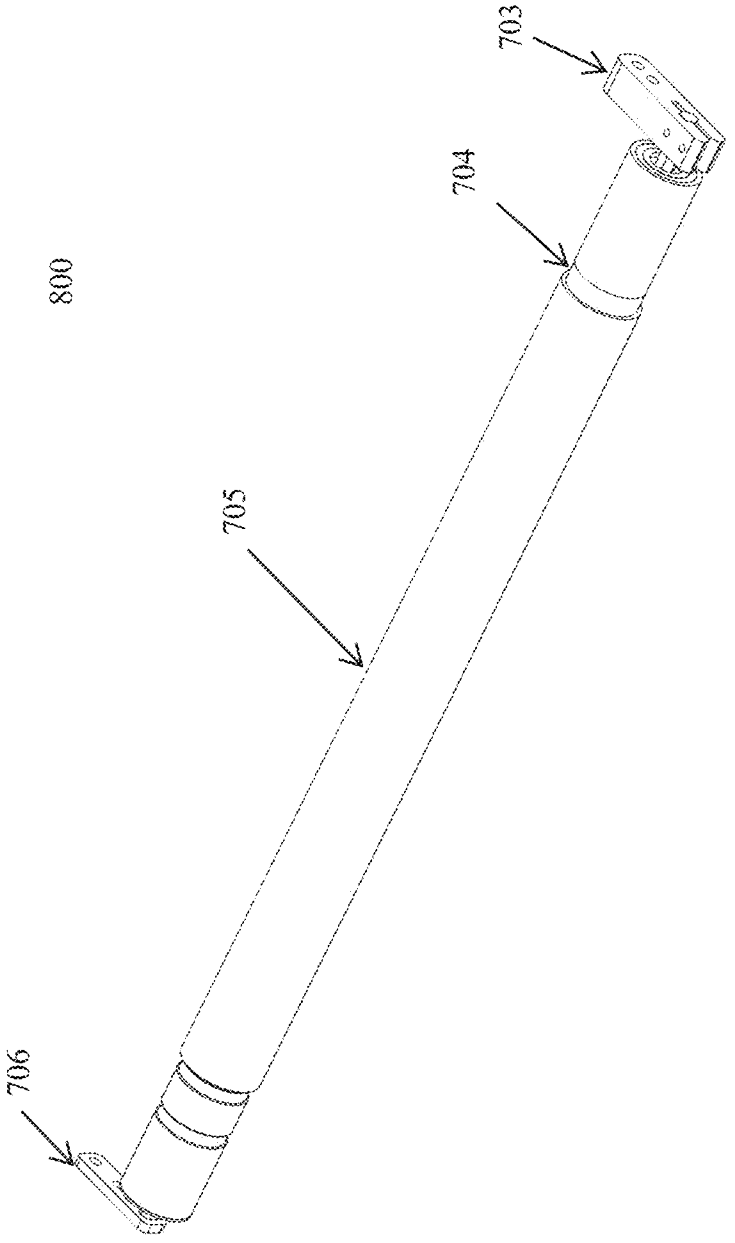
Figure 9:
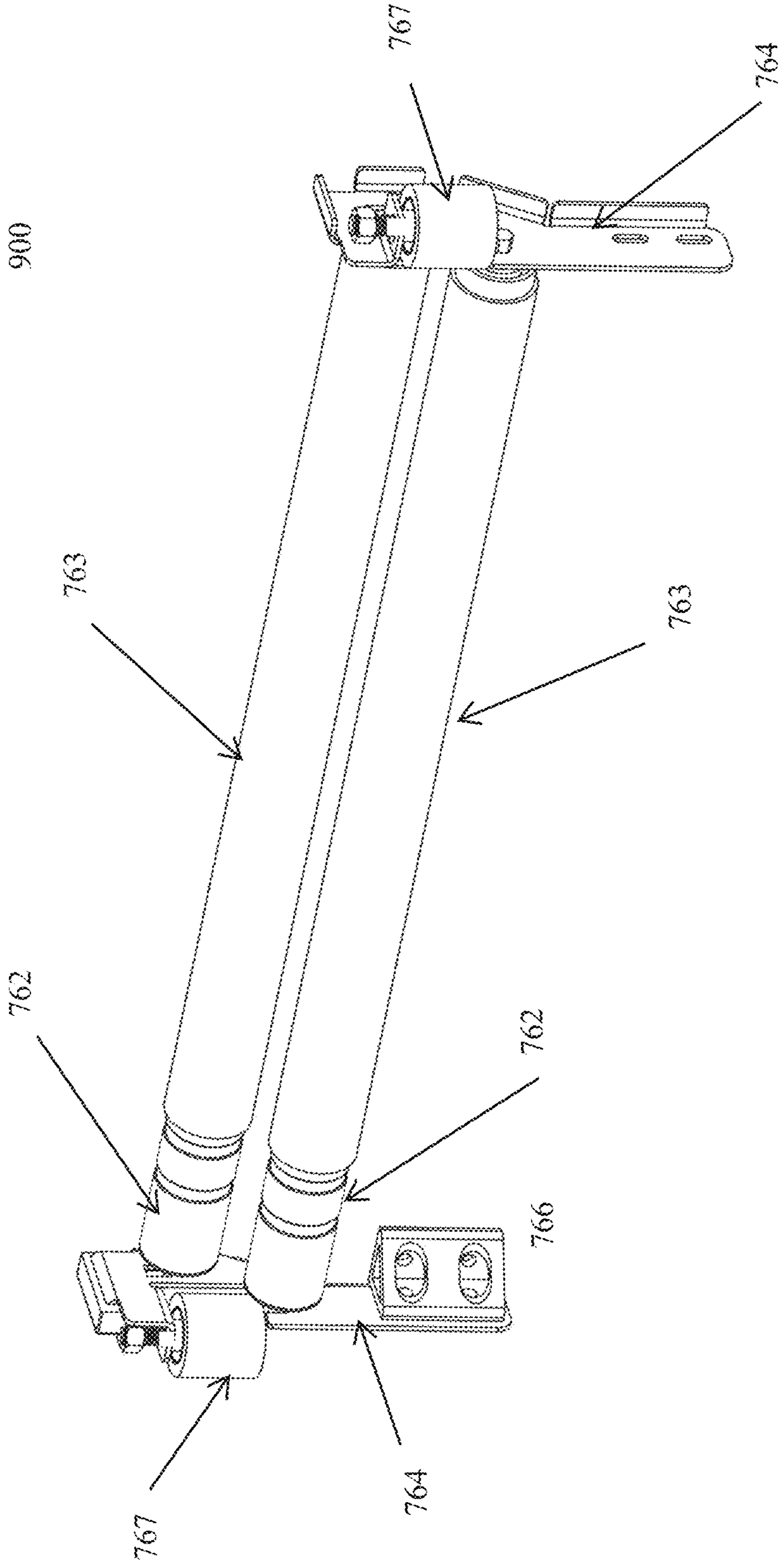
Figure 10:
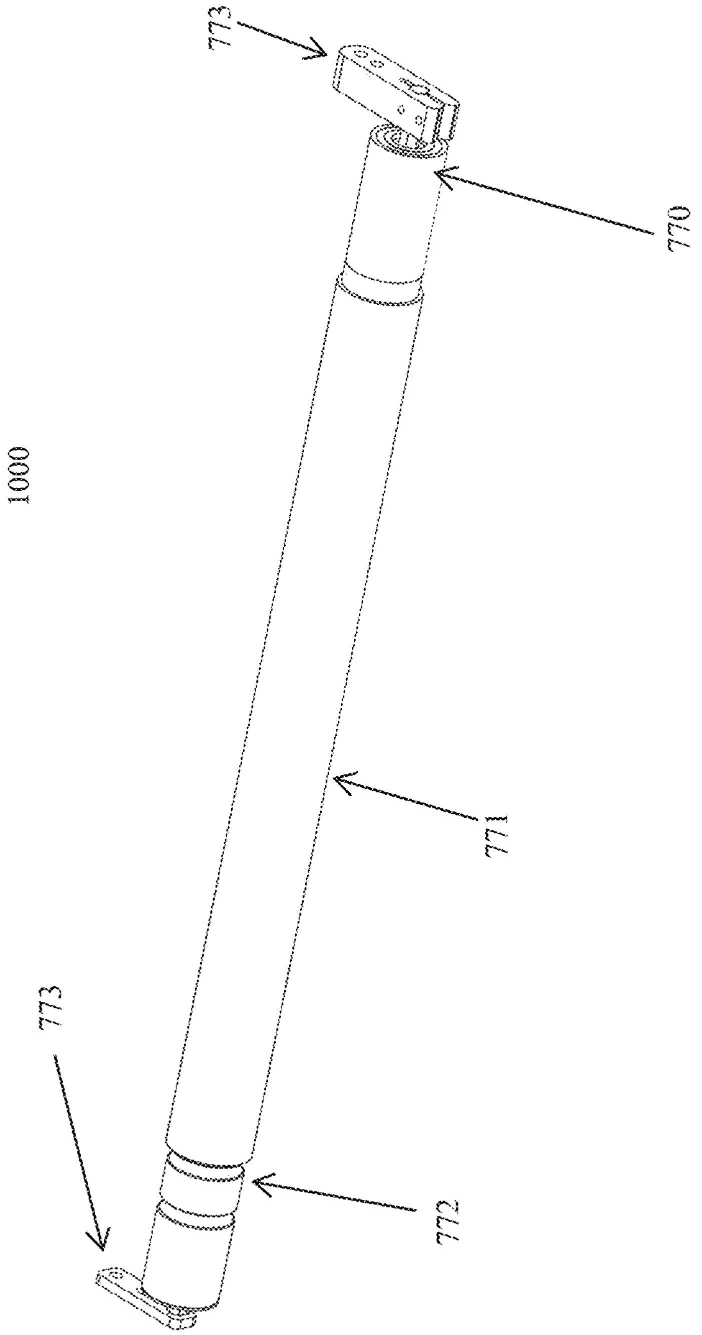
Figure 11:
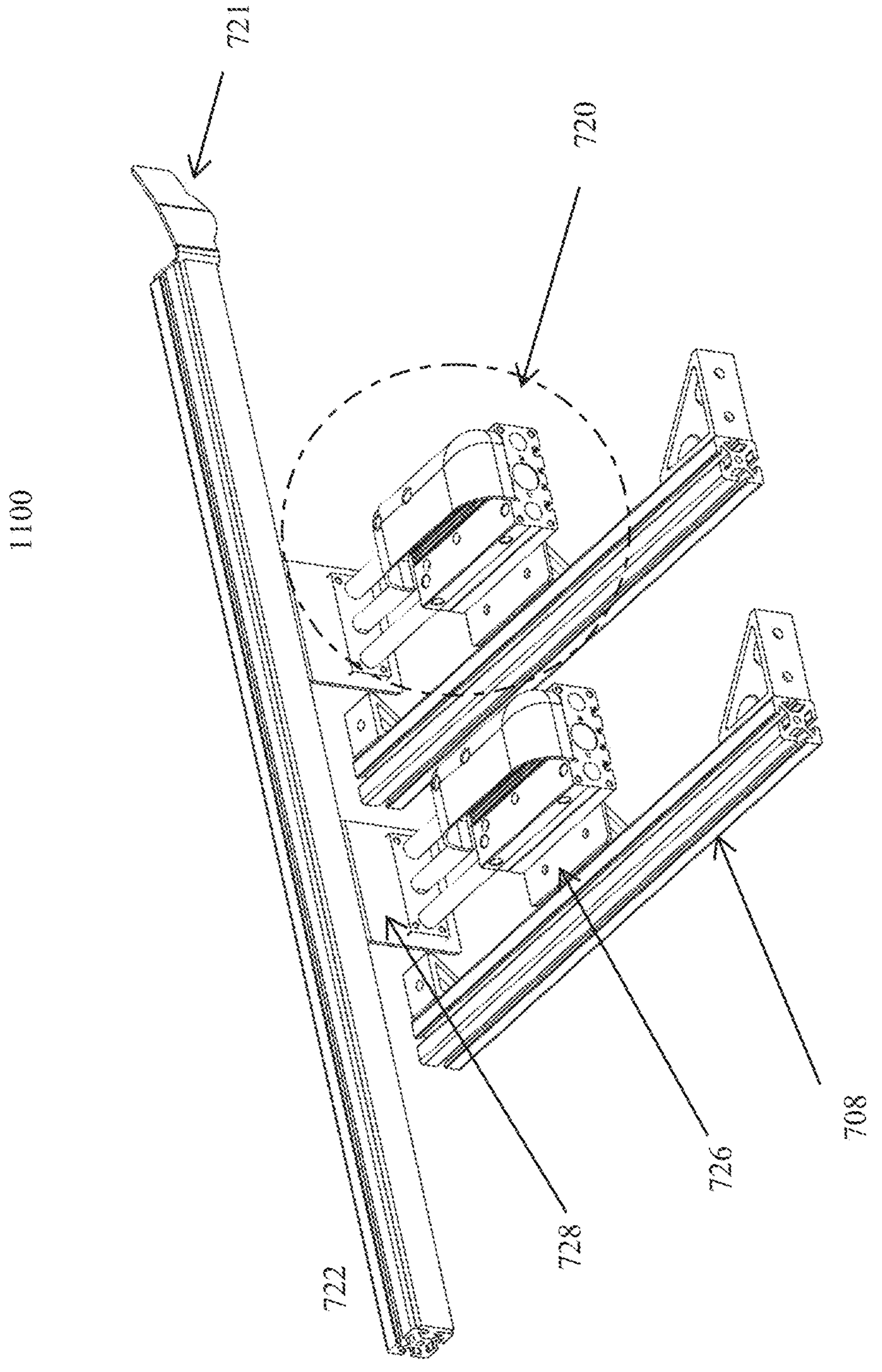
Figure 12:
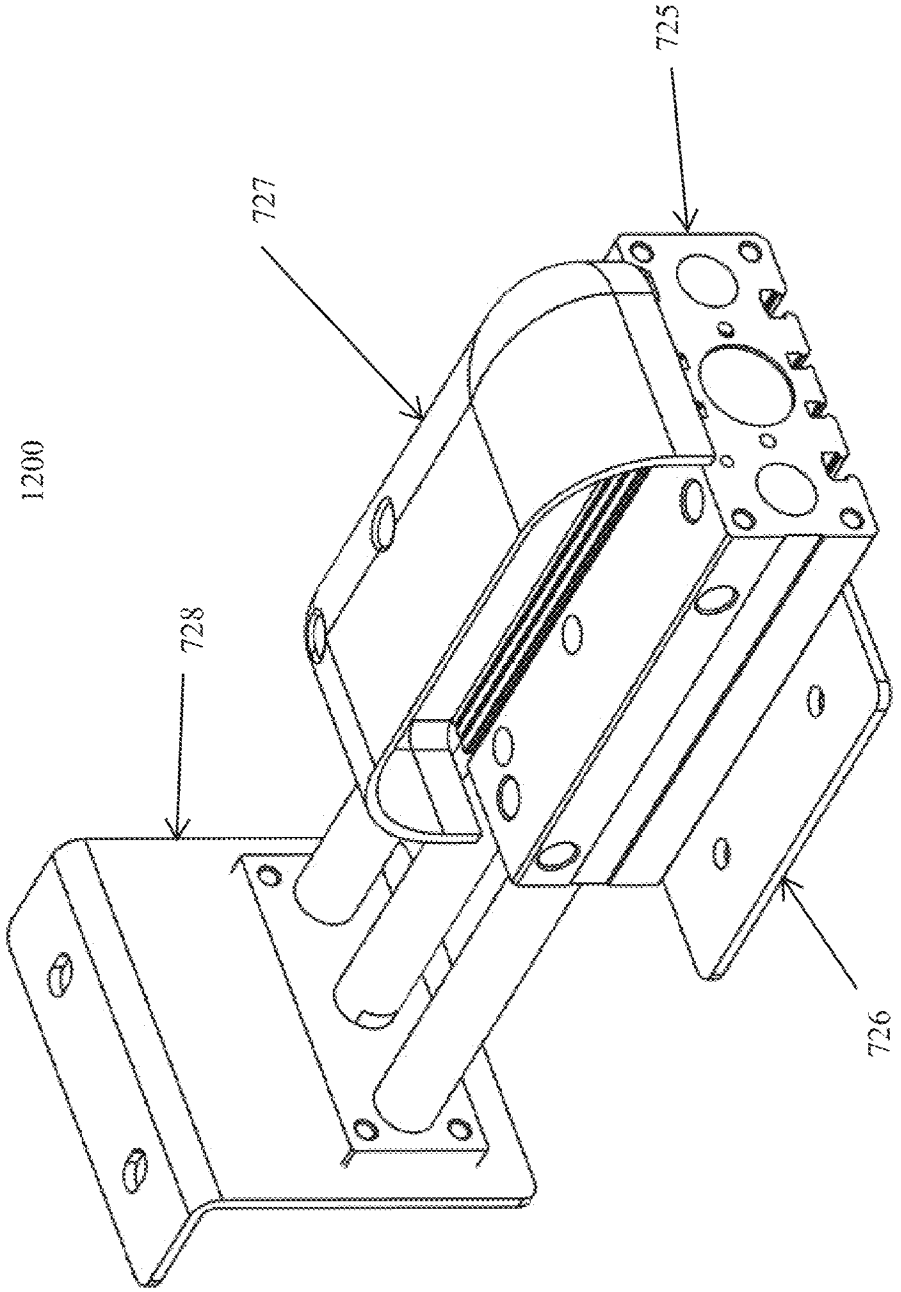
Figure 13:
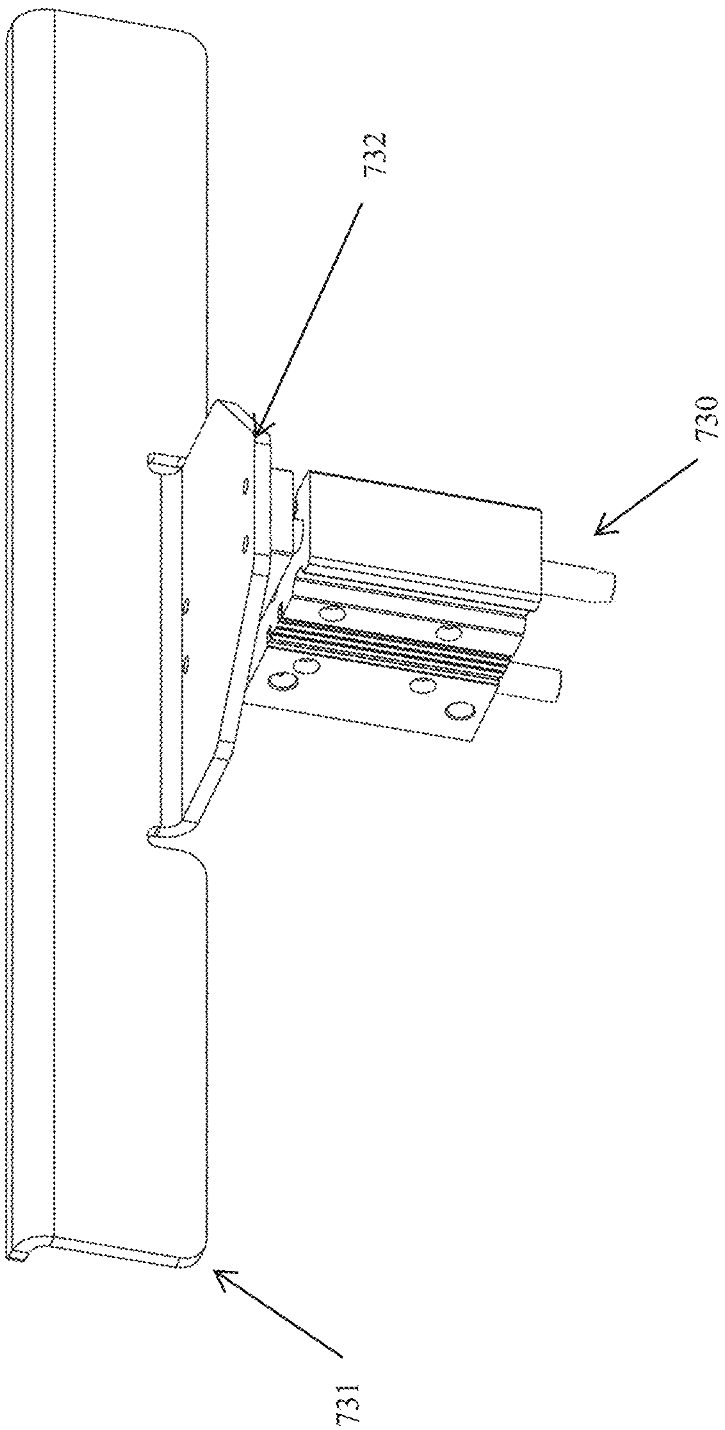
Figure 14:
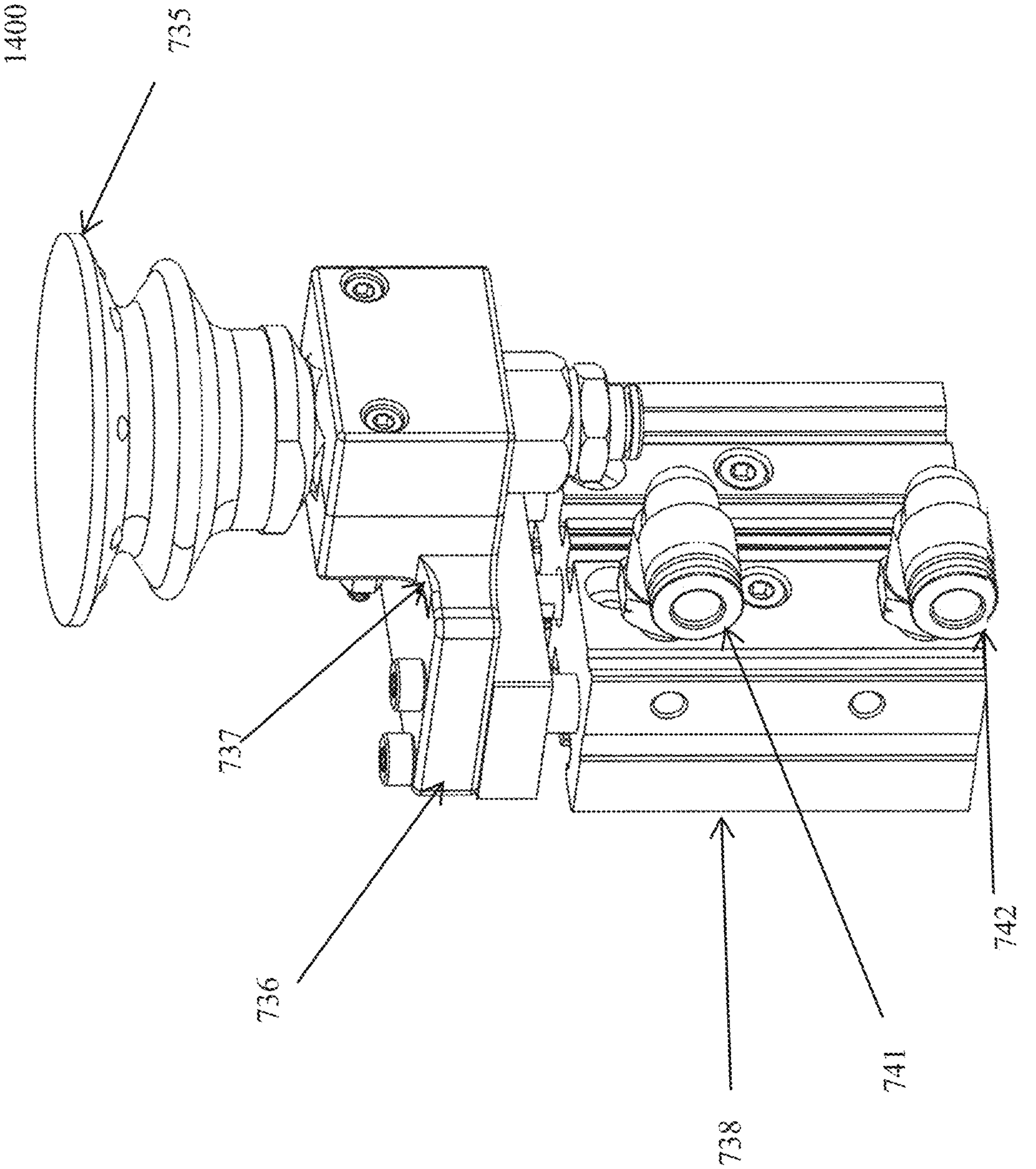
Figure 15:
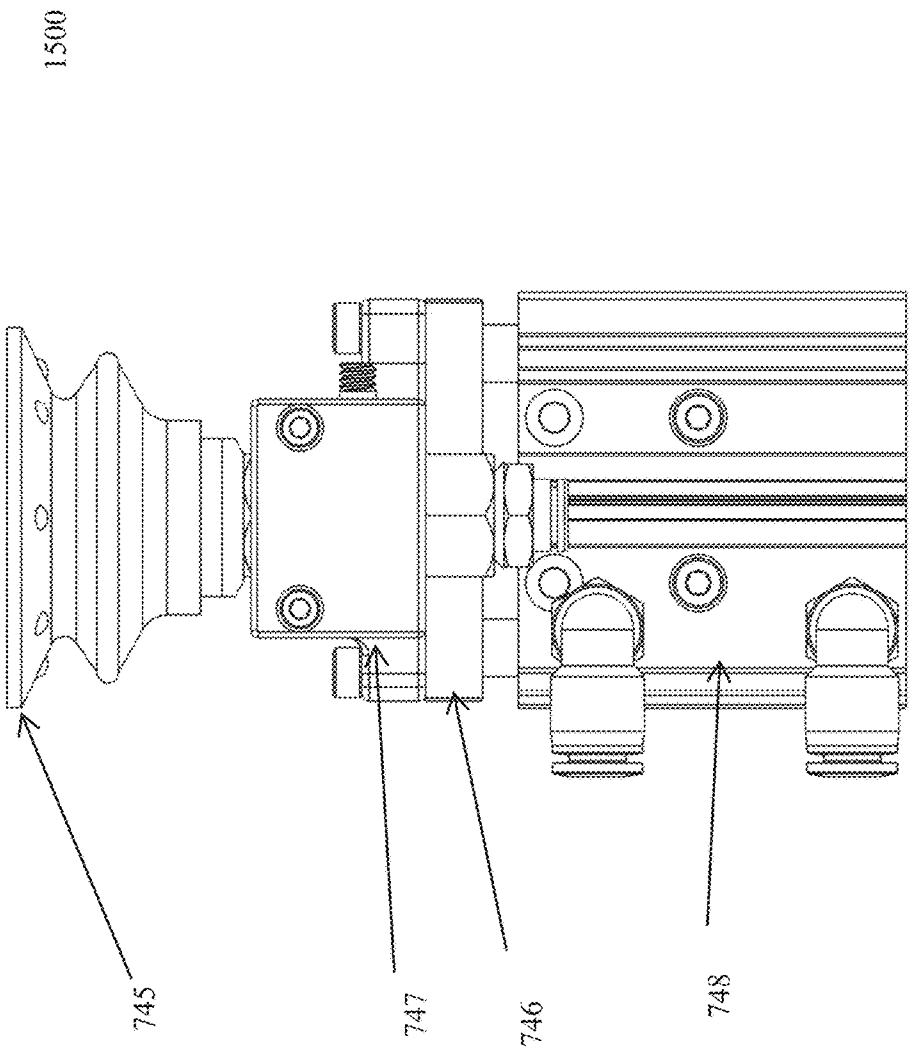
Figure 16:
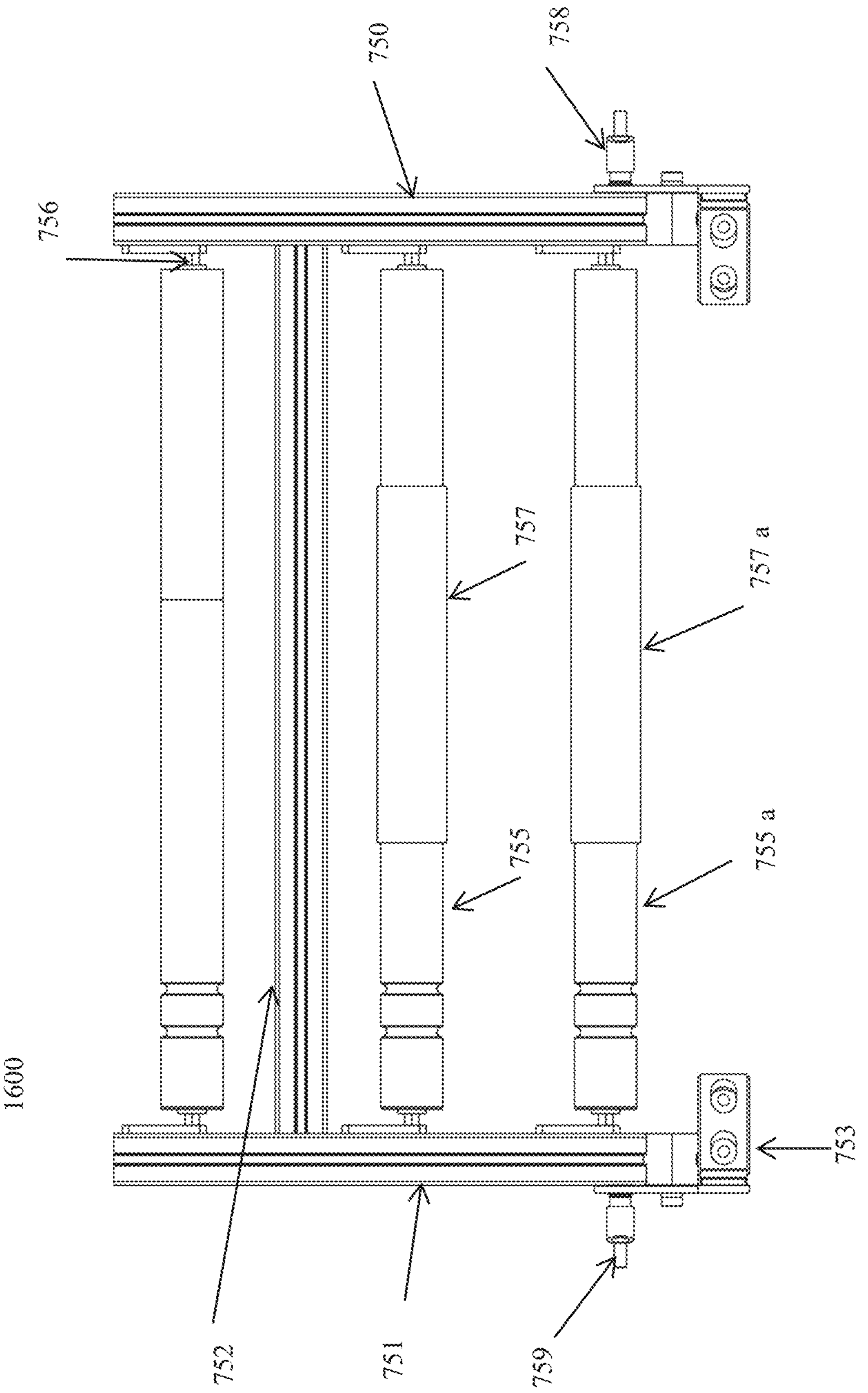
Figure 17:
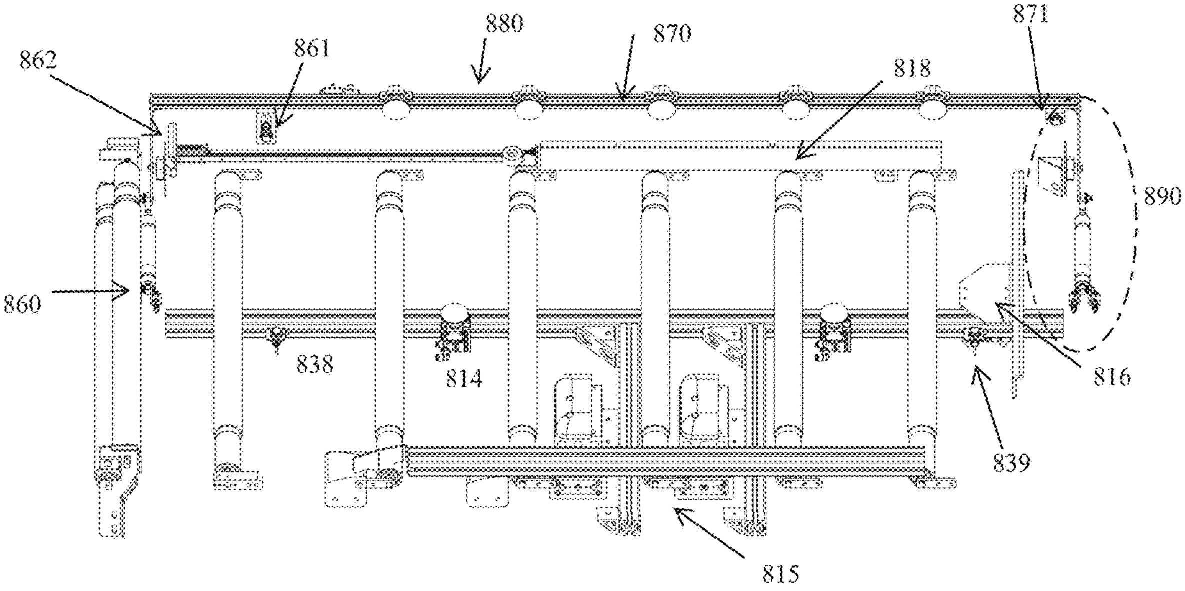
Figure 18:
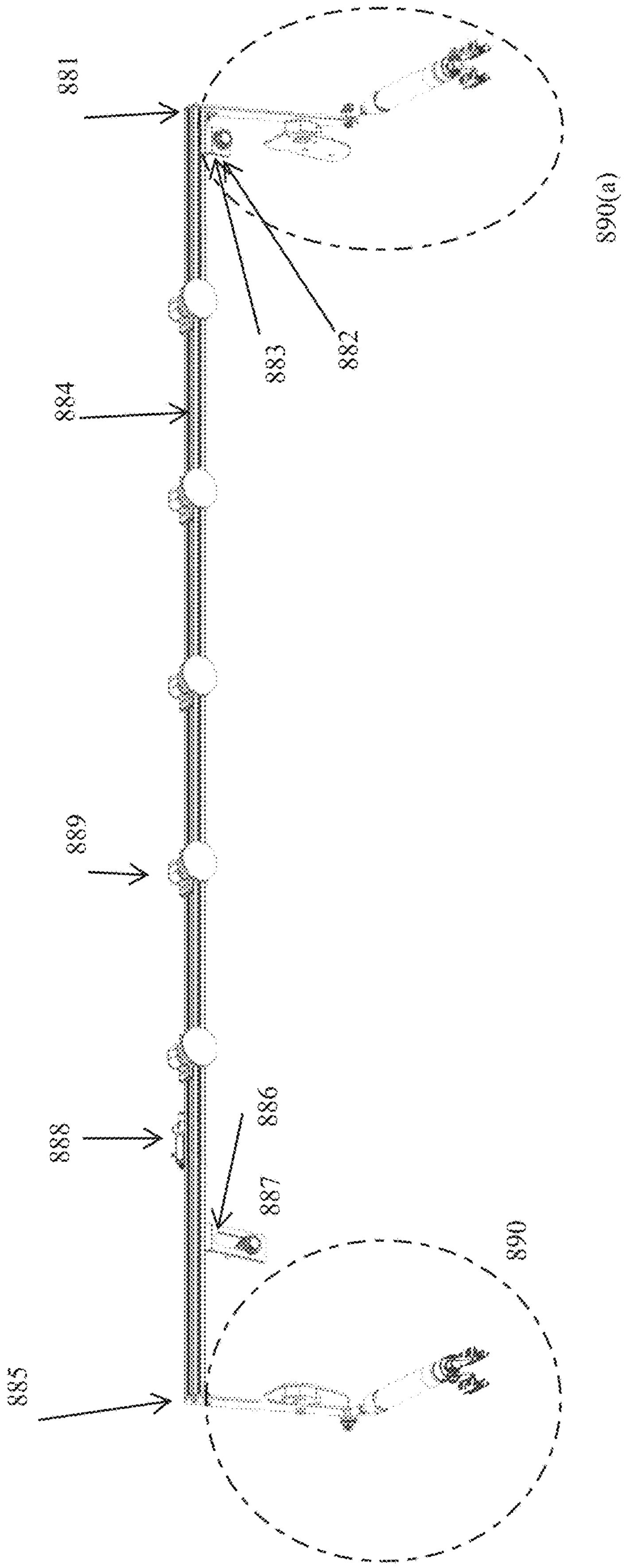
Figure 19:
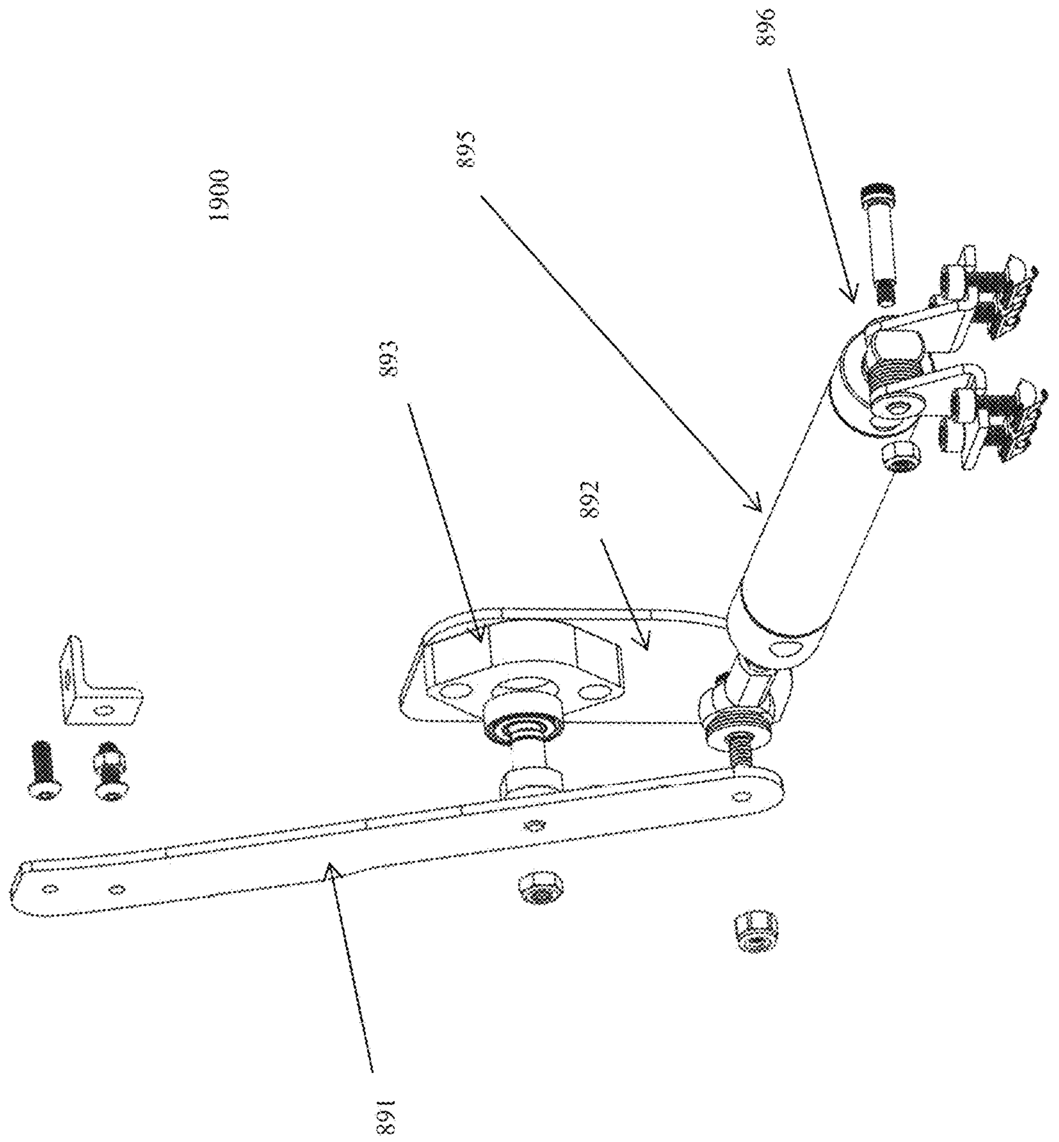
Figure 20:
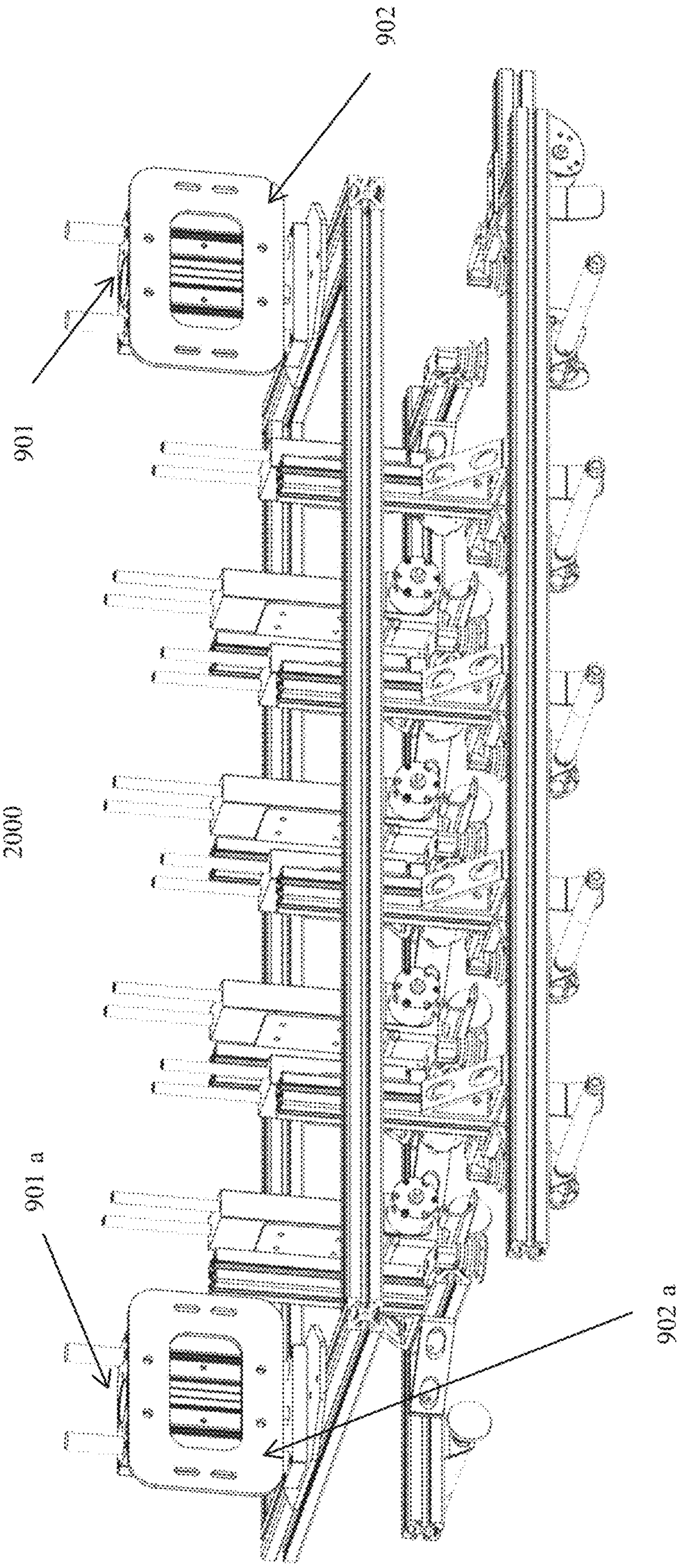
Figure 21:
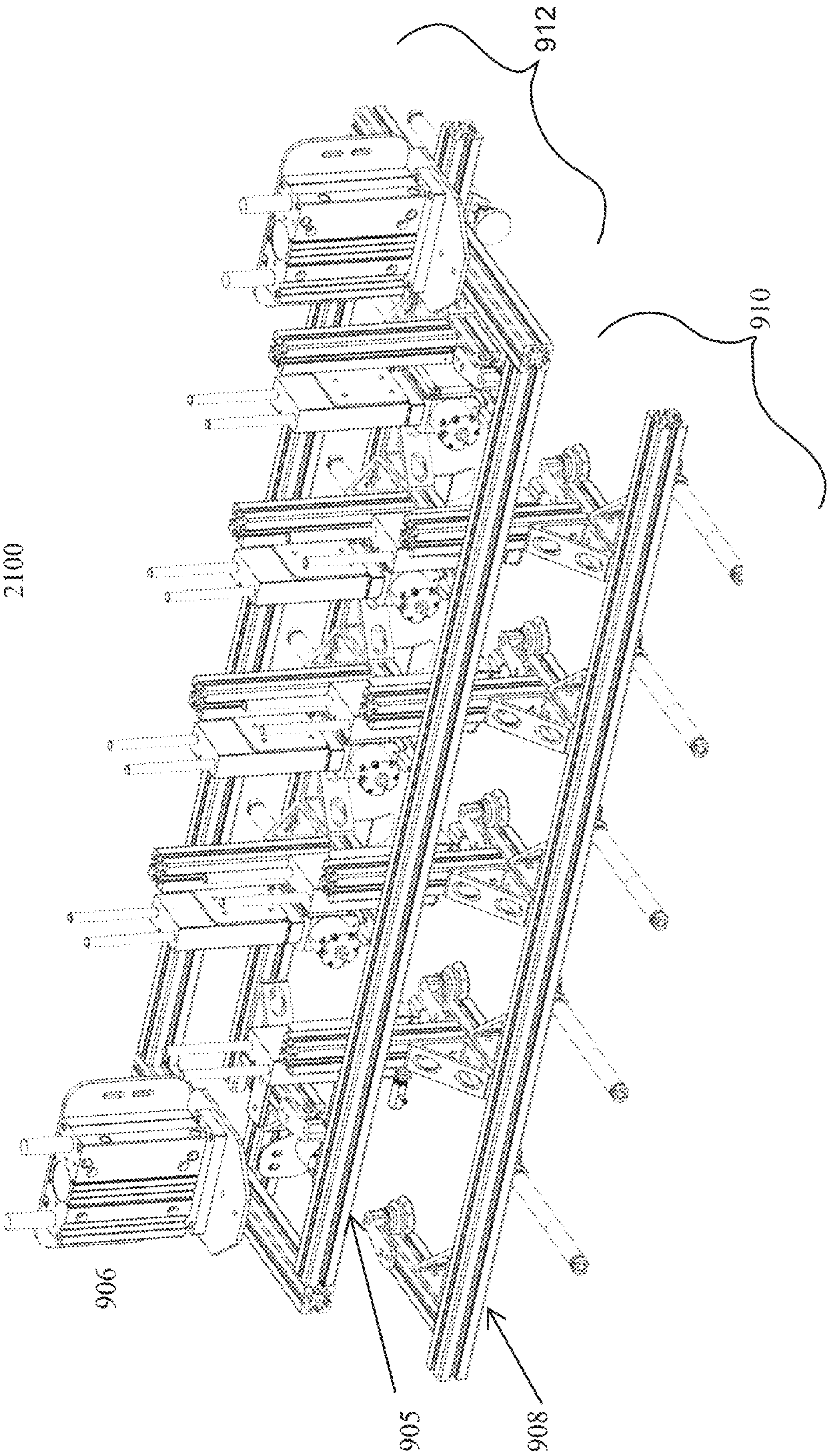
Figure 22:
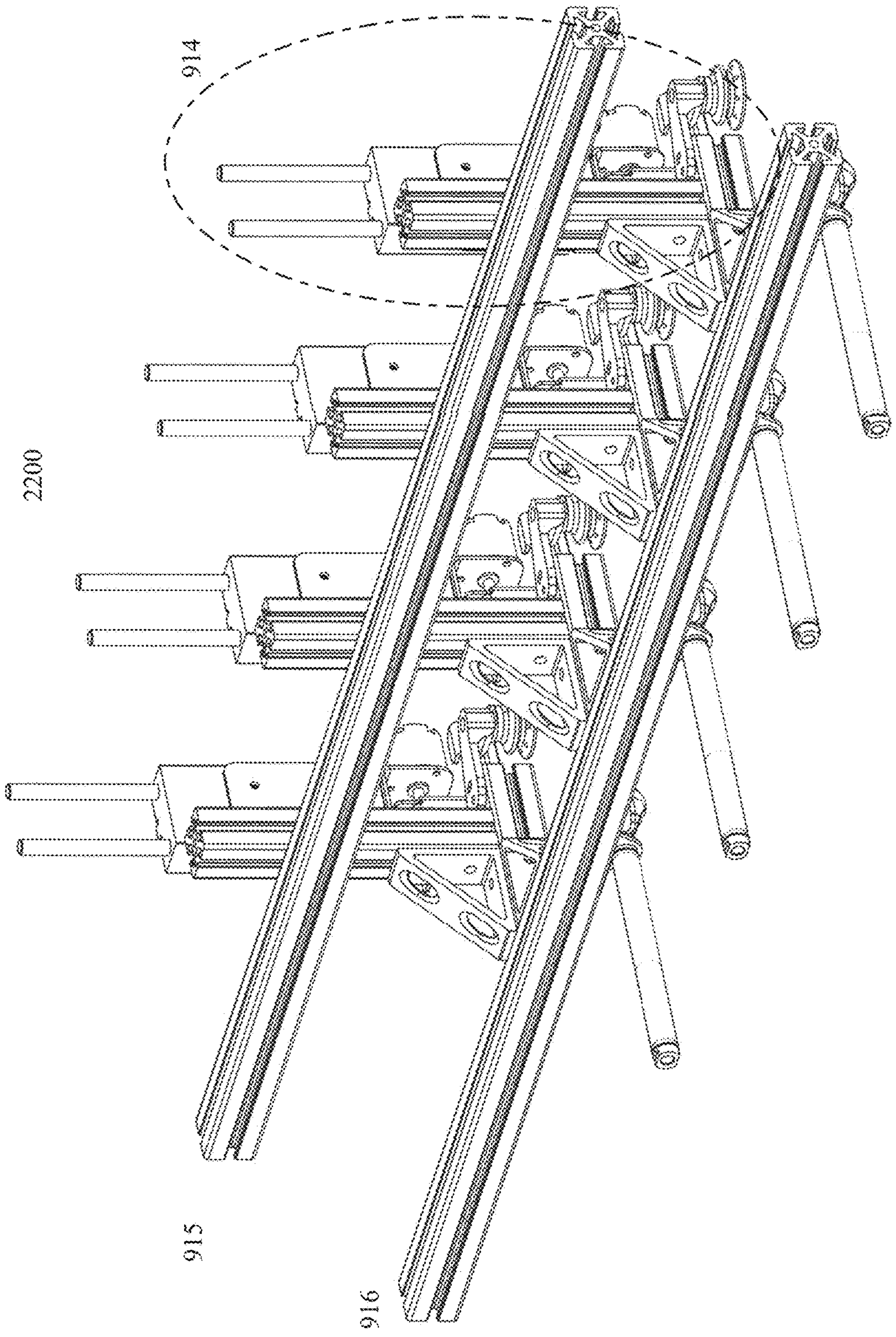
Figure 23:
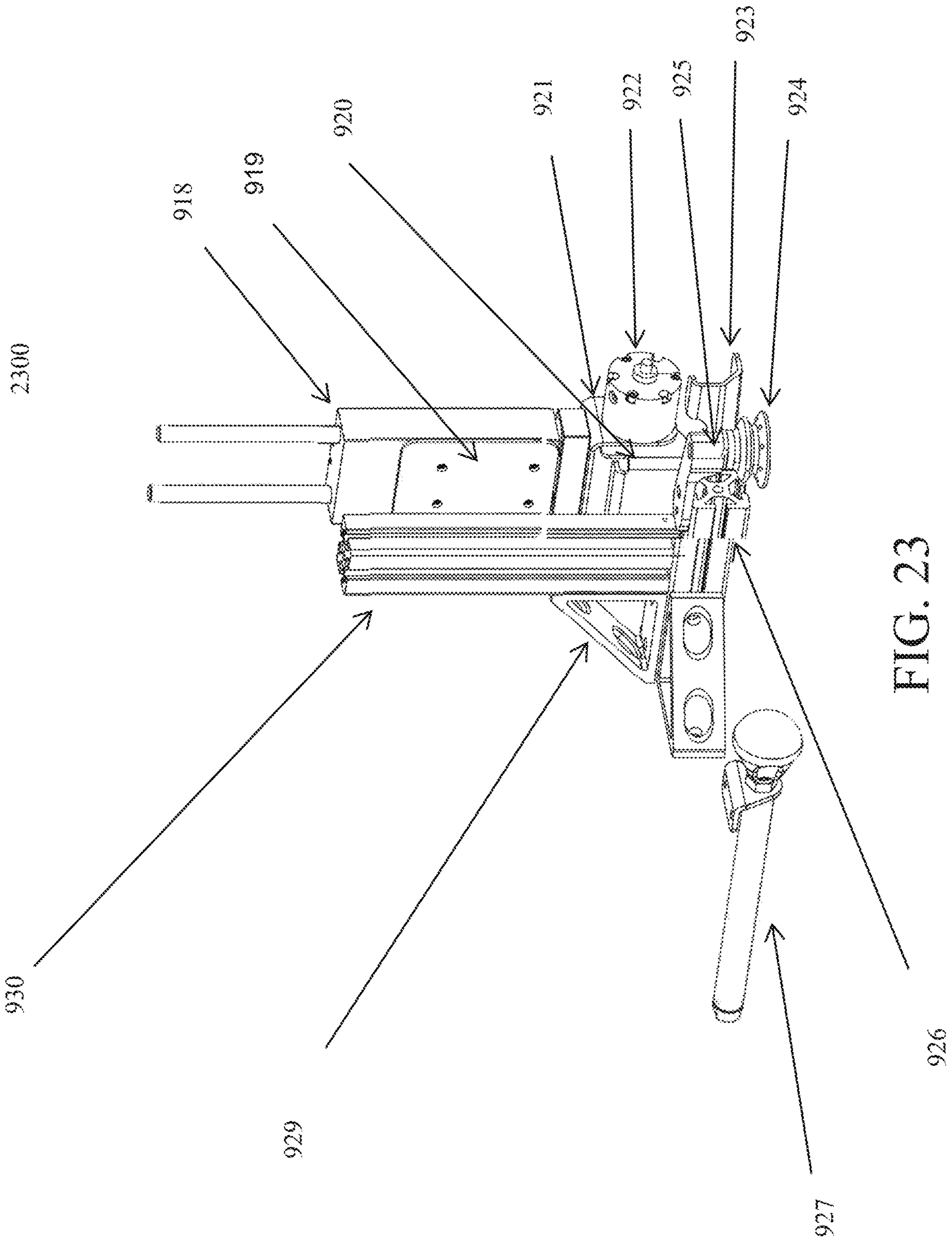
Figure 24:
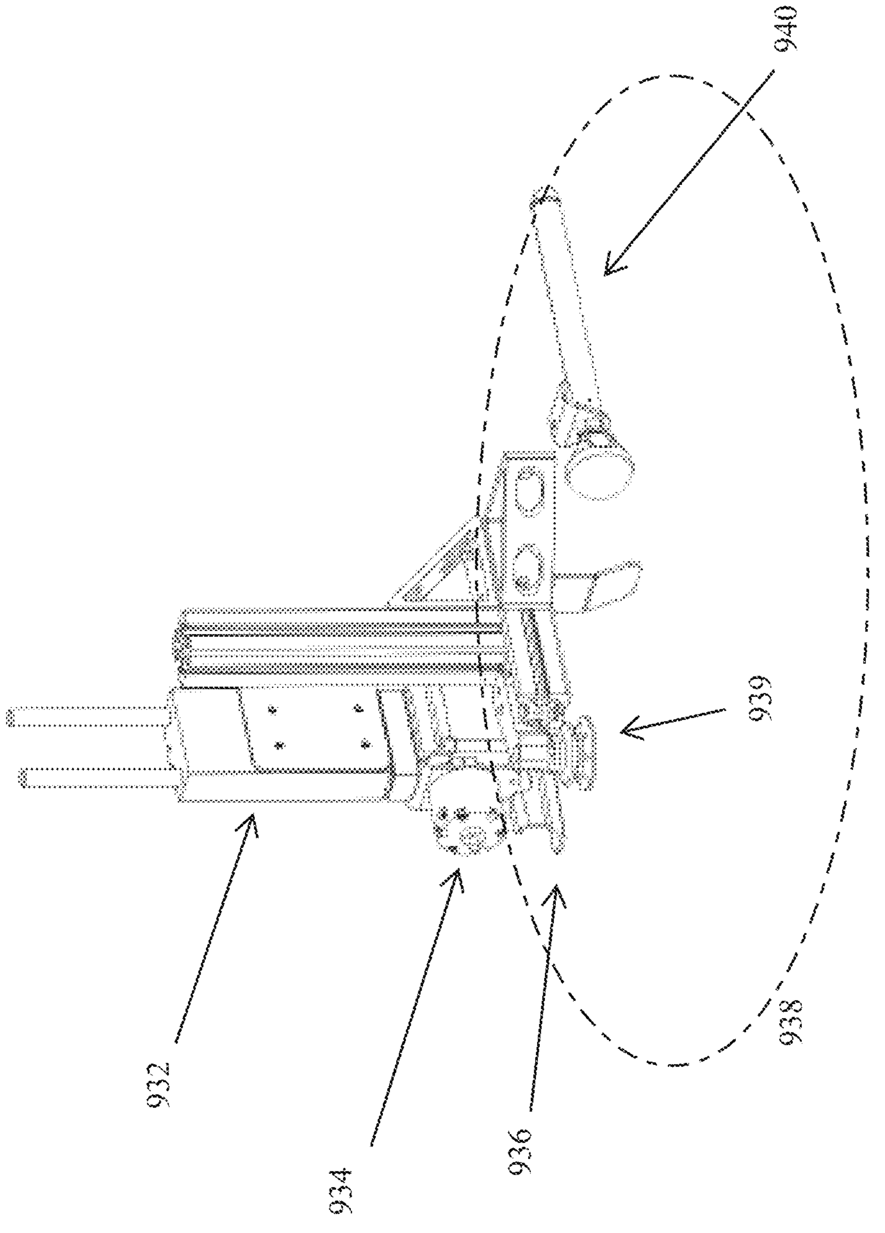
Figure 25:
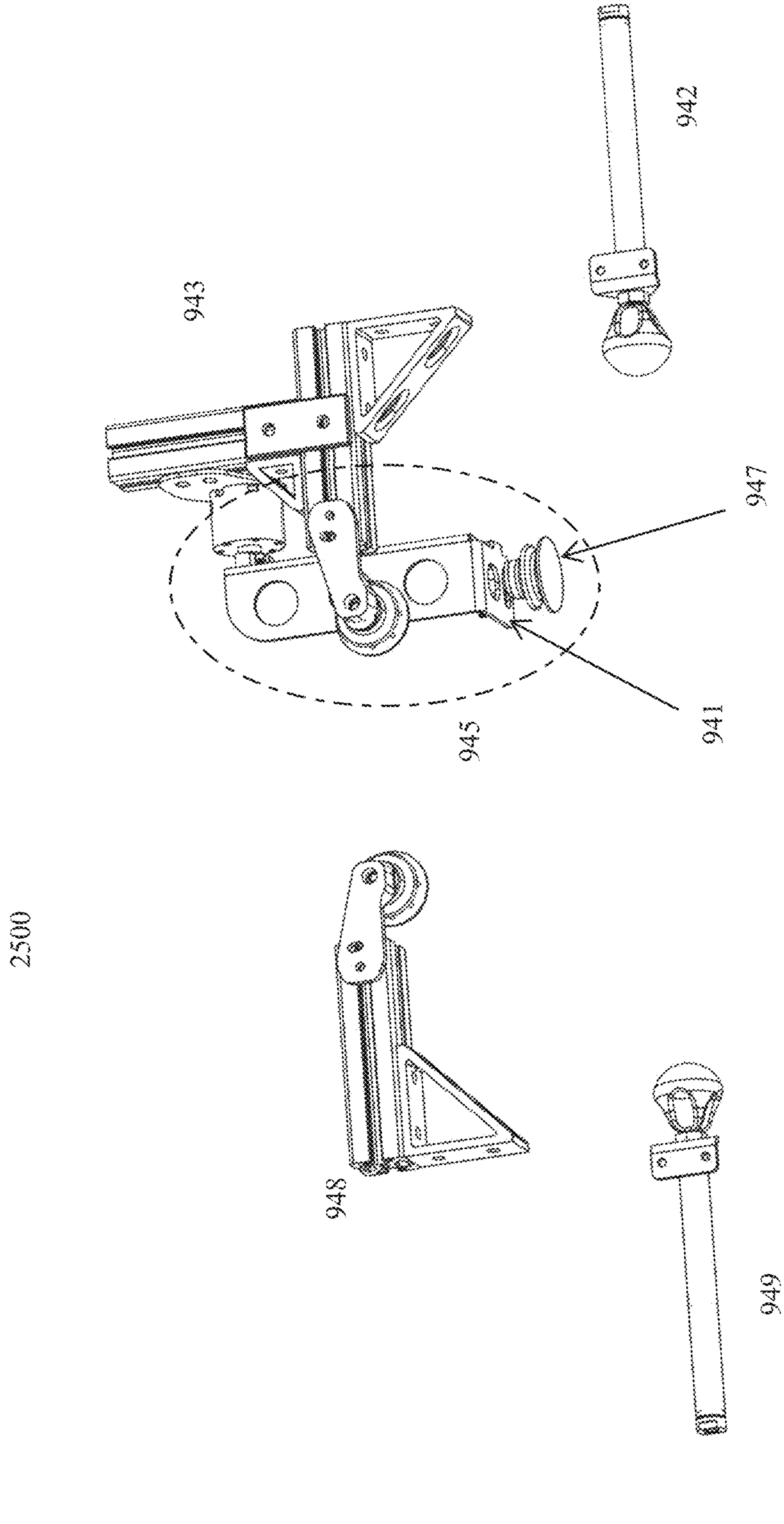
Figure 26B:
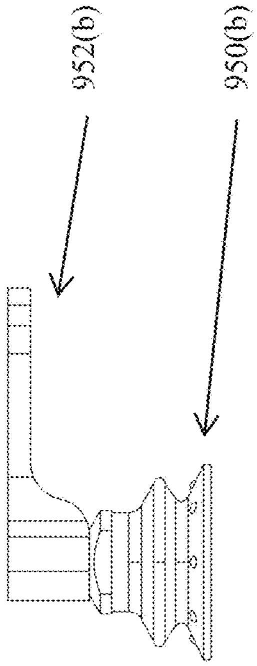
Figure 26D:
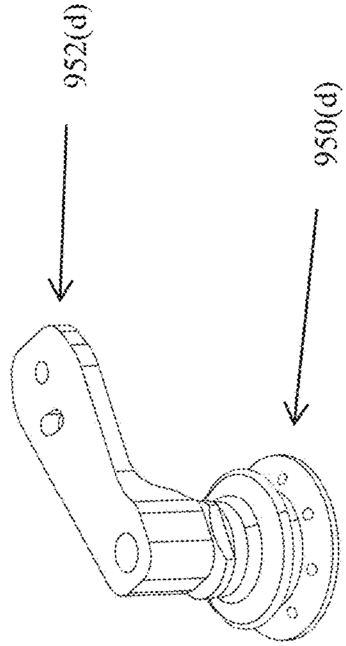
Figure 26A:
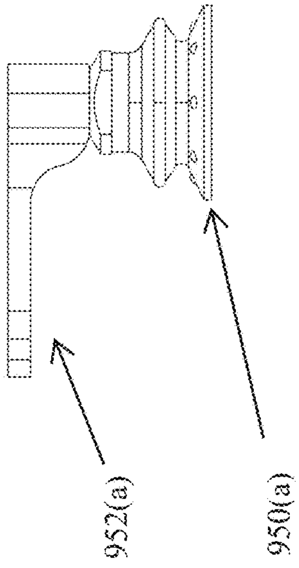
Figure 26C:
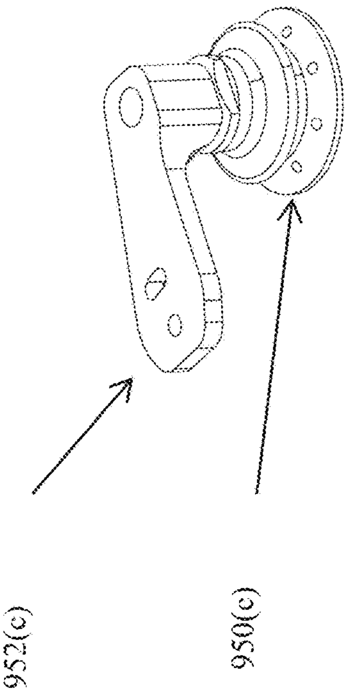
Figure 27:
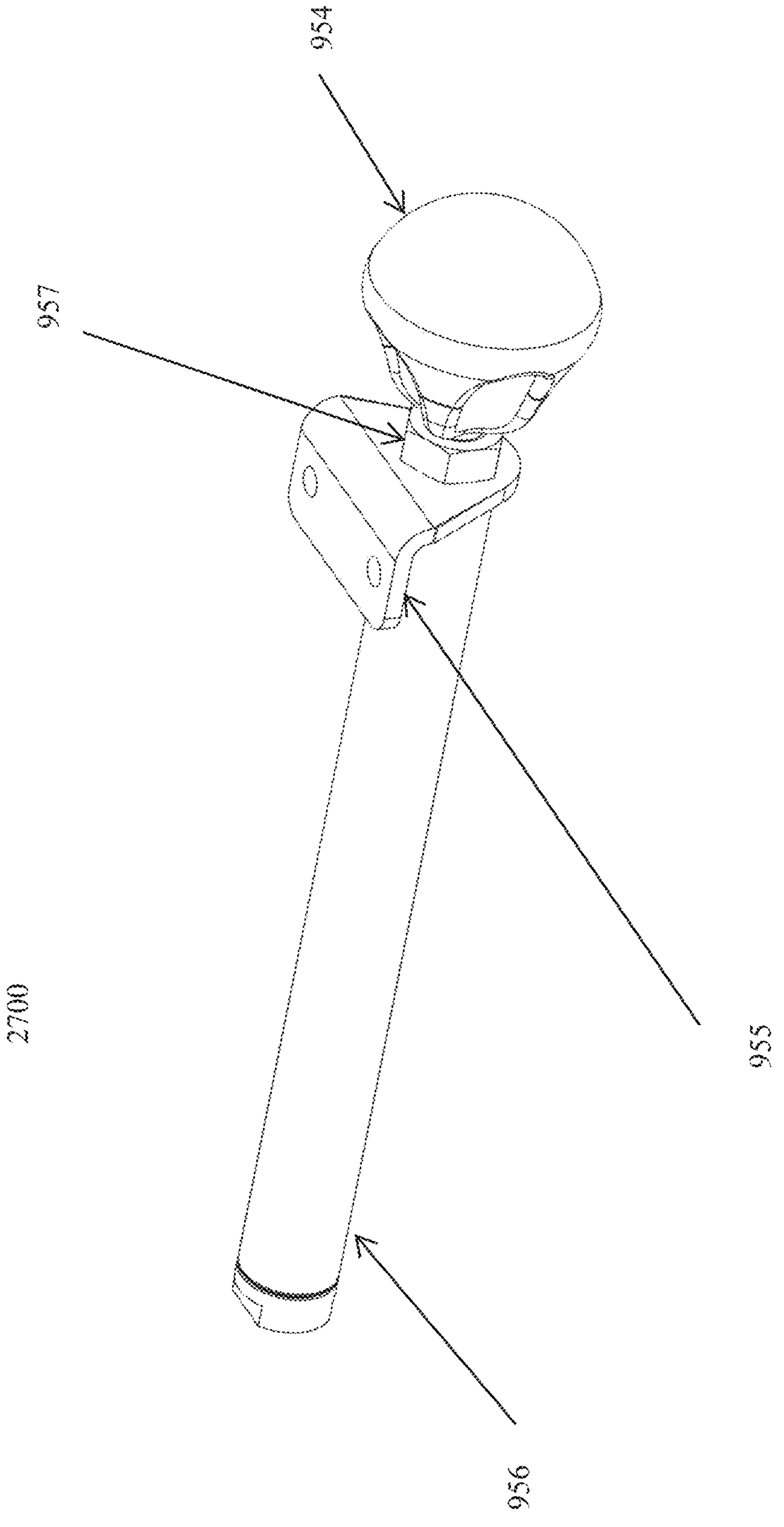
Figure 28:
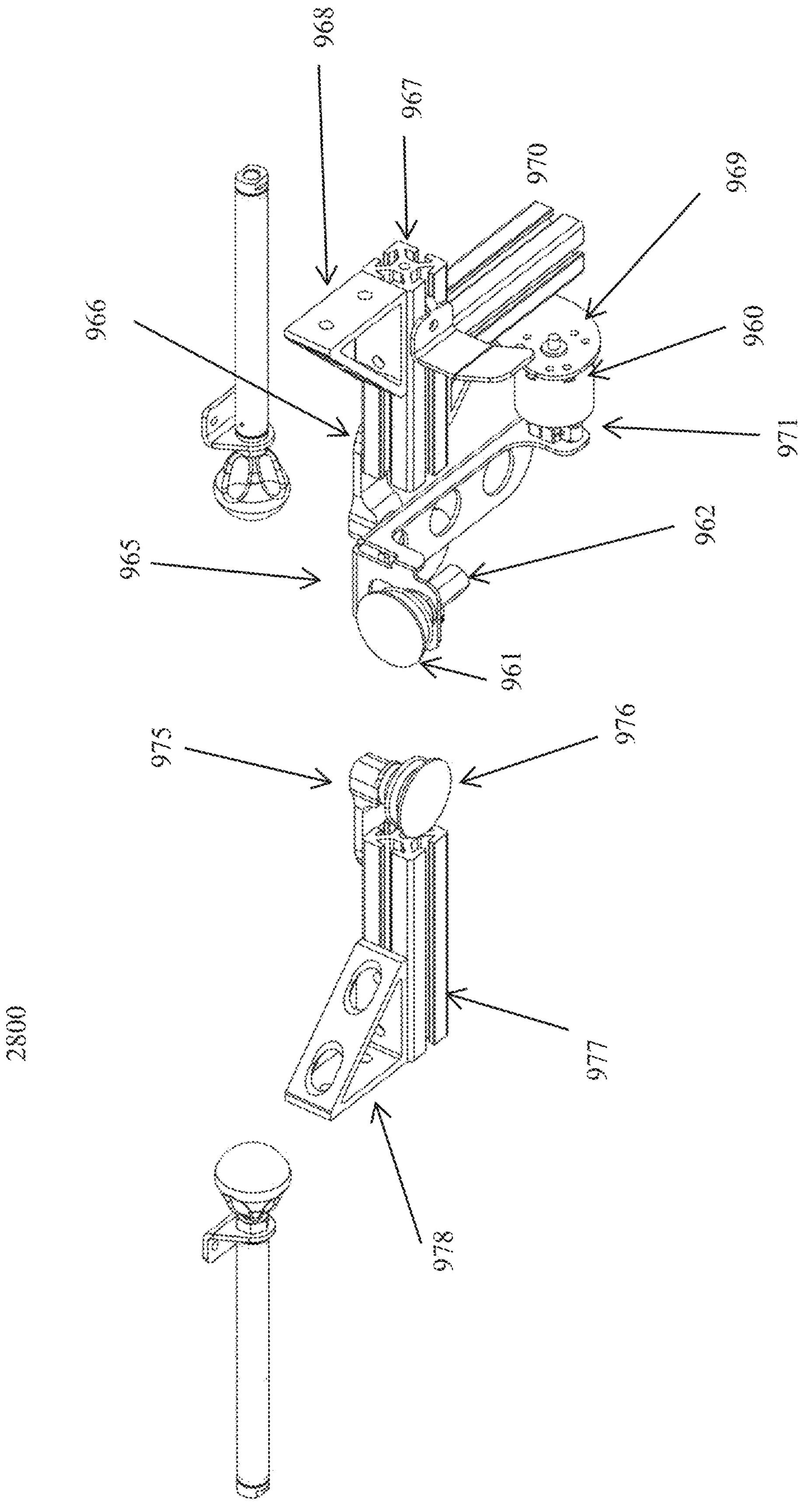
Figure 29:
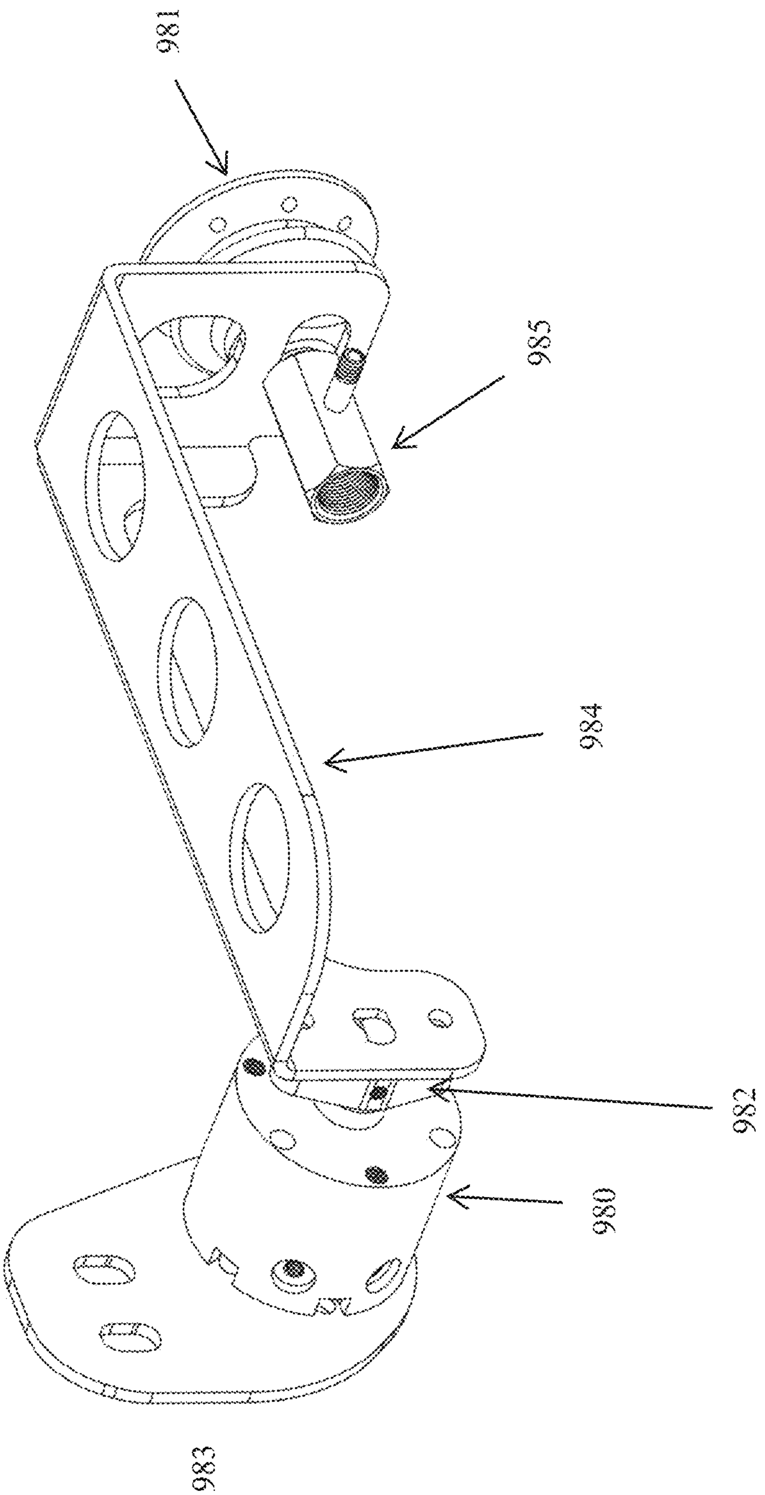
Figure 30:
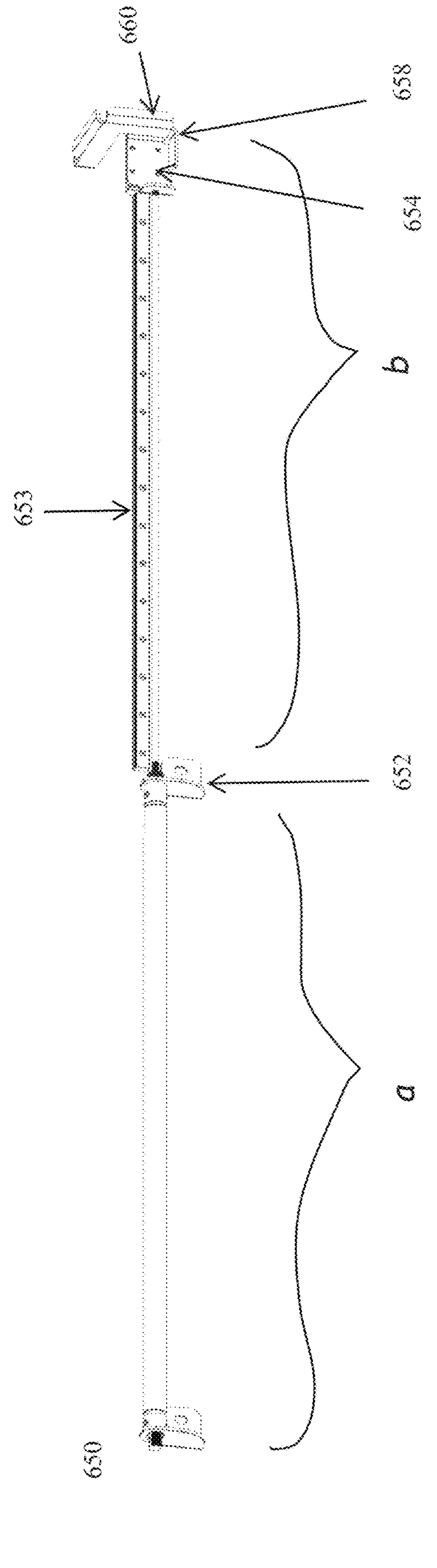
Figure 31:
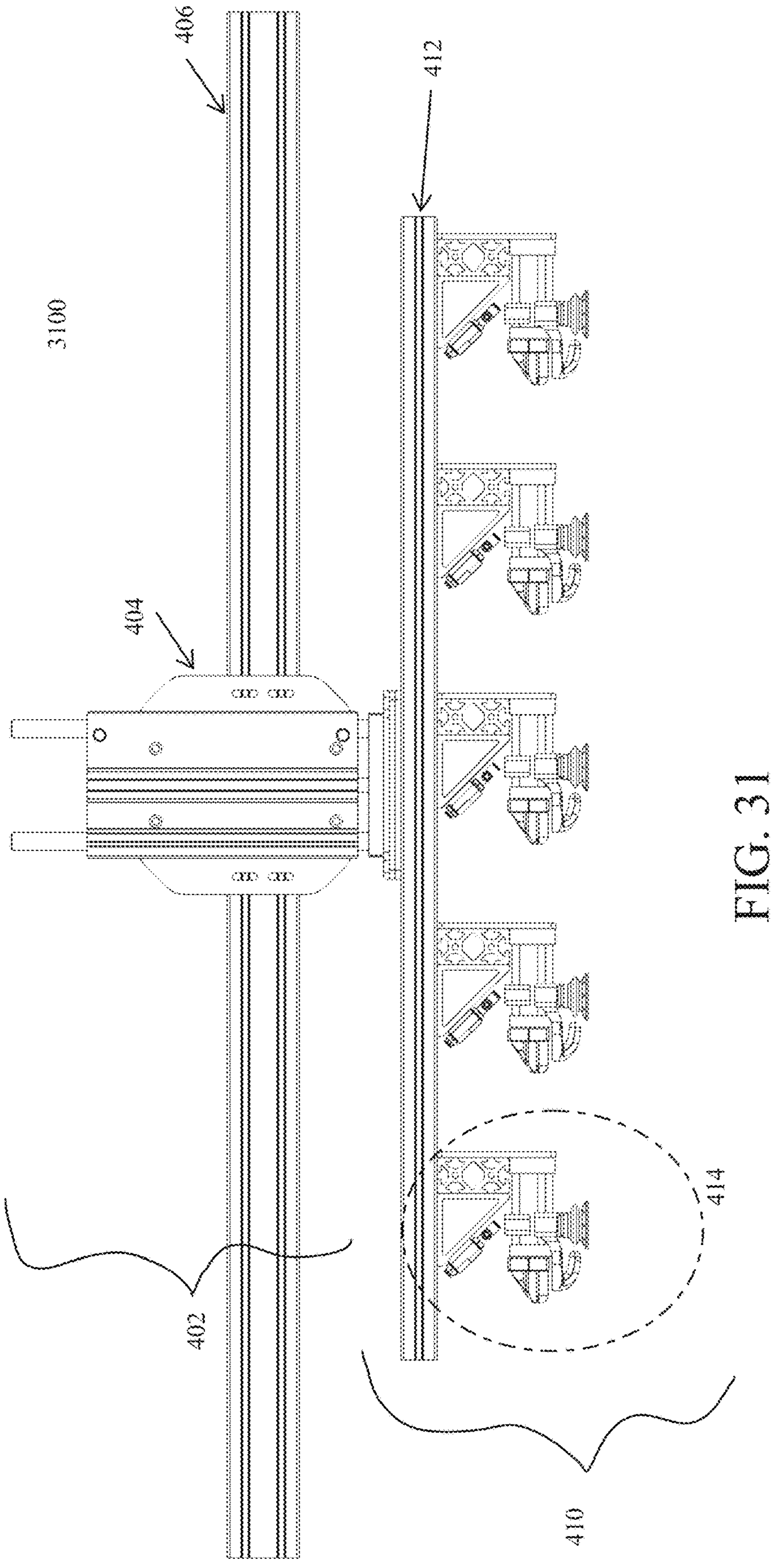
Figure 32:
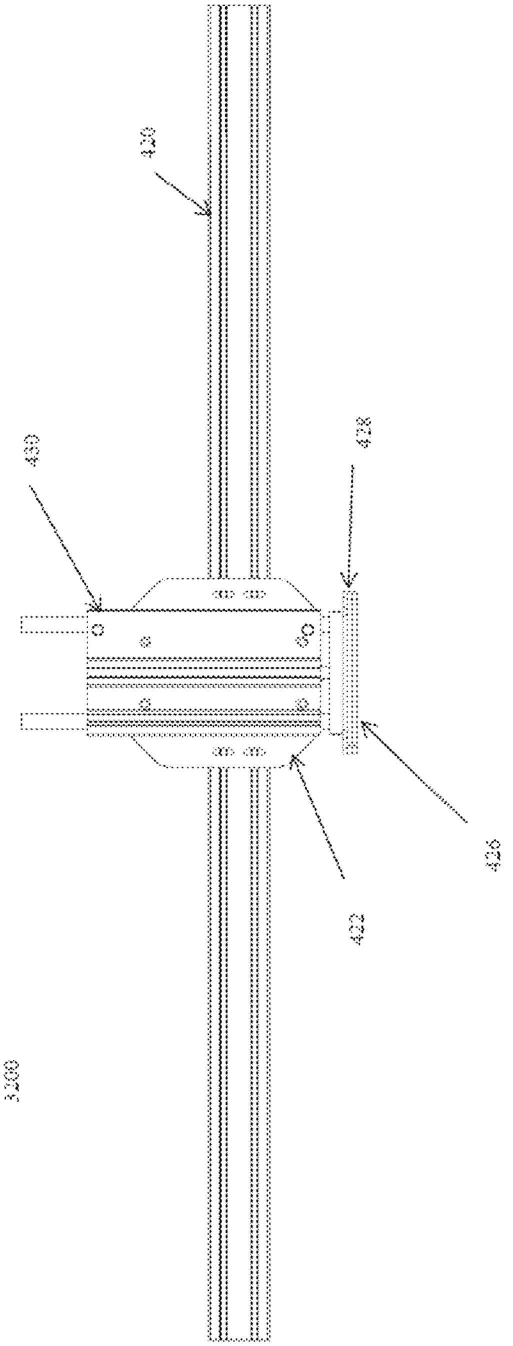
Figure 33:
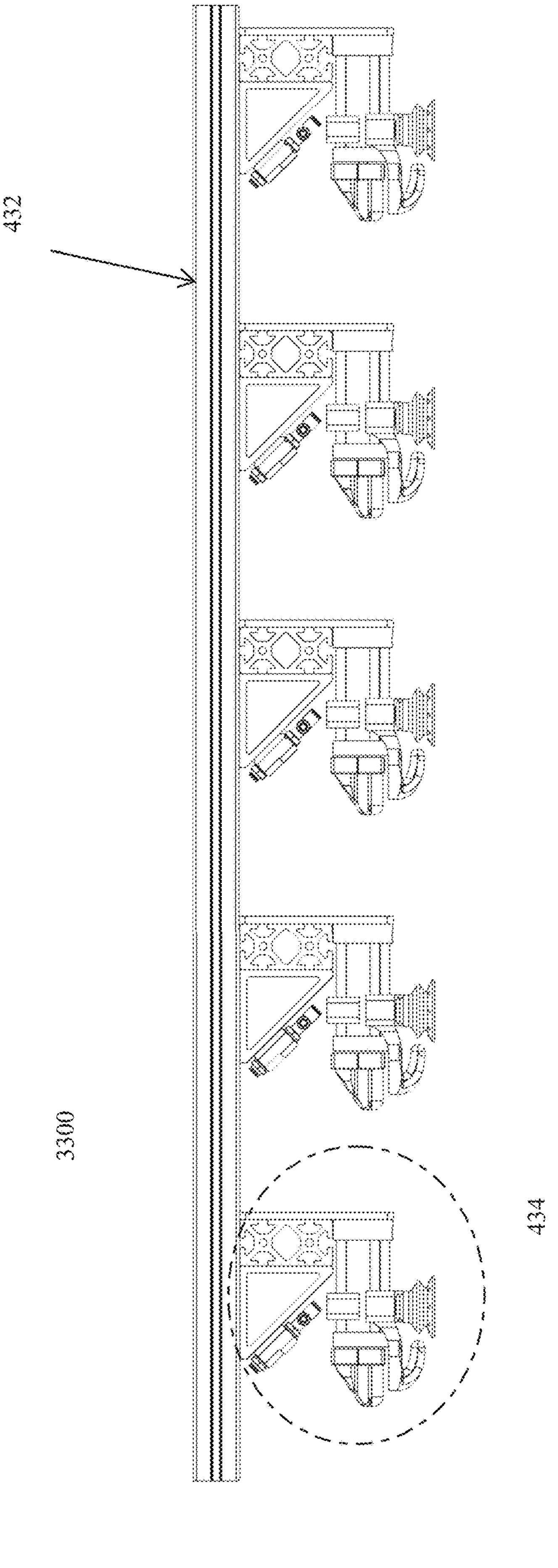
Figure 34:
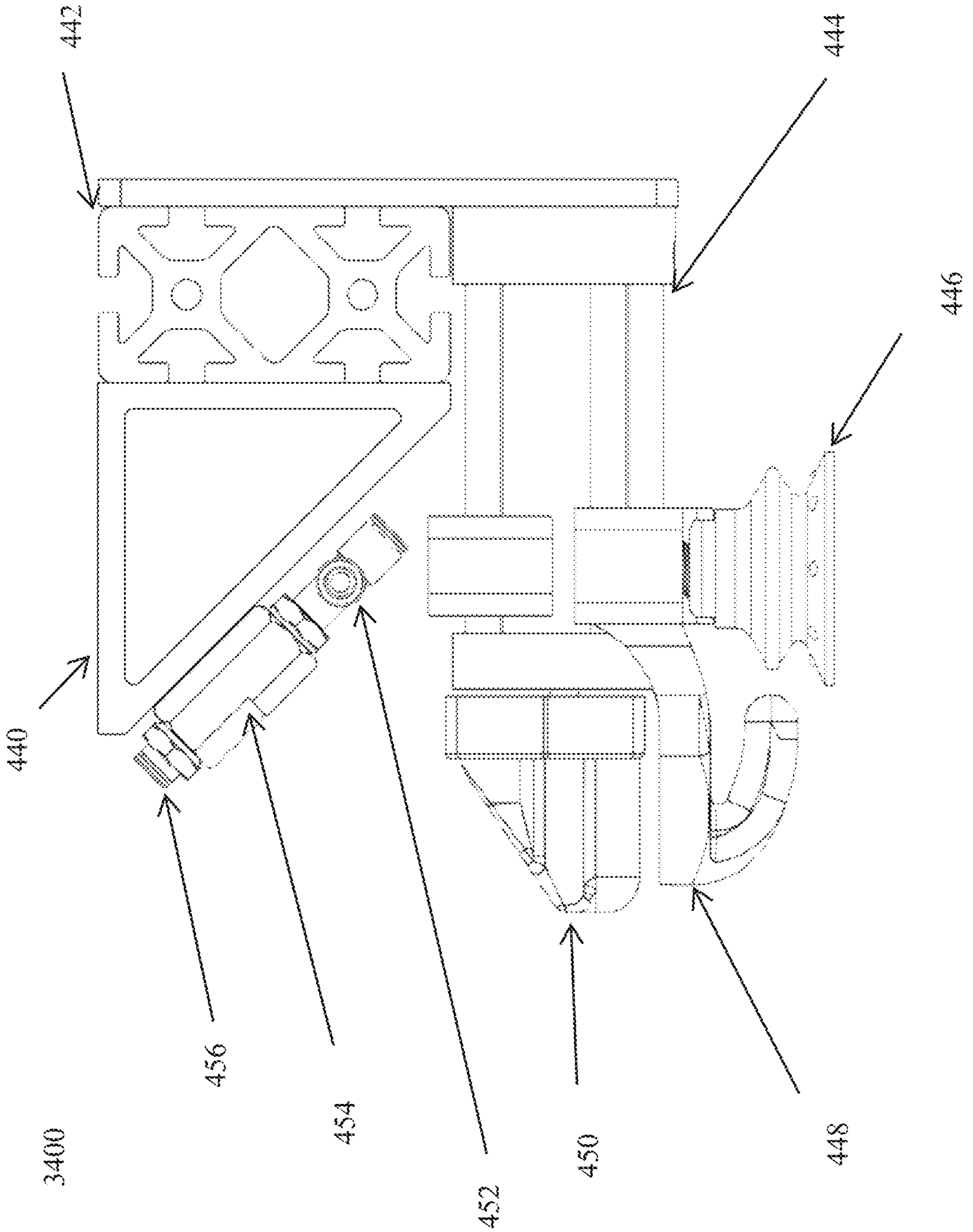
Figure 35:
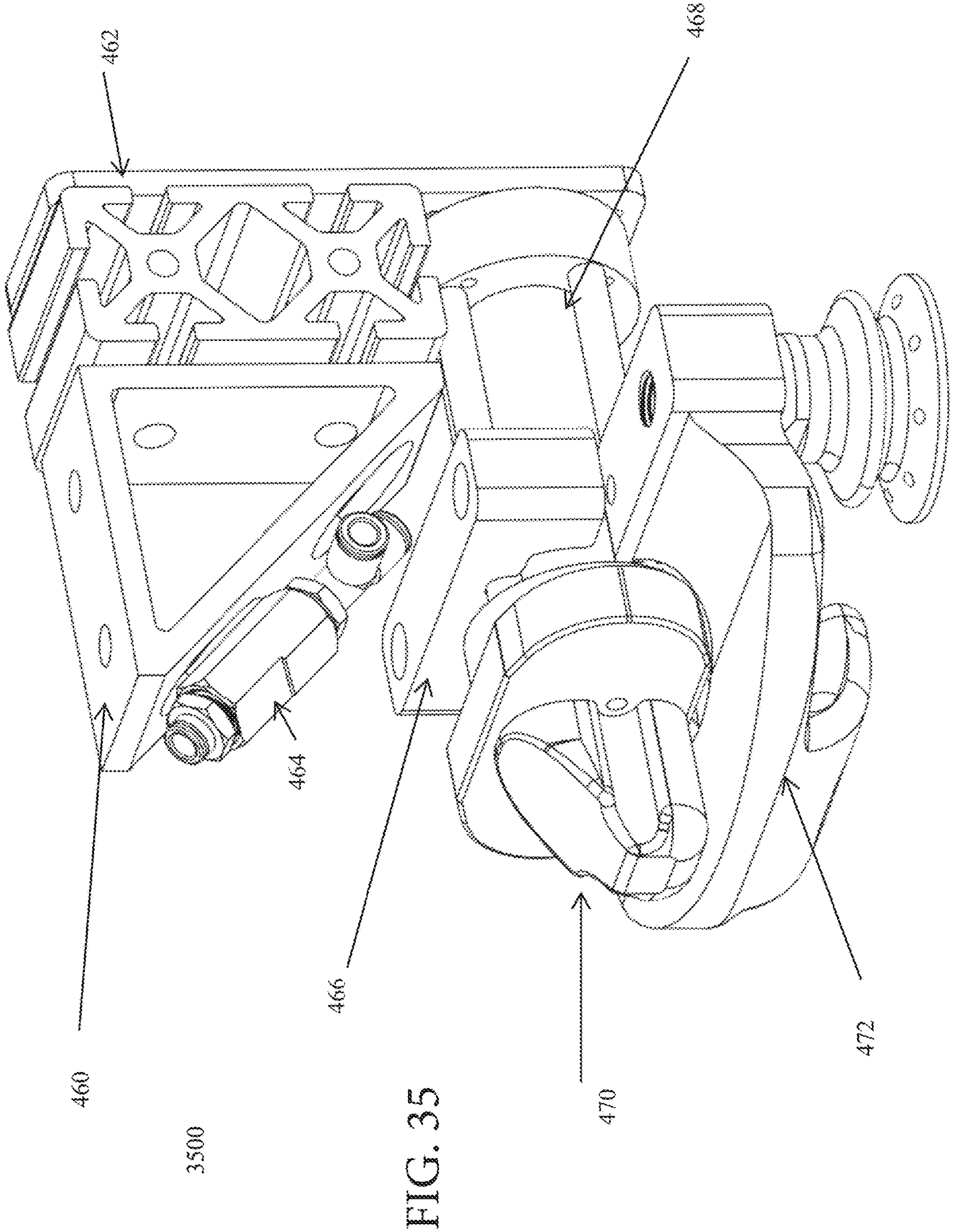
Figure 36:
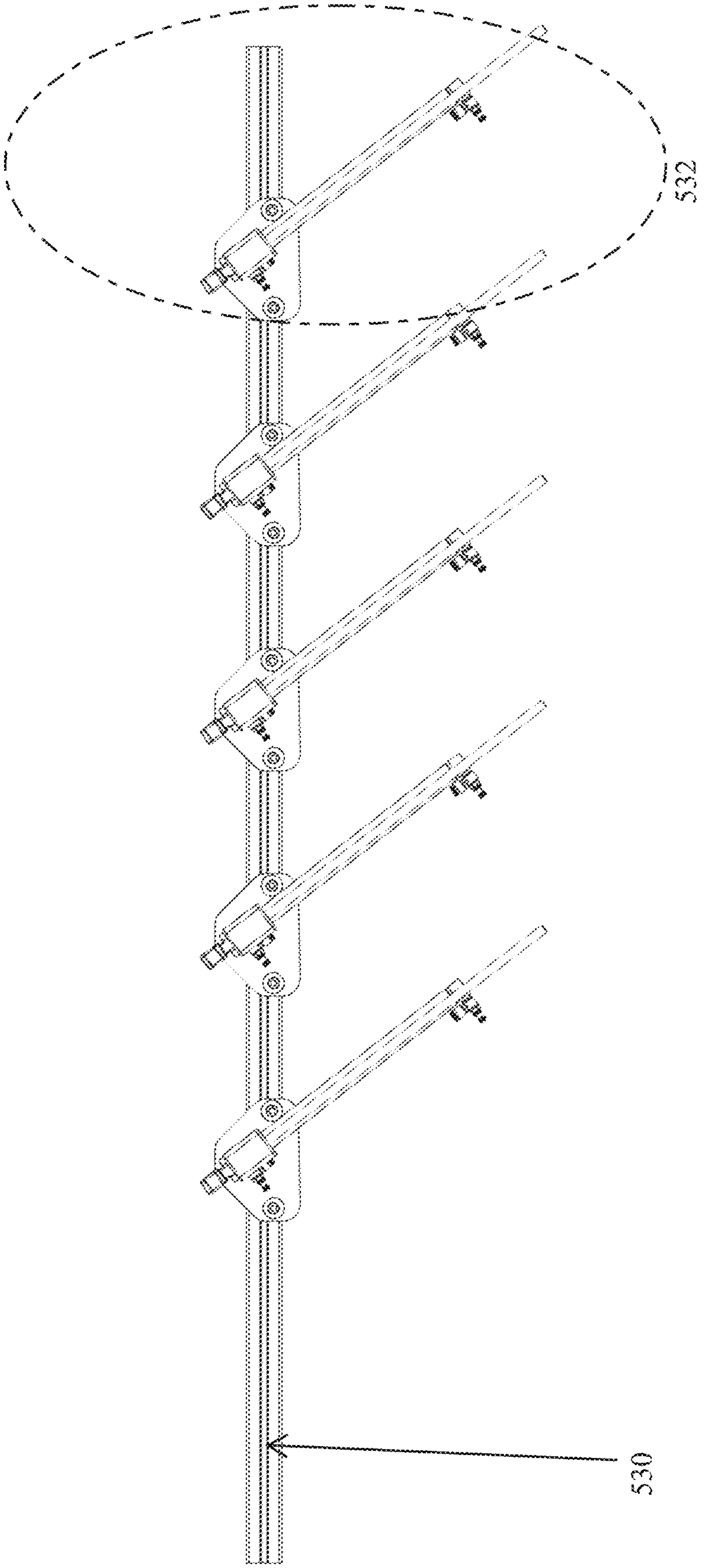
Figure 37:
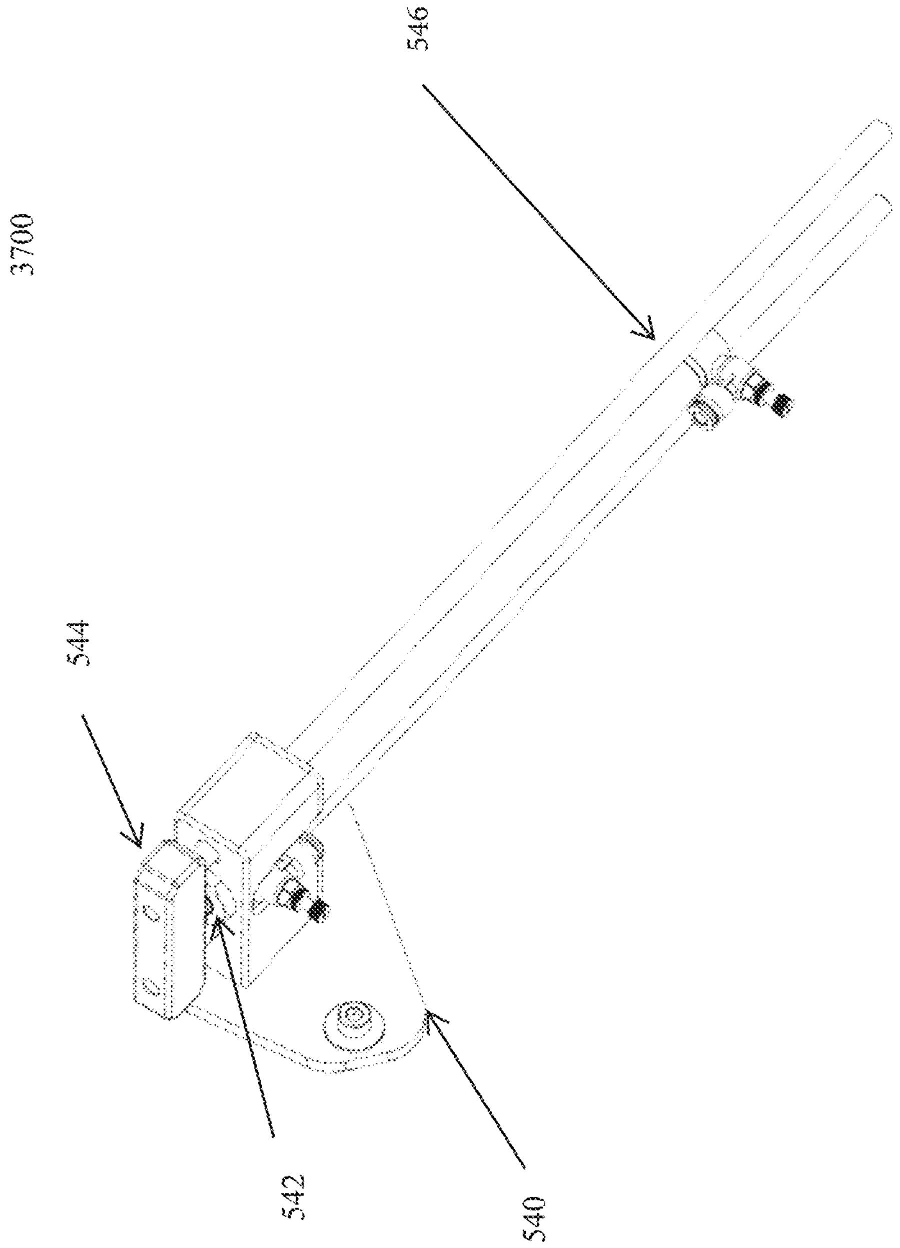
Figure 38:
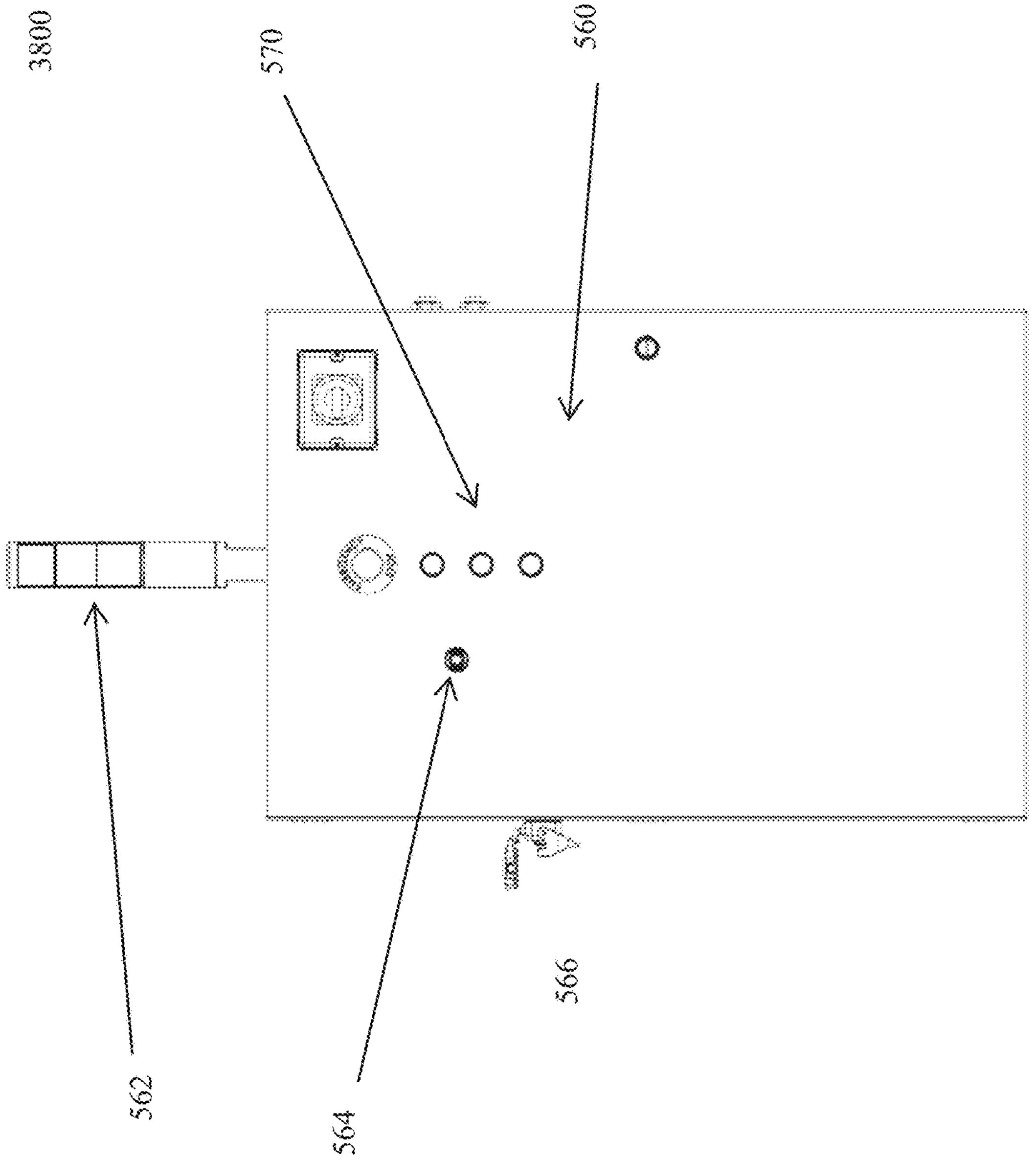
Figure 39:
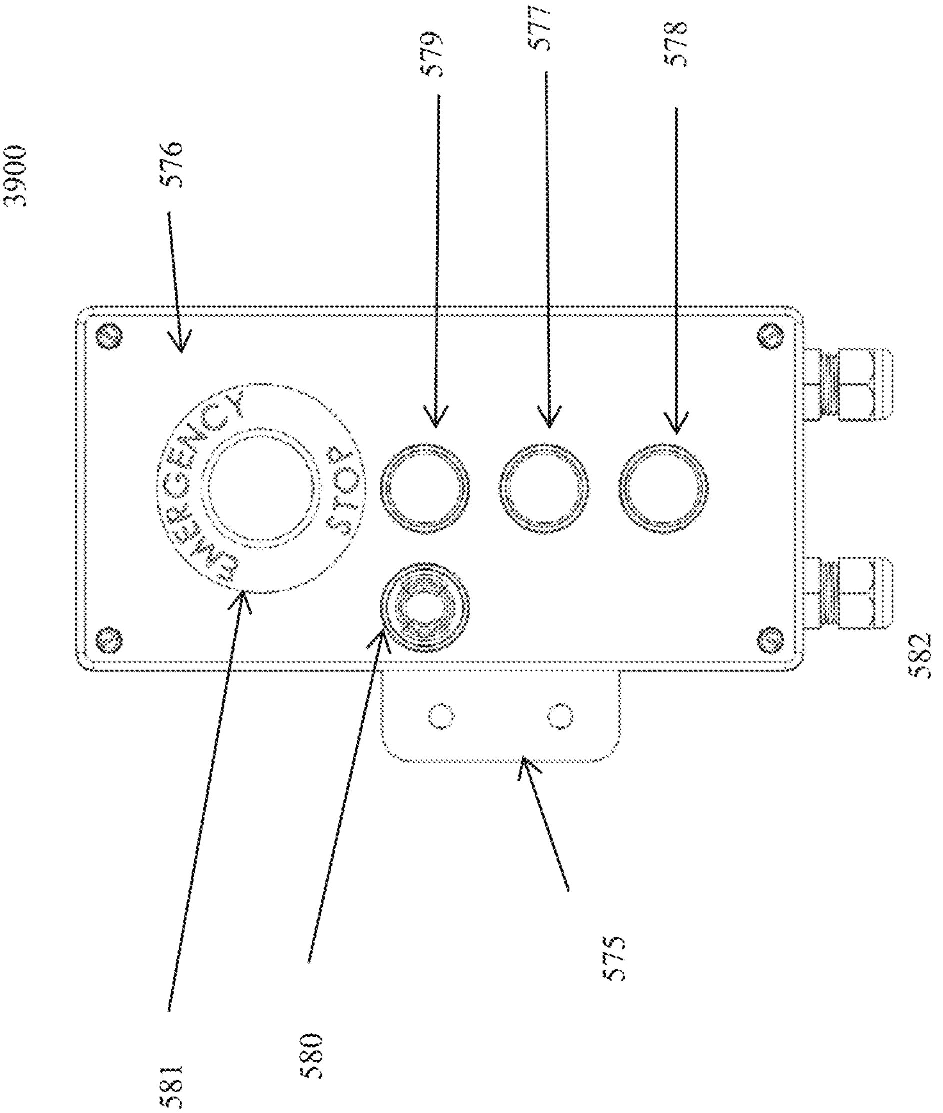
Figure 40:
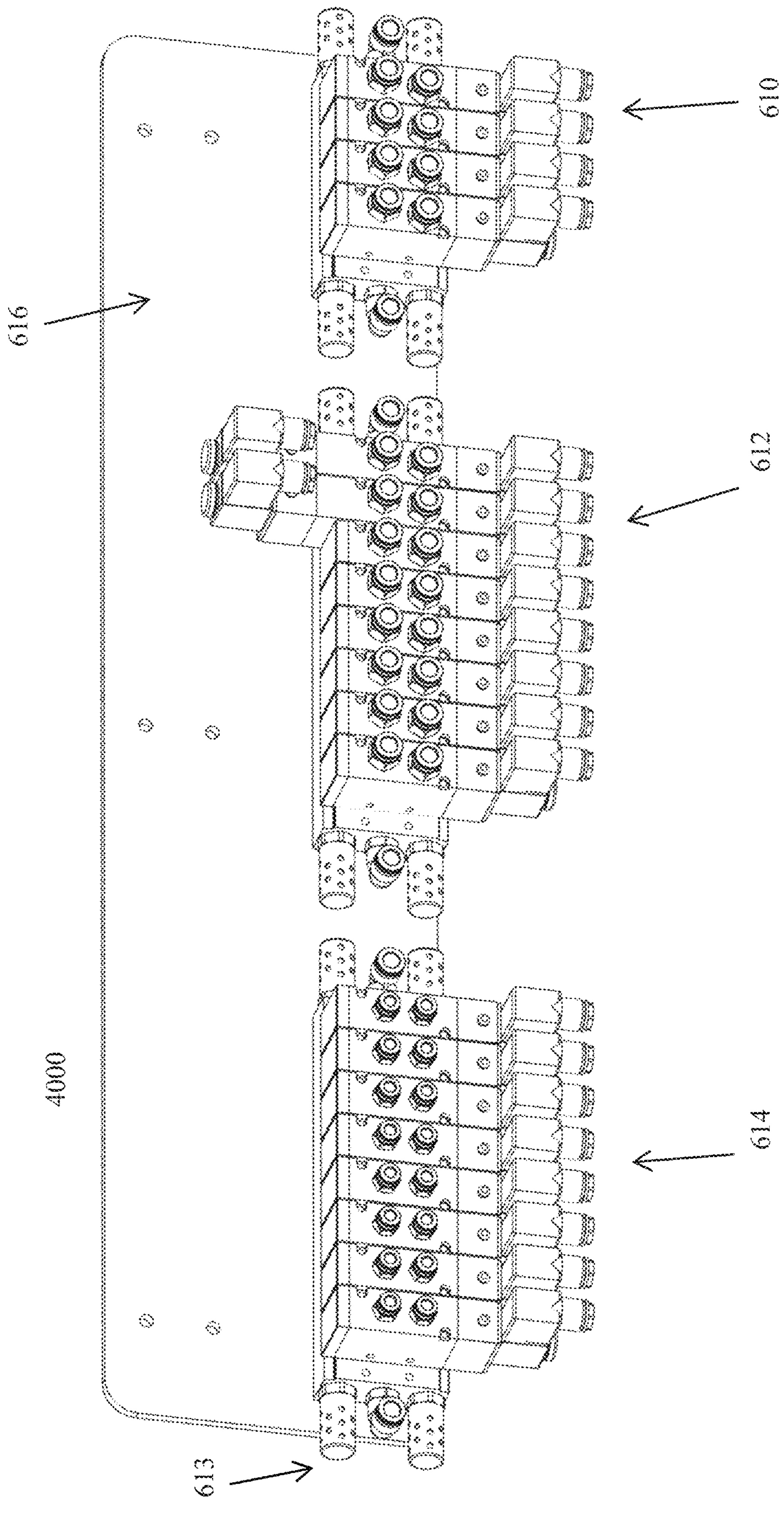
Figure 41:
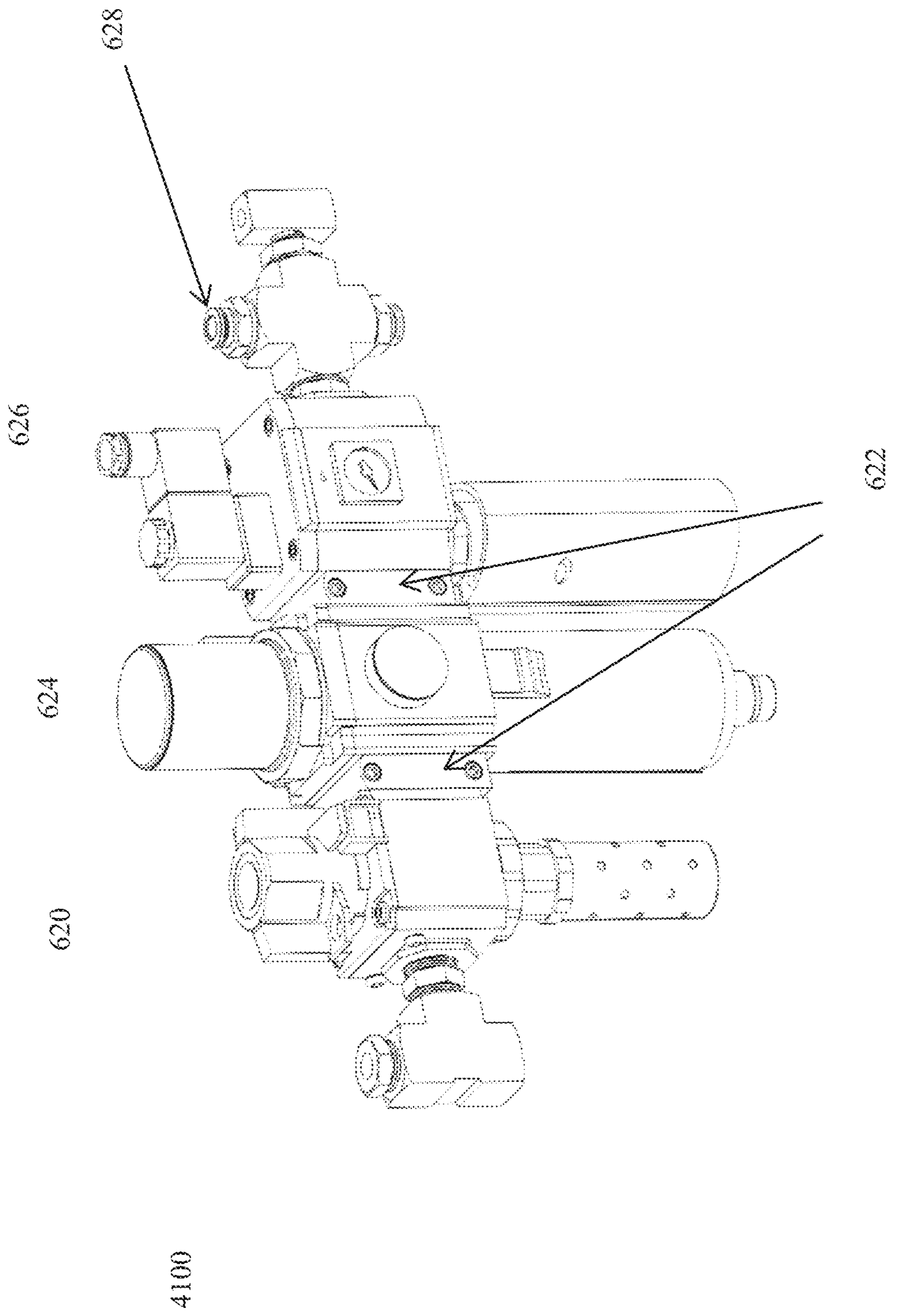
Figure 42:
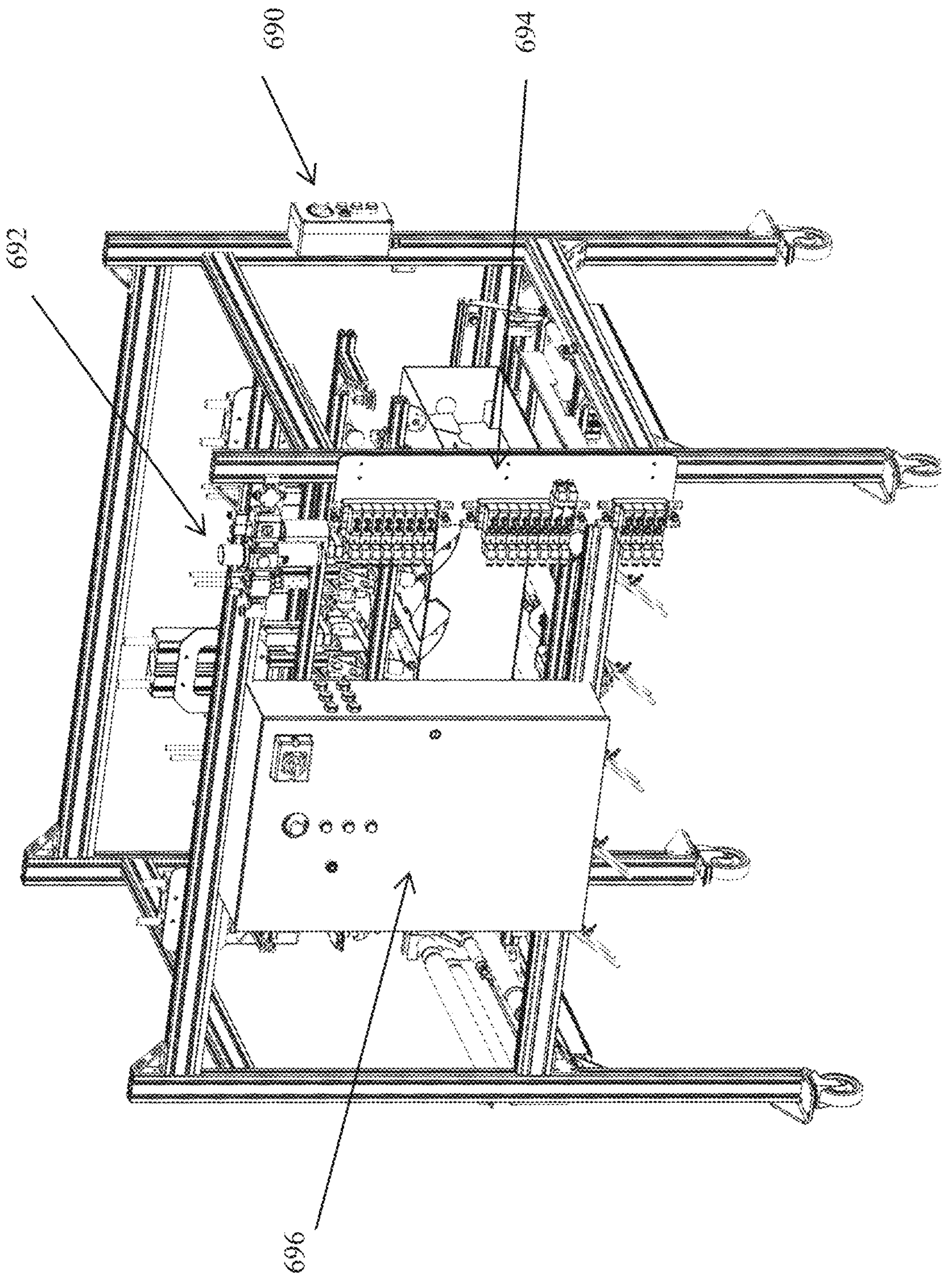
Figure 43:
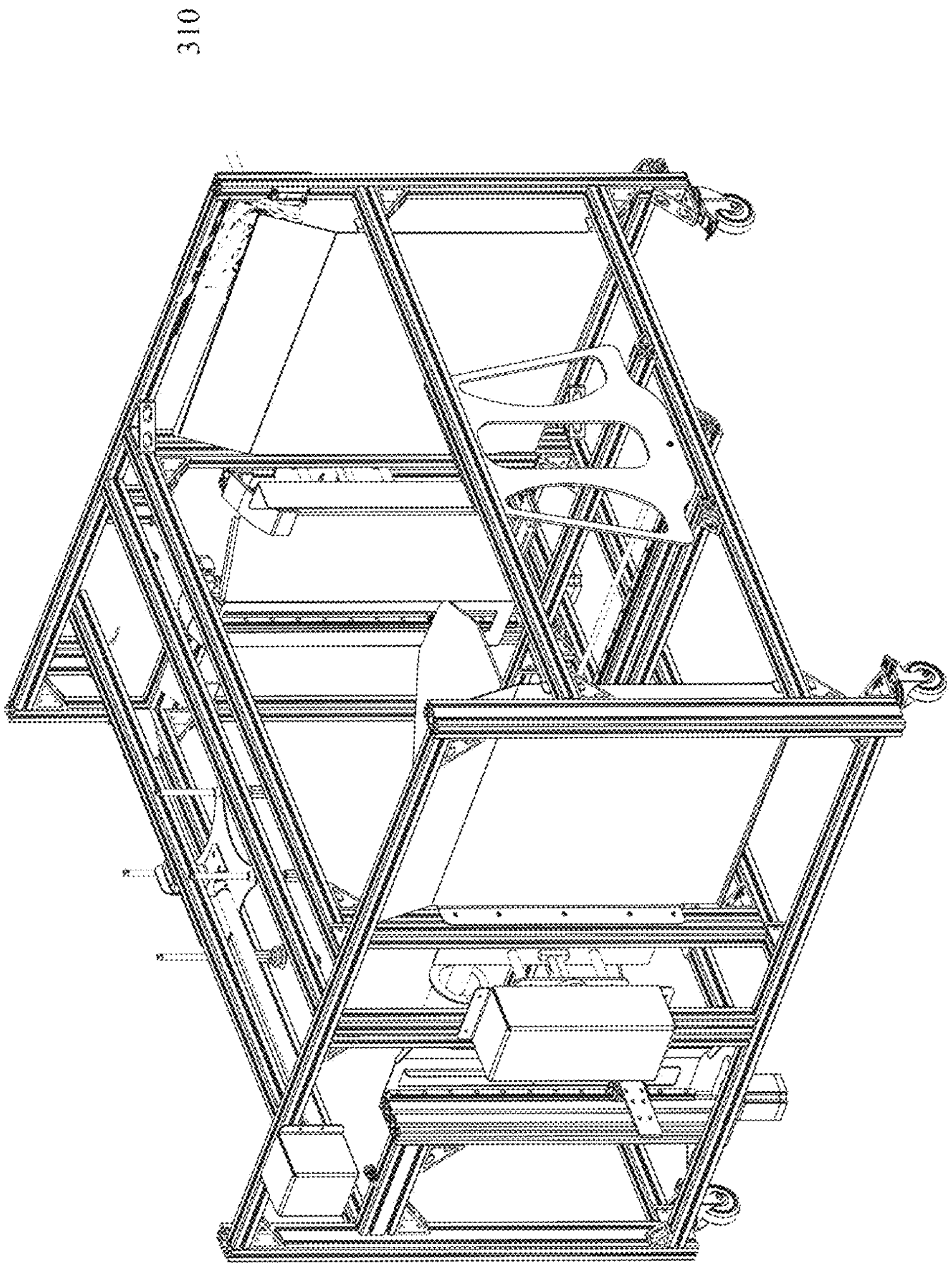
Figure 44:
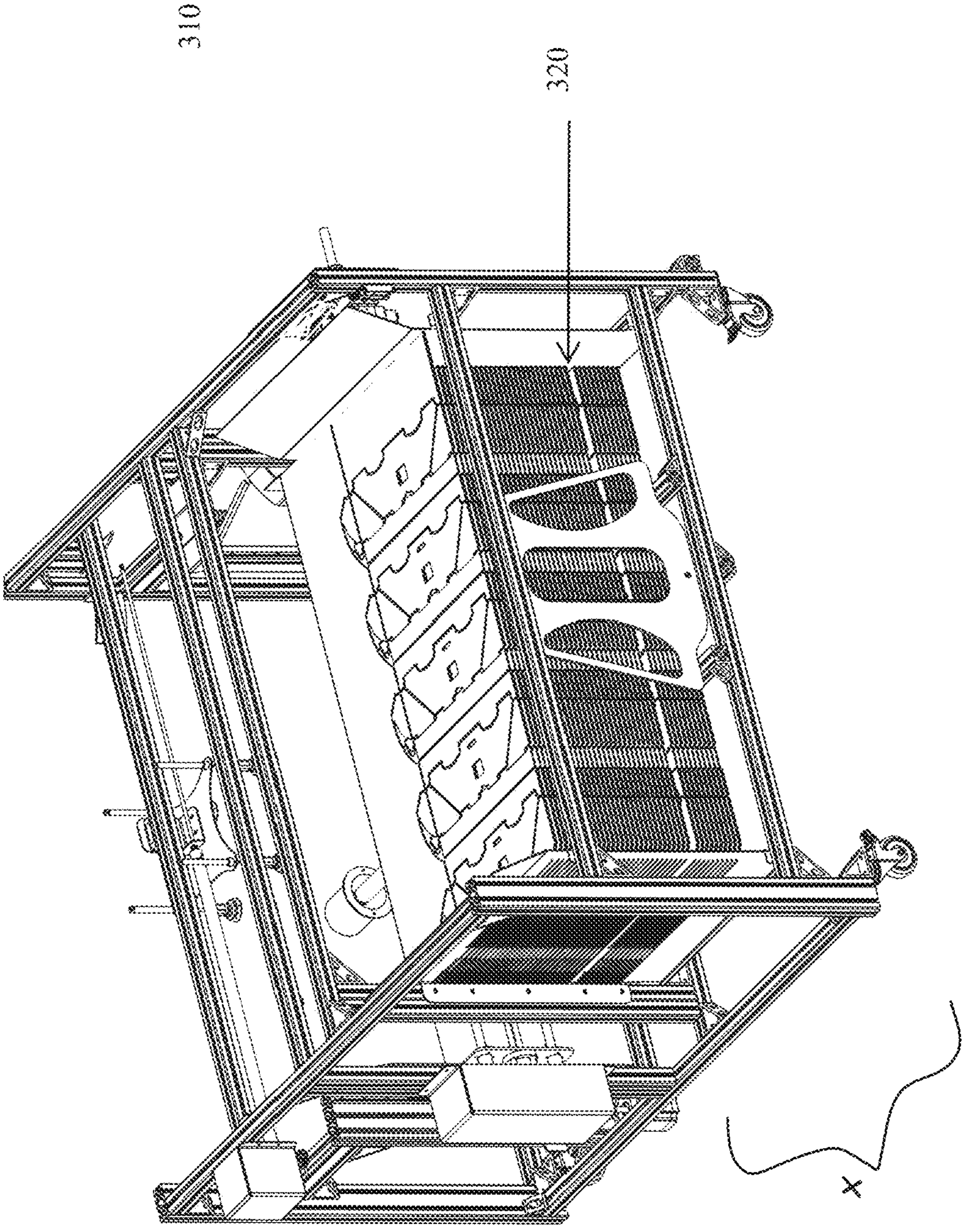
Figure 45:
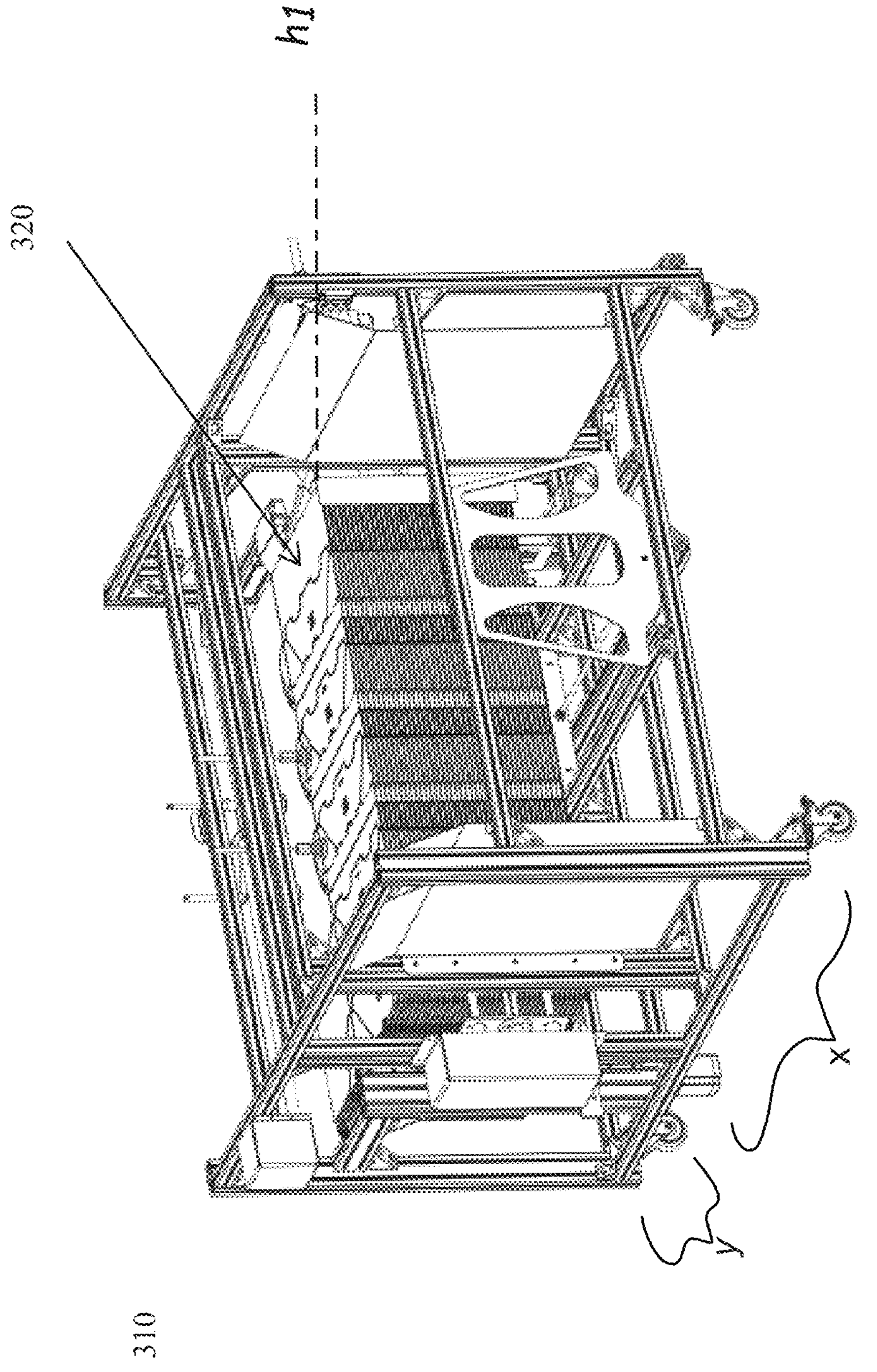
Figure 46:
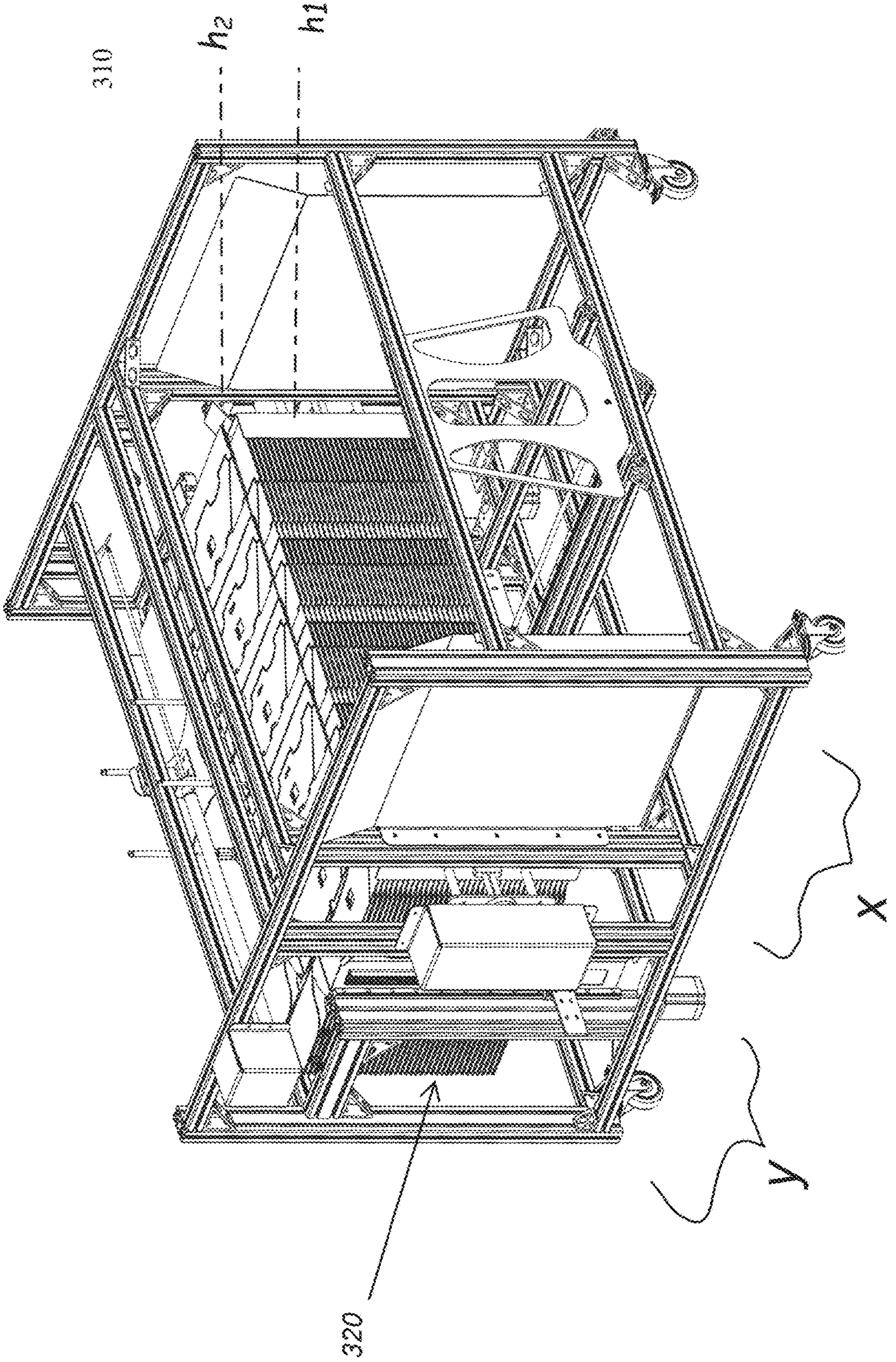
Figure 47:
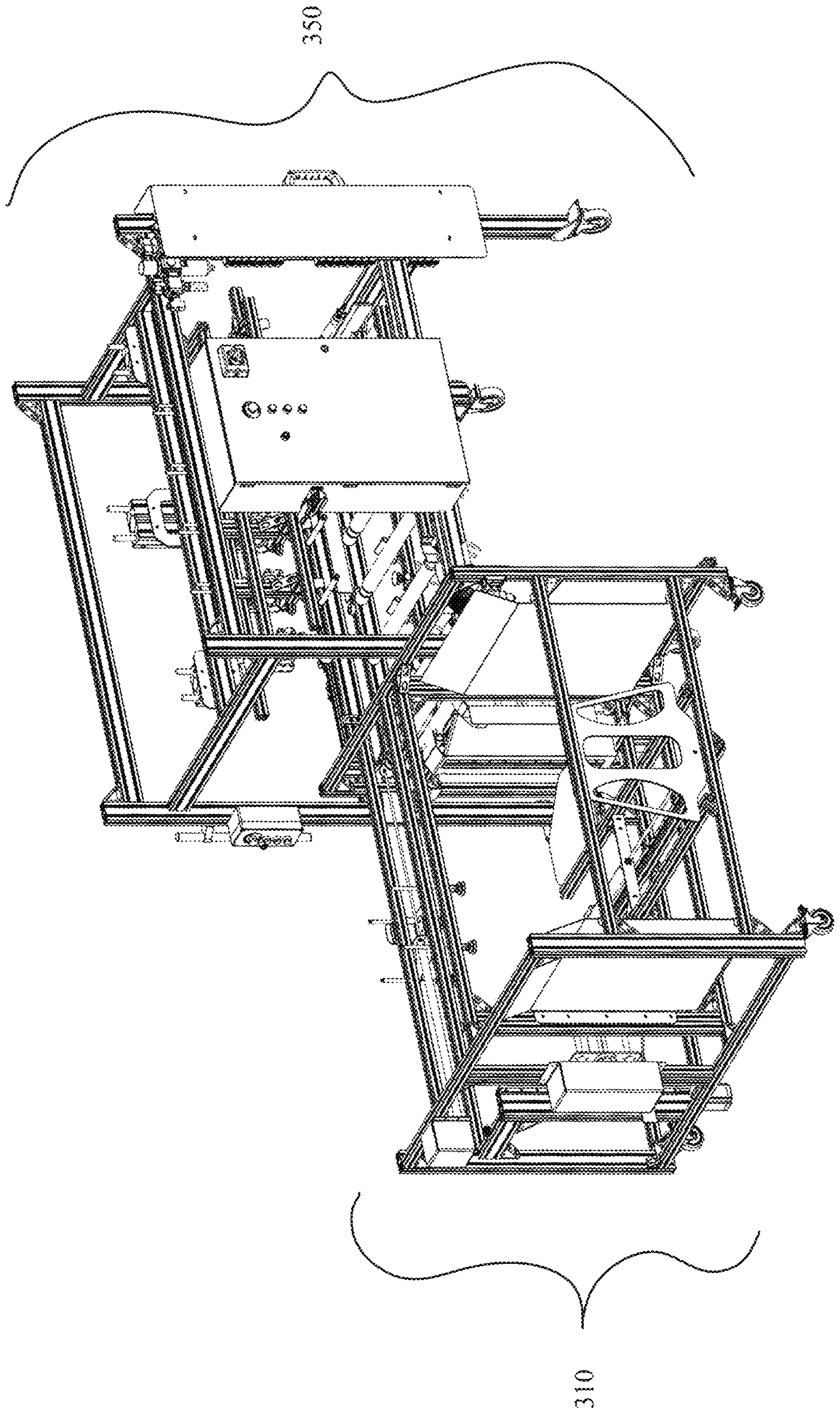
Figure 48:
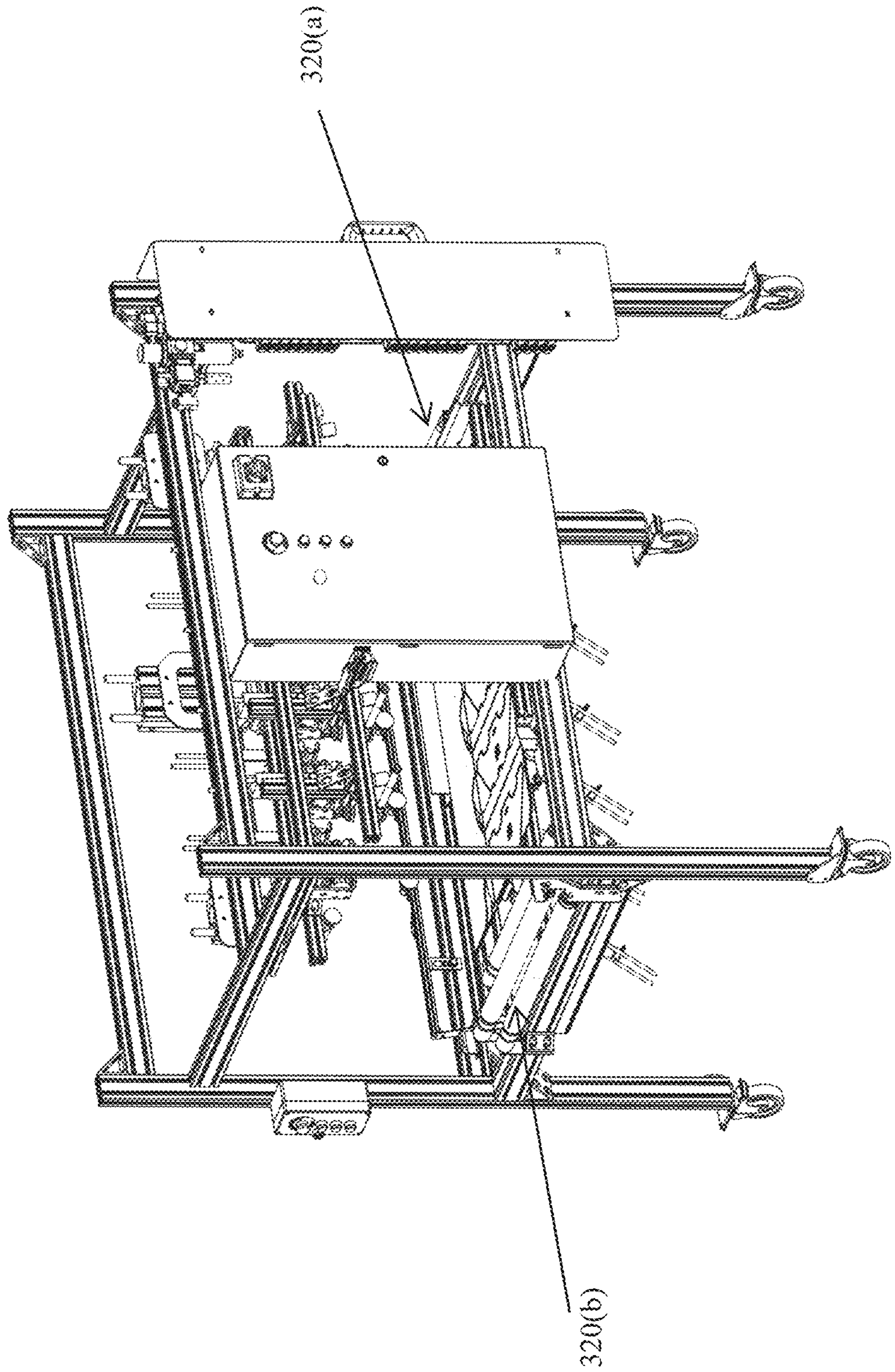
Figure 49:
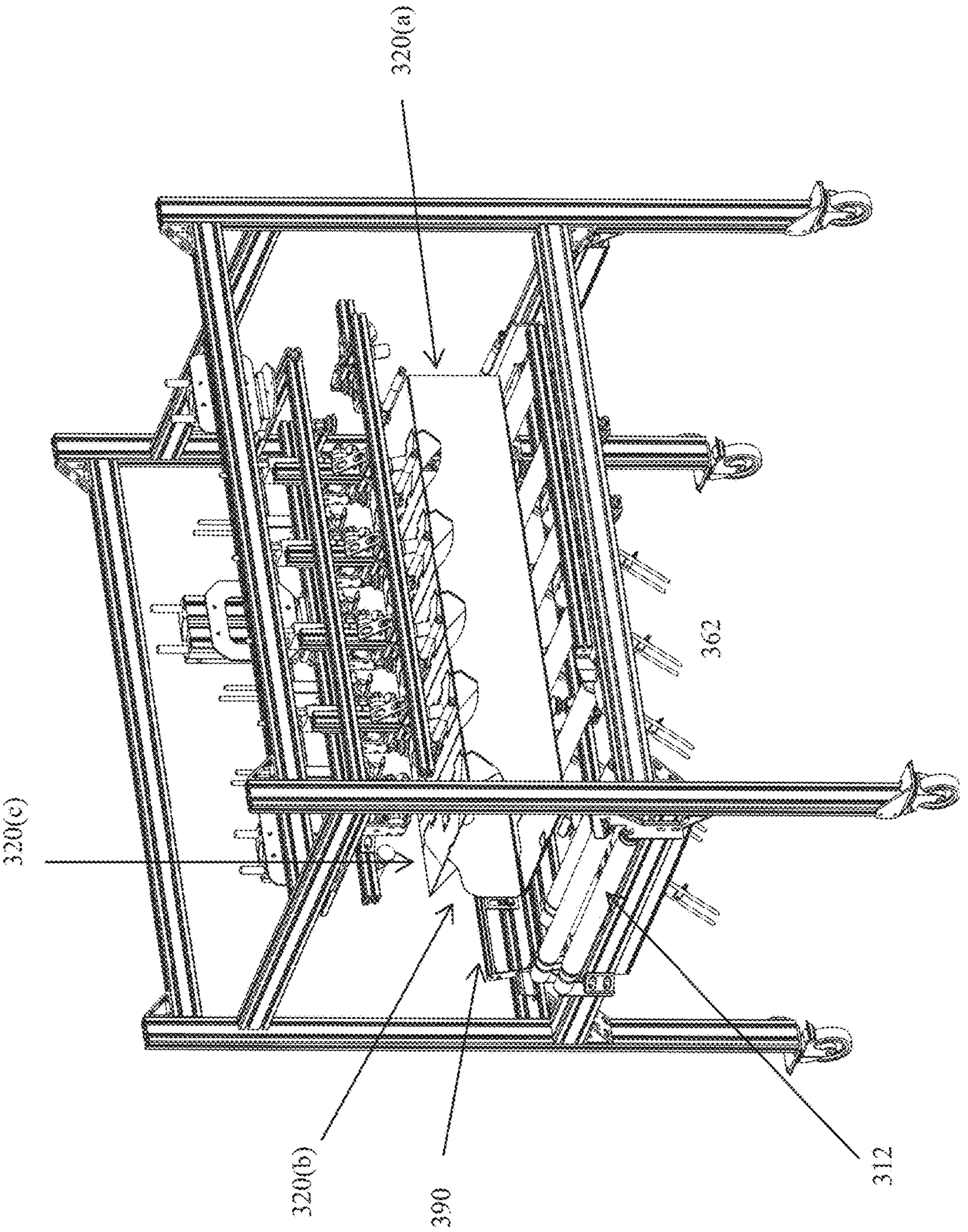
Figure 50:
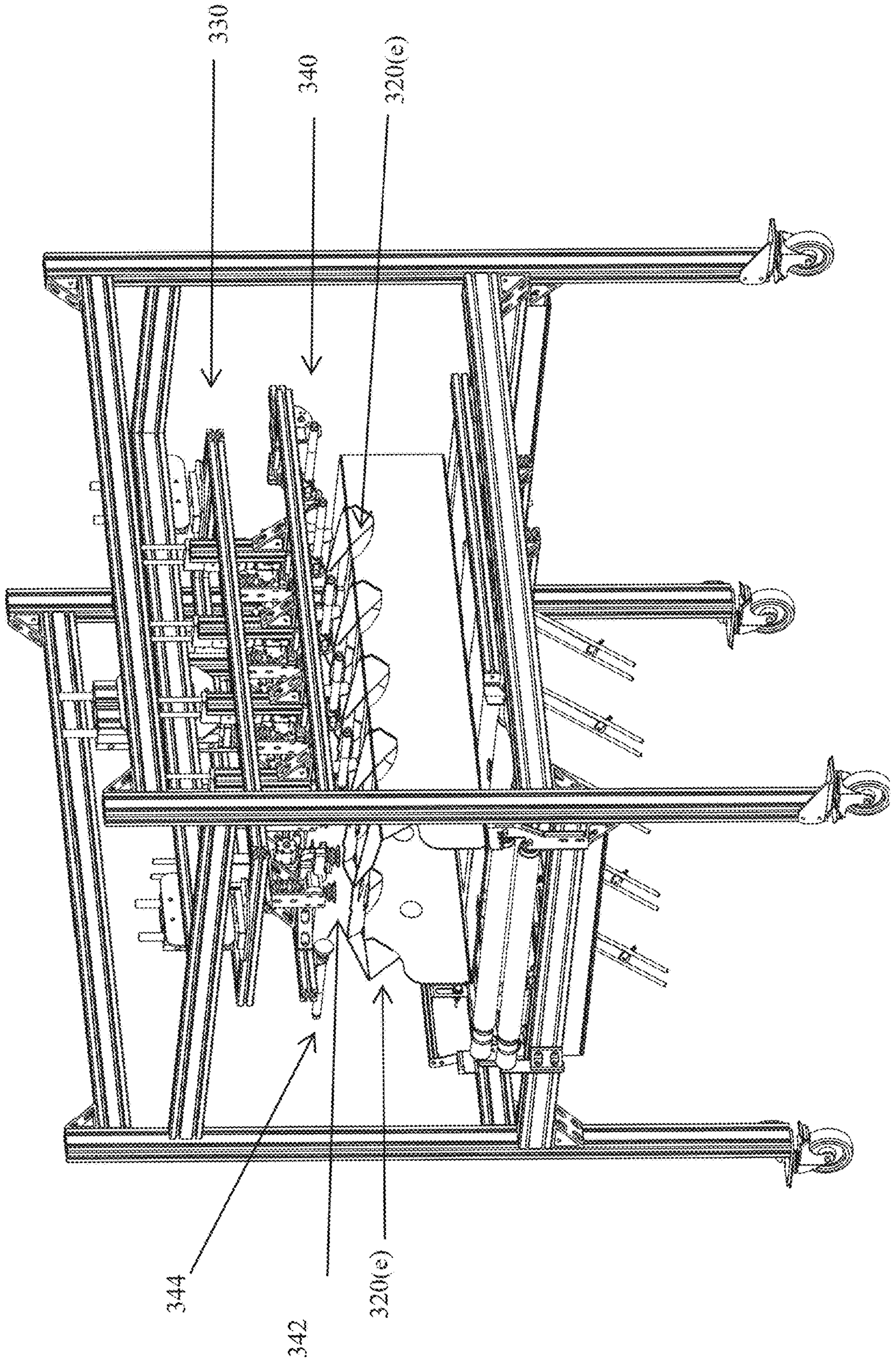
Figure 51:
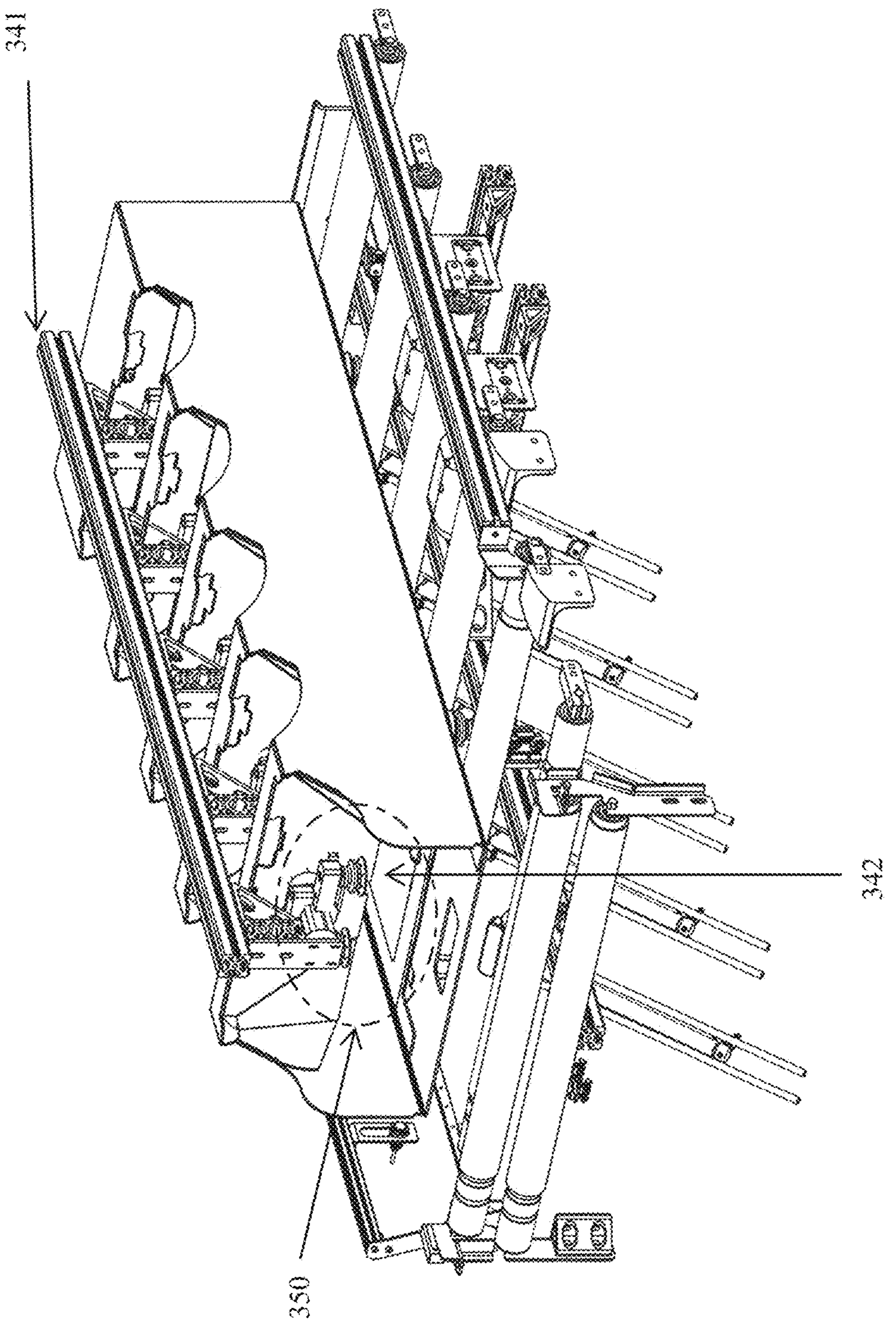
Figure 52:
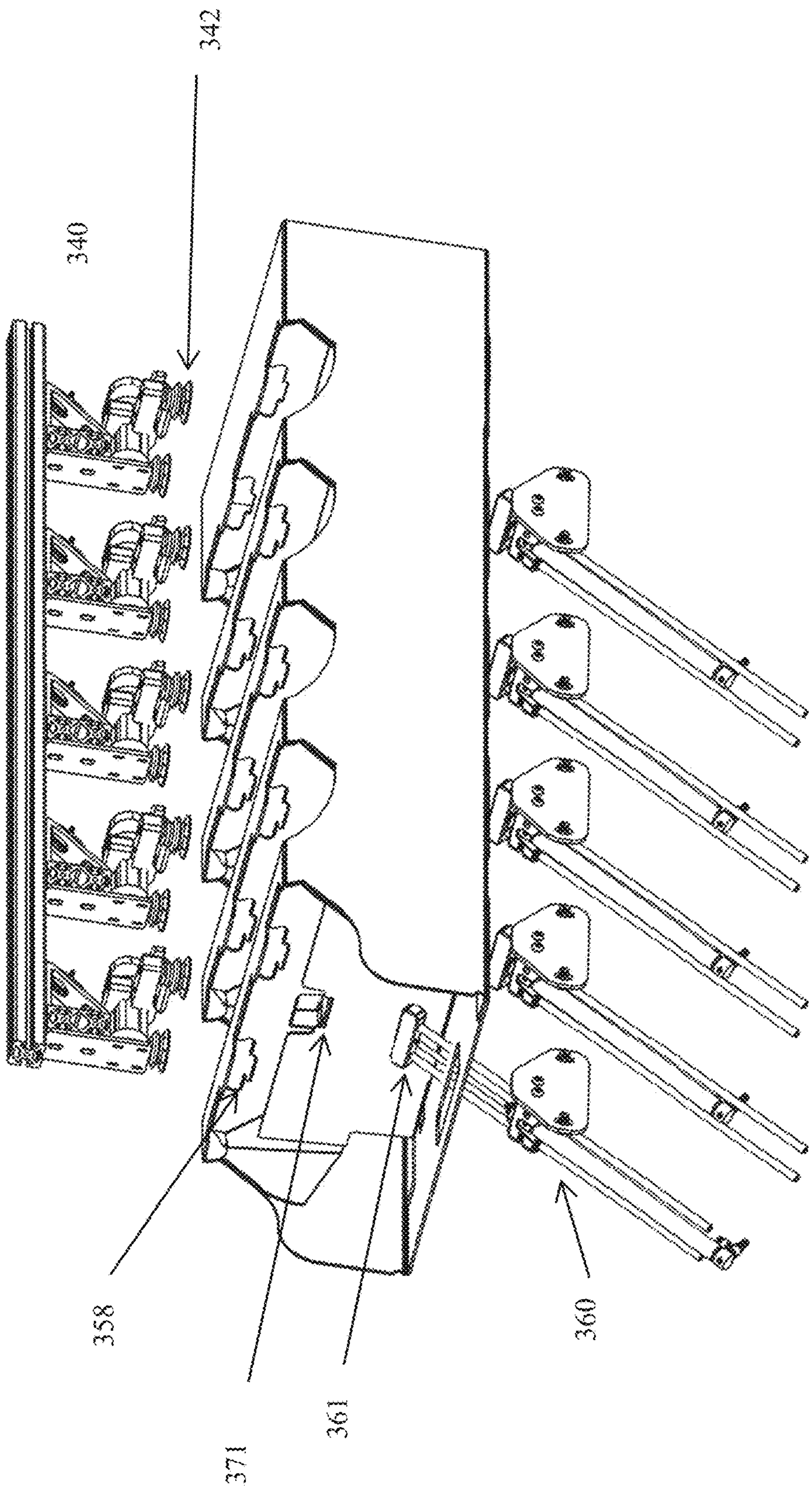
Figure 53:
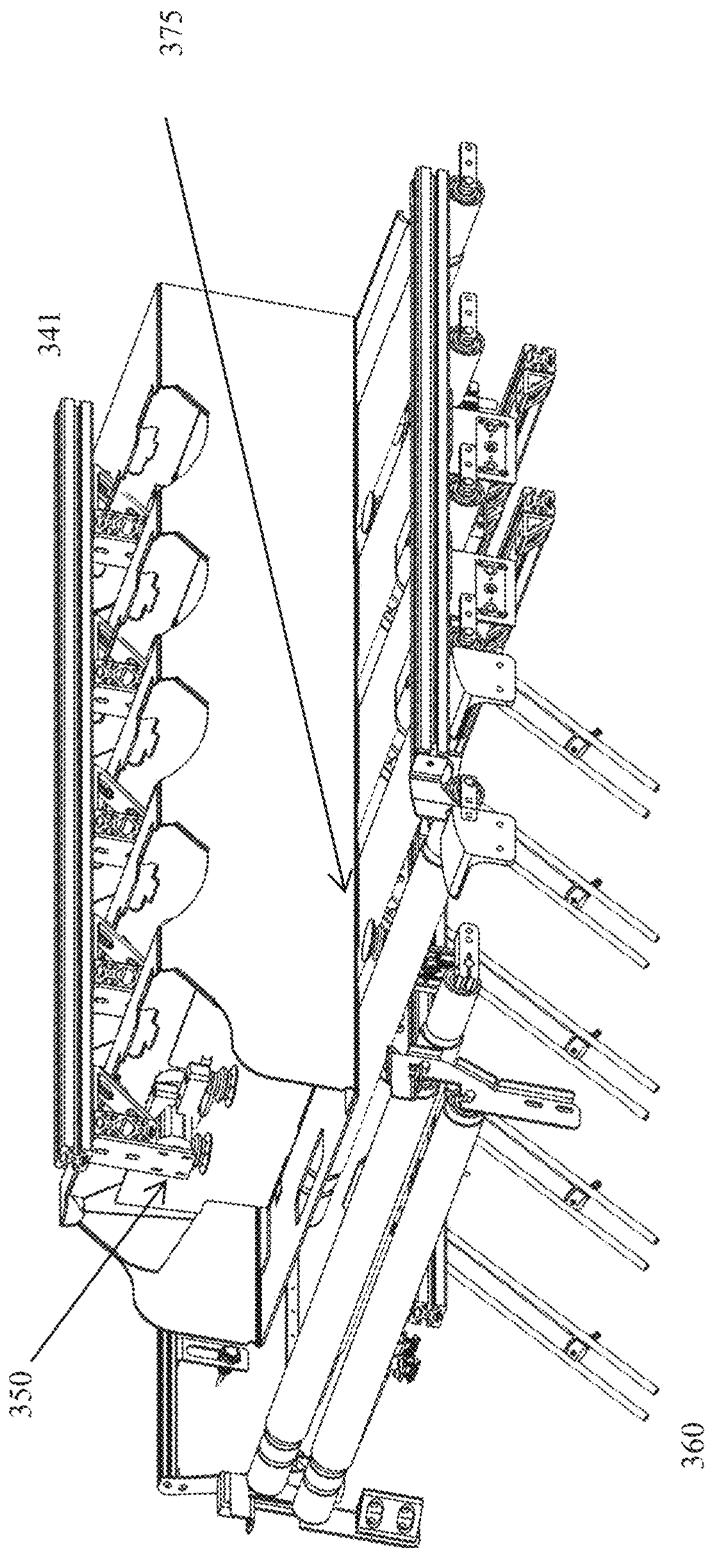
Figure 54:
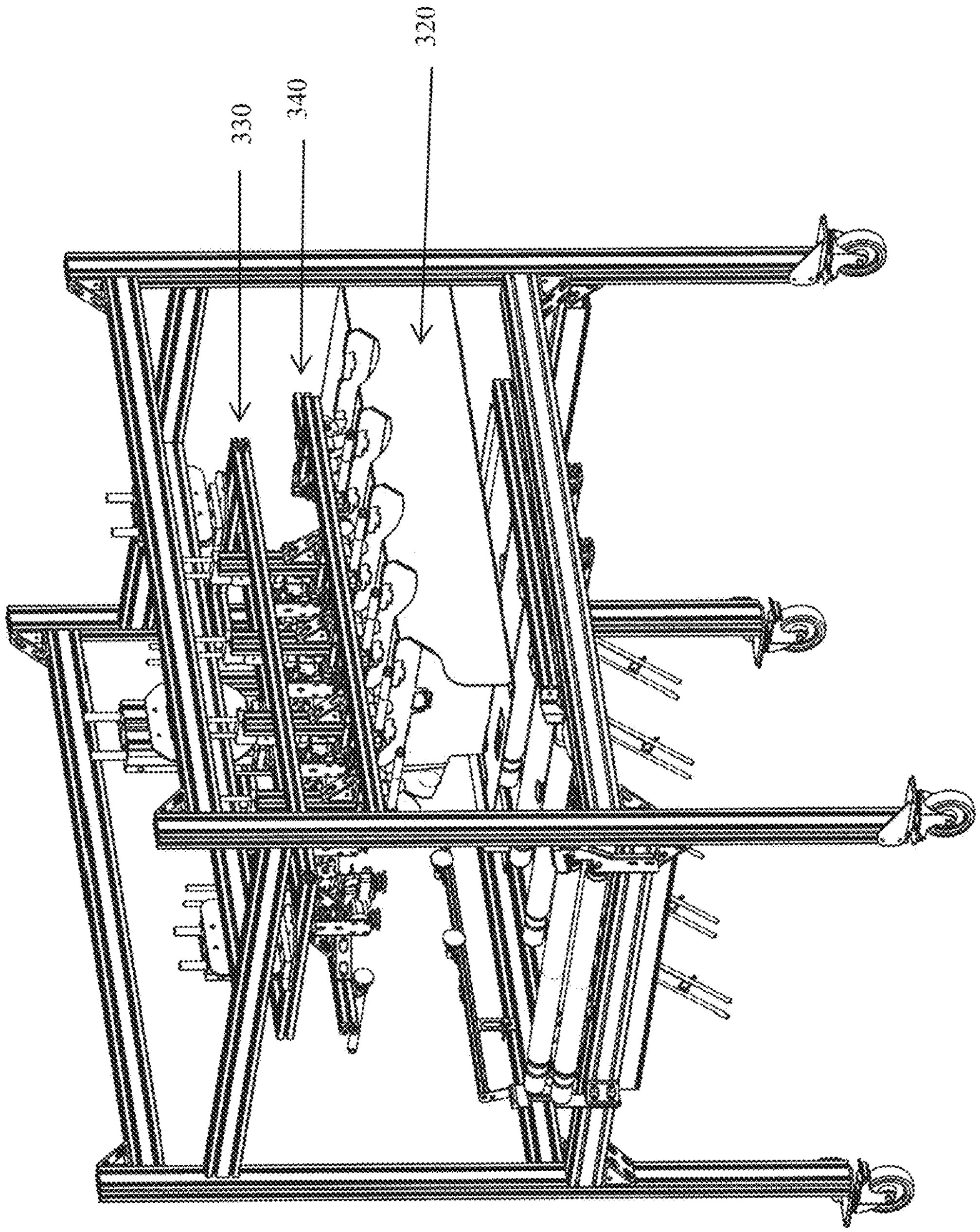

Having thus described examples of the disclosure in general terms, reference will now be made to the accompanying drawings, which are not necessarily drawn to scale, and wherein like reference characters designate the same or similar parts throughout the views. The particular objects and features of the instant disclosure as well as the advantages related hereto will become apparent from the following description taken in connection with the accompanying drawings, and wherein:

FIG. 1 is an illustration of a system for folding displays using an ADAM according to an embodiment of the disclosure;

FIG. 2 is an illustration of a system for folding displays using an ADAM according to another embodiment of the disclosure;

FIG. 3 is an illustration of an autofeeder according to an embodiment of the disclosure;

FIG. 4 is an exploded view illustration of the components of an autofeeder according to an embodiment of the disclosure;

FIG. 5 is an illustration of an ADAM for folding displays according to an embodiment of the disclosure;

FIG. 6 is an illustration of the main frame of an ADAM according to an embodiment of the disclosure;

FIG. 7 is an illustration of a bed assembly of an ADAM according to an embodiment of the disclosure;

FIG. 8 is an illustration of a drive roller assembly of an ADAM according to an embodiment of the disclosure;

FIG. 9 is an illustration of an in-feed conveyor assembly of an ADAM according to an embodiment of the disclosure;

FIG. 10 is an illustration of a conveyor roller assembly of an ADAM according to an embodiment of the disclosure;

FIG. 11 is an illustration of an injector assembly of an ADAM according to an embodiment of the disclosure;

FIG. 12 is illustration of an injector sub-assembly of an ADAM according to an embodiment of the disclosure;

FIG. 13 is an illustration of an injector bottom stop assembly of an ADAM according to an embodiment of the disclosure;

FIG. 14 is an illustration of a bottom suction assembly of an ADAM according to an embodiment of the disclosure;

FIG. 15 is an illustration of a bottom suction assembly of an ADAM according to another embodiment of the disclosure;

FIG. 16 is an illustration of an exit conveyor assembly of an ADAM according to an embodiment of the disclosure;

FIG. 17 is an illustration of an ADAM according to an embodiment of the disclosure;

FIG. 18 is an illustration of an erector assembly of an ADAM according to an embodiment of the disclosure;

FIG. 19 is an exploded view illustration of an erector arm assembly of an ADAM according to an embodiment of the disclosure;

FIG. 20 is an illustration of a main actuator assembly of an ADAM according to an embodiment of the disclosure;

FIG. 21 is an illustration of a main actuator assembly of an ADAM according to another embodiment of the disclosure;

FIG. 22 is an illustration of a side action assembly of an ADAM according to an embodiment of the disclosure;

FIG. 23 is an illustration of a left side action sub-assembly of an ADAM according to an embodiment of the disclosure;

FIG. 24 is an illustration of a side action sub-assembly of an ADAM according to an embodiment of the disclosure;

FIG. 25 is an illustration of a bottom action assembly of an ADAM according to an embodiment of the disclosure;

FIG. 26A is an illustration of a shelf rail suction assembly of an ADAM according to an embodiment of the disclosure;

FIG. 26B is an illustration of a shelf rail suction assembly of an ADAM according to another embodiment of the disclosure;

FIG. 26C is an illustration of a shelf rail suction assembly of an ADAM according to another embodiment of the disclosure;

FIG. 26D is an illustration of a shelf rail suction assembly of an ADAM according to another embodiment of the disclosure;

FIG. 27 is an illustration of a side striker assembly of an ADAM according to an embodiment of the disclosure;

FIG. 28 is an illustration of a bottom shelf rail flipper assembly of an ADAM according to an embodiment of the disclosure;

FIG. 29 is an illustration of a left bottom shelf rail flipper assembly of an ADAM according to an embodiment of the disclosure;

FIG. 30 is an illustration of an ejector mechanism of an ADAM according to an embodiment of the disclosure;

FIG. 31 is an illustration of a head actuator assembly of an ADAM according to an embodiment of the disclosure;

FIG. 32 is an illustration of a head actuator frame upper assembly of an ADAM according to an embodiment of the disclosure;

FIG. 33 is an illustration of a lower head assembly of an ADAM according to an embodiment of the disclosure;

FIG. 34 is an illustration of a head beam sub-assembly of an ADAM according to an embodiment of the disclosure;

FIG. 35 is an illustration of a head beam sub-assembly of an ADAM according to another embodiment of the disclosure;

FIG. 36 is an illustration of an back striker rail assembly of an ADAM according to an embodiment of the disclosure;

FIG. 37 is an illustration of a back striker assembly of an ADAM according to an embodiment of the disclosure;

FIG. 38 is an illustration of a control cabinet of an ADAM according to an embodiment of the disclosure;

FIG. 39 is an illustration of an ADAM external control box according to an embodiment of the disclosure;

FIG. 40 is an illustration of a pneumatic solenoid manifold assembly of an ADAM according to an embodiment of the disclosure;

FIG. 41 is an illustration of an air intake assembly of an ADAM according to an embodiment of the disclosure;

FIG. 42 is an illustration of an ADAM according to an embodiment of the disclosure;

FIG. 43 is an illustration of an empty auto feeder at a beginning of the process of using the system according to an embodiment of the disclosure;

FIG. 44 is an illustration of an autofeeder of the system after the operation of loading PPW displays into the autofeeder according to an embodiment of the disclosure;

FIG. 45 is an illustration of an autofeeder of the system after the operation of moving the PPW displays to the staged side of the autofeeder at a first height according to an embodiment of the disclosure;

FIG. 46 is an illustration of an autofeeder of the system after the operation of lifting the staged PPW displays from a first height to a second height in preparation for insertion into an ADAM according to an embodiment of the disclosure;

FIG. 47 is an illustration of the system showing the operation of aligning an autofeeder to an ADAM according to an embodiment of the disclosure;

FIG. 48 is an illustration of the system after the operation of an ADAM accepting a PPW display from the autofeeder according to an embodiment of the disclosure;

FIG. 49 is an illustration of the system showing the use of various components to erect and square the PPW display to prepare for the folding actions of the ADAM machine according to an embodiment of the disclosure;

FIG. 50 is an illustration of the system showing the operations related to the erecting and squaring of the PPW display in preparation for the folding actions of the ADAM machine according to an embodiment of the disclosure;

FIG. 51 is an illustration of the system showing the operations related to forming the shelves of the PPW display and locking them in place after the erecting and squaring operations are complete, according to an embodiment of the disclosure;

FIG. 52 is an illustration of the system showing the various components performing the operations of retracting the back striker assemblies while using the head beam assemblies to capture the back shelves and prevent them from lowering, and the locking of the back shelves into the front shelves by actuating the tab strikers to press a thumb tab connected to an each back shelf into a receiving hold of the corresponding front shelf while using the flippers to hold the front shelves in place, according to an embodiment of the disclosure;

FIG. 53 is an illustration of a system showing the operation of holding, using the bottom suction assembly, the first PPW display while retracting the tab strikers and the center head beam of the head actuator assembly along with the flippers of the erector assembly, creating an assembled PPW display, according to an embodiment of the disclosure; and FIG. 54 is an illustration of a system showing the operation of discharging an assembled PPW display according to an embodiment of the disclosure.

DETAILED DESCRIPTION

The following description of the disclosed embodiments of this disclosure is intended to enable someone skilled in the prior art to make and use that which is disclosed but is not intended to limit the claims to these particular exemplary embodiments.

At a manufacturing facility, a system for folding carboard displays using an Automatic Display Assembly Machine ("ADAM" or "ADAM machine") performs various steps to transform a stack of cardboard displays from a flattened, folded, and glued state to an assembled state.

Blank cardboard sheets are printed, die-cut, folded, glued, and compressed into flat, non-erected floor stands, known as Pre-Packaged Weekenders (PPWs). These flat PPWs are palletized and shipped to pre-pack manufacturing facilities equipped with the one or more embodiments of the systems disclosed herein including an ADAM machine and optionally, its auto-feed system.

When the PPWs arrive at the facility, they are in a folded and glued, but not assembled, state. Once processed by the ADAM machine according to embodiments of this disclosure, the PPW transforms into a fully erected and assembled floor stand, ready for use.

The disclosed embodiments include an ADAM structure optimized for function and adjustability. Core components of the ADAM machine enable it to automatically assemble various sizes of PPWs into fully erected cardboard displays. In various embodiments the ADAM comprises several key modular components including backstriker assemblies, side action assemblies, and vacuum systems, such as the erector assembly and main actuator assembly. These components work in unison to feed, position, open, fold, and secure PPWs into fully assembled displays. Each module can be adjusted independently, allowing the machine to accommodate a range of PPW sizes and configurations.

The adjustability of the ADAM machine is facilitated through its modular design, where each assembly can be independently moved within the machine's footprint. This flexibility enables the machine to handle PPWs with different numbers of pockets and sizes, making it adaptable to a wide variety of display requirements. For example, an operator can disengage and reposition various or additional components to modify the number of shelves in a PPW display. This reconfiguration can be accomplished by a single operator. The precise range of adjustability, see below Table 1, is designed to meet the diverse needs of corrugate manufacturers, addressing the inherent imprecision in cardboard folding and gluing processes.

Table 1 specifies minimum and maximum dimensions for flat folded and assembled PPWs, with an adjustability ratio linking shelf pocket height to shelf pocket depth increases. This exemplifies the ADAM machine's adaptability to a range of PPW configurations while ensuring assembly integrity. The shelf pocket height to depth adjustability ratio is 1:2. For example, if the shelf pocket height is increased from 6 inches (in the minimum fully assembled specification shown below) to 7 inches, the pocket depth can be adjusted from 6 inches to up to 8 inches, following the 1:2 ratio.

TABLE 1

| | Flat Folded (Glued) PPW Specifications | Fully Assembled PPW Specifications |
|---|---|---|
| Minimum Dimensions (L × W × D) | 20 in (L) × 12 in (W) × 0.5 in (D) | 18 in (L) × 11 in (W) × 6 in (D) |
| Maximum Dimensions (L × W × D) | 40 in (L) × 24 in (W) × 1 in (D) | 38 in (L) × 23 in (W) × 12 in (D) |

The disclosed systems using an ADAM machine represent a new approach to cardboard display assembly, notable for its modular and adjustable design that addresses the variability in complex floor stand production. Its unique capability to gently yet precisely manipulate expensive cardboard materials without causing damage sets it apart in the market. The enclosed embodiments not only fill a niche for assembling patented display designs but also exemplifies innovation in handling the complexities and tolerances associated with cardboard manufacturing. The systems including ADAM development and associated operational methodology offer a solution previously unavailable, directly responding to a significant industry need for flexible, efficient, and precise assembly machinery.

Embodiments of this disclosure are designed to easily integrate with known packout processes in the industry. The ADAM machine streamlines the preparation of PPW displays for the packout process by efficiently assembling and erecting displays that are then filled with product. Its precision and adjustability ensure that the PPWs are correctly formatted to accommodate the specific packing requirements, enhancing the efficiency and productivity of the manual filling process on assembly lines by co-packers.

The systems with ADAM machine prepare PPWs in a way that they are ready for immediate use by known networks of co-packers, who receive the ready to fill, assembled PPWs for the packout process. The ADAM machine's output is optimized for ease of handling, filling, and further processing, ensuring that the co-packers can efficiently execute their assembly line tasks without the need for additional adjustments or preparations.

The design and operation of the systems including the ADAM machines contribute to the overall efficiency and effectiveness of the packout process, from the assembly of PPWs to their distribution. By producing ready-to-use PPWs that seamlessly fit into the packout process, the systems with an ADAM machine directly contribute to operational efficiencies, including labor optimization for co-packers and streamlined workflows. The system's output-fully erected displays-facilitates quick filling, overpacking, and palletization, ultimately speeding up the time from production to distribution.

The disclosed systems have been designed for economic and operational efficiency. For example, the ADAM machine significantly cuts labor needs by reducing the required operators from three to one, directly lowering labor costs and assembly time for PPW displays. This single operator can load, monitor, and manage the automated assembly process, which is faster and more efficient than systems utilized by those in the industry and manual methods.

While the ADAM machine requires manual adjustments to handle different PPW sizes, its design allows these changes to be made within its existing footprint. This versatility avoids the need for multiple machines for different sizes, representing savings in equipment costs and space. Although reconfiguring for new sizes involves labor, the machine's flexibility in accommodating these changes without additional equipment investment remains a significant economic advantage.

The ADAM machine minimizes material waste by ensuring precise assembly of PPWs, reducing errors that can lead to waste. This precision, even with manual adjustments for size changes, maximizes material usage and contributes to both cost savings and environmental benefits.

The ADAM machine incorporates several safety features, such as neutralizing the air system when emergency stops ("e-stops") or safety guards are activated. Non-contact safety sensors trigger these stops, ensuring that pressurized air is eliminated to prevent unintended movements. Safety guarding, including doors and removable panels, allows secure access for maintenance without risking operator safety. Ergonomically, the machine and its components, including the autofeeder system, are designed with mobility in mind, equipped with wheels and handles for easy positioning and alignment, enhancing both safety and comfort during operation.

The design of the ADAM machine's components and the applied forces during the PPW assembly process are carefully calibrated. This ensures that in scenarios where components might misalign or touch, they do not cause significant or catastrophic damage to the displays. Instead, the system is designed to retract and reset without harming the PPW. The operational pressures and actions are precisely managed to fold the display correctly without exerting excessive force, preventing tearing or other damage, ensuring the integrity of the final product while maintaining high operational standards.

The ADAM machine enhances sustainability efforts by offering a consistent and efficient assembly process for PPWs. This consistency allows for precise labor force planning, projections of completion times, and cost assessments per display, making resource allocation more predictable and efficient. By automating the assembly process the ADAM machine improves operational reliability, contributes to sustainability by optimizing labor, and reduces waste through consistent folding and assembly practices.

The ADAM machine is distinguished by its exceptional energy efficiency. Operating on a standard 110-volt outlet, it consumes a fraction of the energy compared to traditional cardboard display formers. Despite the complexity of its operations and the size of the PPWs it assembles, its energy usage remains minimal, showcasing its superiority in the field. This efficiency is a significant step towards reducing the environmental impact of packaging operations.

The pneumatic system of the ADAM machine is designed for high efficiency, using Venturi® valves to create strong vacuum pressure with minimal air flow—requiring only one to two cubic feet per minute (CFM) per cycle, with a maximum flow rate of 30 CFM. This optimized use of air not only reduces energy consumption but also minimizes the environmental footprint of the assembly process.

FIG. 1 illustrates a block diagram of a system for folding displays using an ADAM, according to an embodiment of the disclosure. As shown in FIG. 1, the system (100) includes an autofeeder (102), an ADAM machine (104), an electrical system (120), and a pneumatic system (122). In another embodiment of the system, these components may be interconnected by a wireless network (not shown).

FIG. 2 illustrates a block diagram of a system for folding displays using an ADAM, according to another embodiment of the disclosure. As shown in FIG. 2, system (200) includes a number of assemblies, including an autofeeder assembly (202), an erector assembly (204), a bottom suction assembly (206), an injector assembly (208), an ejector assembly (210), a main actuator assembly (212), a head actuator assembly (214), a bed assembly (216), a framework assembly (218), an electrical cabinet assembly (220), and a pneumatic distribution assembly (222). Each of these assemblies interact with each other to perform the operations of erecting, squaring, folding, and ejecting the PPW displays as further explained below.

Turning now to FIG. 3, we see an empty autofeeder (302) according to an embodiment of the disclosed system. In various embodiments, autofeeder (302) may be the autofeeder 102 of the system displayed in FIG. 1 or autofeeder 202 of the system shown in FIG. 2. FIG. 4 is an exploded view illustration showing the key components of an autofeeder, such as autofeeder 302 in FIG. 3. These components include a push plate assembly 303, $Z_1$ lift paddle assembly 304(*a*), $Z_2$ lift paddle assembly 304(*b*), and an autofeeder PPW injector mechanism 306. The functionality of these components will be further described in relation to FIGS. 43 to 47; however, they serve to automatically load the flattened, un-erected PPW display into the ADAM machine.

FIG. 5 illustrates an empty ADAM machine according to an embodiment of the disclosure. In various embodiments, this ADAM 500 may be ADAM 104 from FIG. 1, and it may be the combination of some of the assemblies shown in FIG. 2. The ADAM includes a conveyor roller system 512, an external control box 513, an electrical cabinet 514, and a pneumatic solenoid assembly 515. These components are further described below.

FIGS. 6 through 42 detail the various assemblies, subassemblies, and other components of the disclosed ADAM machine components and embodiments. FIG. 6 depicts ADAM Main Frame 600, including a vertical side corner beam 602 in each corner of the frame, a piston mount beam 603, and a side beam 604.

FIG. 7 illustrates a bed assembly 700 of an ADAM machine. In an embodiment, the bed assembly 700 includes main bed mounting beam 710, drive roller assembly 702, in-feed conveyor assembly 760, in-feed roller deflector 712, bottom suction assembly 714, injector assembly 715, conveyor roller assembly 719, squaring bar 718, injector bottom stop assembly 716, ejector deflector 717, and a number of photo eyes. In an embodiment, the ADAM bed assembly may include in-feed photo-eye 738 and staged photo-eye 739.

FIG. 8 illustrates an isolated, close-up view of a drive roller assembly 800, which in some embodiments, may be drive roller assembly 702 in FIG. 7. As shown, the drive roller assembly 800 includes a roller 704, a roller cover 705, a conveyor motor mount 703, and a universal conveyor mount 706.

Referring now to FIG. 9, an isolated, close-up view of in-feed conveyor assembly 900 is depicted. In an embodiment, in-feed conveyor assembly 900 may be in-feed conveyor assembly 760 in FIG. 7, and it may include multiple conveyor rollers 762, with respective sleeves 763 positioned over each one. The conveyor rollers are connected on each side to side-guide wheels 767 with corresponding front mount plates with rollers 764 which are connected to respective gussets 766.

FIG. 10 illustrates an isolated, close-up view of a conveyor roller assembly 1000. In an embodiment, conveyor roller assembly 1000 may be the same as conveyor roller assembly 719 in FIG. 7 and includes a round groove conveyor roller 772 fit with a sleeve 771 positioned thereover. The round groove conveyor roller 772 may be attached to bed roller 770 on one side and mounted to a universal conveyor mount 773 at both ends.

Referring now to FIG. 11, an isolated, close-up view of an injector assembly 1100 is depicted. In an embodiment of the disclosure, injector assembly 1100 may be the same as injector assembly 715 in FIG. 7. The injector assembly includes a number of injector sub-assemblies 720 mounted to injector side beam 722 on a back side by an injector angle mount 728 and mounted to an injector piston mount beam 708 (such as shown in FIG. 7) using injector piston mount plate 726. Injector deflector 721 is positioned at an end of injector side beam 722. In an embodiment of the disclosure, injector deflector 721 may be the same as the in-feed roller deflector 712 shown in FIG. 7. The injector pistons (see below description of FIG. 12) actuate when the PPW display has made it all the way to the staging position via the conveyor rollers. The purpose of the injector assembly is to move the PPW display to the staging area against the squaring bar, a perpendicular motion to the conveyor roller in-feed motion.

FIG. 12 illustrates an isolated, close-up view of an injector sub-assembly 1200 according to an embodiment of the disclosure, which in some embodiments may be the same as injector sub-assembly 720 depicted in FIG. 11. As shown in FIG. 12, injector sub-assembly 1200 includes injector piston 725, injector cover 727, injector angle mount 728 for mounting the injector piston 725 to an injector side beam (such as injector side beam 722 in FIG. 11), and injector piston mount plate 726 for mounting the injector piston 725 to an injector piston mount beam (such as 708 in FIGS. 7 and 11).

Referring now to FIG. 13, an isolated, close-up view of an injector bottom stop assembly 1300 is illustrated. In an embodiment, injector bottom stop assembly 1300 may be the same as injector bottom stop assembly 716 shown in FIG. 7. This assembly includes injector bottom stop gate 731, bottom stop injector plate 732, and stop gate piston 730 mounted to an underside of the bottom stop injector plate 732. In an embodiment, injector bottom stop gate 731 and bottom stop injector plate 732 are integral with each other. Generally speaking, the injector bottom stop assembly 1300 is used to create a stop plate staging area for PPW staging when the displays are being fed through the in-feed conveyor assembly (for example, in-feed conveyor assembly 900 in FIG. 9).

FIG. 14 illustrates a bottom suction assembly 1400 according to an embodiment of the disclosure. Bottom suction assembly 1400 may be the same as bottom suction assembly 714 in FIG. 7, and it may include an upward facing vacuum cup 735 disposed on top of a suction mount 736. Reference number 737 is a cap securing the vacuum cup assembly 735 to the housing suction mount 736. Reference number 738 is the piston. Vacuum cup 735 is connected to a pneumatic distribution assembly (such as pneumatic distribution assembly 222 in FIG. 2) and the fitting receives air lines from the pneumatic air system. FIG. 15 provides a slightly different view of a bottom suction assembly 1500, which may be similar or the same as bottom suction assembly 1400 in FIG. 14 and/or bottom suction assembly 714 in FIG. 7.

FIG. 15 illustrates a bottom suction assembly 1500 which may be the same as bottom suction assembly 1400 in FIG. 14, but from a different angle. It may also be the same as bottom suction assembly 714 in FIG. 7. As illustrated here, bottom suction assembly 1500 includes an upwards facing vacuum cup 745 positioned atop suction mount 746. It further includes 747 which is a cap securing the vacuum cup to the housing/suction mount (for example, reference number 737 in FIG. 14) and 748 is a piston (for example, piston 738 in FIG. 14).

Referring now to FIG. 16, an isolated, up-close view of an exit conveyor assembly 1600 is illustrated. While the exit conveyor assembly is not depicted in the bed assembly 700 of FIG. 7, it would be positioned along the main bed mounting beam 710 at an end opposite from the in-feed conveyor assembly 760 on a far side of the injector bottom stop assembly 716 relative to the in-feed conveyor assembly. As shown in FIG. 16, the exit conveyor assembly 1600 includes exit conveyor cross beam 752 mounted to left and right conveyor side beams, 751 and 750, respectively, on opposite ends thereof to create what looks like an "H" frame. One round groove conveyor roller 756 is positioned between the left and right conveyor side beams above the exit conveyor cross beam 752, and two round groove conveyor rollers, 755*a* and 755, respectively, are positioned between the left and right conveyor side beams below the exit conveyor crossbeam. In an embodiment, each of the round groove conveyor rollers has a sleeve around it 757*a* and 757*b*, respectively. A pivot lock is positioned on each of the left and right conveyor side beams, 759 and 758, respectively, at a position slightly closer to the exit conveyor crossbeam 752 than the farthest round groove conveyor roller 755 is. The exit conveyor assembly is parallel with the main bed beams and the pivot lock is designed for raising the exit conveyor for transport, as it can be lowered and locked with the pivot lock handle. A gusset 753 is mounted to an inside edge of the left and right conveyor side beams below the lowest positioned round groove conveyor roller 755 and connects to a main frame beam shown in FIG. 6.

FIG. 17 shows an isolated, close-up view of a system 1700 including an erector assembly 880 and surrounding assemblies, according to an embodiment of the disclosure. In FIG. 17, the PPW display will be received from an autofeeder (not shown) by the in-feed conveyor assembly 860 which is depicted on the far left (as compared to the view illustrated in FIG. 7 which depicts the system with the displays being inserted into the in-feed conveyor assembly 738 on the far right side of the figure). FIG. 17 further includes bottom suction assembly 814, injector assembly 815, and injector bottom stop assembly 816, which in some embodiments, may correspond to bottom suction assembly 714, injector assembly 715, and injector bottom stop assembly 716 in FIG. 7. A number of photo eyes are distributed throughout the erector assembly 880. These include in-feed photo eye 838, erect-check/orientation photo eye 861, staged photo eye 839, and exit photo eye 871. System 1700 further includes ejector assembly 862, erector assembly 880 including erector piston assembly 890, side action assembly beam 870, and squaring bar 818. Each of these components will be further described in close up views detailed below.

Turning now to FIG. 18, we see an isolated, close-up view of an erector assembly 1800. In an embodiment, this may be the same erector assembly 880 illustrated in FIG. 17. The erector assembly 1800 includes an erector suction beam 884 (called the side action assembly beam 870 in relation to FIG. 17) with an erecting assembly front edge 885 and an erecting assembly rear edge 881. Erector piston assembly 890 is mounted to the erecting assembly front edge 885 and a second erector piston assembly 890(*a*) is mounted to the erecting assembly rear edge 881. Erector piston assembly 890 is further detailed in FIG. 19. Along the length of the erector suction beam 884 are mounted a number of suction cup mounts 889 and a suction valve assembly 888. In an embodiment, suction valve assembly 888 is a Venturi® valve and it is used to help generate suction for the vacuum cups. Also disposed along the erector suction beam are exit photo eye 882 mounted to the beam by photo eye mount 883 and erect check/orientation photo eye 887 mounted to the beam via an adjustable photo eye mount 886.

FIG. 19 illustrates an exploded-view of an erector arm assembly 1900 according to an embodiment of the disclosure. As referenced above, erector arm assembly 1900 may be the same as erector piston assembly 890 in FIG. 18. As shown in FIG. 19, the erect arm assembly includes an erector arm 891, attached to erector piston 895 at a first end, and attached to actuator mount plate 892 via erector bearing 893. At an opposite end of the erector piston 895 is a pivot bracket with pin 896. The erector arm assembly 1900 further includes various nuts, bolts, screws or fasteners (not named or necessarily shown herein this figure).

Turning now to FIG. 20, we see a main actuator assembly 2000 of an ADAM machine illustrated in an isolated, up-close view. The main actuator assembly includes multiple main actuator beam pistons (901) and 901(*a*) and corresponding to main actuator beam piston mounts 902 and 902(*b*).

Similarly, FIG. 21 illustrates a main actuator assembly 2100 of an ADAM machine, depicted in an isolated, up-close view. This illustration shows left side action assembly 910 and right side action assembly 912. Also shown are mounting side beam 908, lateral mounting beam 905, and main actuator beam piston and mount assembly 906. Mounting side beam 908 and lateral mounting beam 905 form the frame for the side action assemblies which ultimately connects all the assemblies to the main actuator pistons. FIG. 22 shows an isolated, up-close view of a left side action assembly 2200. In an embodiment, left side action assembly 2200 may be the same as left side action assembly 910 in FIG. 21. Left side action assembly 2200 includes mounting side beam 916, lateral mounting beam 915, and a number of left side action sub-assemblies 914.

FIG. 23 provides an isolated, up-close view of a side action sub-assembly 2300, which in an embodiment of the disclosure may be the same as left side action sub-assembly 914 in FIG. 22. Referring to FIG. 23, we see side action sub-assembly 2300 includes slide piston 918 attached to a flipper piston mount plate 919, a D-Hub 920 disposed thereunder mounts the flipper to the rotary piston shaft, and a rotary actuator 922 mounted to rotary actuator mount 921. Flipper 923 is disposed under the rotary actuator and is adjacent to rail suction mount 925 with shelf rail vacuum cup 924 attached thereto. Horizontal beam 926 is positioned perpendicular to vertical beam 930 and a gusset 929 connects the two beams together. Another gusset 929 is mounted on a side of the horizontal beam 826 and mounts the side action assembly 2300 to a mounting side beam (for example mounting side beam 916 in FIG. 22 or mounting side beam 908 in FIG. 21). FIG. 23 further includes side striker assembly 927 which will be detailed further in relation to FIG. 27.

FIG. 24 illustrates a side action assembly 2400 according to another embodiment of the disclosure. Side action assembly 2400 includes flipper stroke piston 932 disposed above and adjacent to flipper rotary piston 934. The flipper rotary piston is configured to move flipper 936 to perform certain folds in the folding process. Such folding operations are further described below in reference to FIGS. 43 through 54. Flipper 936 is a stainless steel bracket. FIG. 24 further illustrates bottom action assembly 938 as shown in the dotted circle, including erector deflector 939, and side striker cylinder 940.

FIG. 25 is an isolated, close-up view of the bottom action assembly 2500 identified in FIG. 24 as 938. The bottom action assembly 2500 comprises portions of a right side action assembly 943 and left side action assembly 948, and a bottom shelf rail flipper assembly 945, including bottom flipper 941, bottom flipper vacuum cup 947, and a bottom flipper venturi (not shown). Erector deflector (not shown) is mounted to a bottom of the horizontal beam of the right side action assembly. The bottom action assembly further includes right and left side striker assemblies, 942 and 949, respectively.

FIGS. 26(*a*), 26(*b*), 26(*c*), and 26(*d*) illustrate isolated, close-up views of embodiments of a shelf rail suction assemblies. FIG. 26(*a*) depicts a downward facing suction cup 950(*a*) mounted to a rail suction mount 952(*a*). Similarly, FIG. 26(*b*) illustrates suction cup 950(*b*) mounted to an underside of rail suction mount 952(*b*). FIG. 26(*c*) depicts a suction cup 950(*c*) mounted to an underside of rail suction 952(*c*), and FIG. 26(*d*) illustrates suction cup 950(*d*) mounted to an underside of rail suction mount 952(*d*). In an embodiment, the shelf rail suction assembly or one or more of FIGS. 26(*a*) through 26(*d*) may the combination of shelf rail vacuum cup 924 mounted on rail suction mount 925 as shown in FIG. 23.

Referring to FIG. 27, an isolated, up-close drawing of a side striker assembly 2700 is depicted. The side striker assembly includes side striker ball 954 connected to a side striker cylinder 956 through a bracket 955 using a nut 957 and jam nut 958. In an embodiment, side striker assembly 2700 may be the same as one or more of right side striker assembly 949 and left side striker assembly 942 in FIG. 25. In another embodiment, side striker assembly 2700 may be the same as side striker assembly 927 in FIG. 23.

FIG. 28 is an isolated, close-up illustration of a bottom shelf rail flipper assembly 2800 according to an embodiment of the disclosure. Bottom shelf rail flipper assembly 2800 includes flipper mount beam 970 positioned perpendicular to vacuum cup rail 967. Vacuum cup 963 is mounted to the right side vacuum cup rail 967 via right side rail suction mount 966. Moreover, bottom flipper vacuum cup 961 and bottom flipper venturi 962 are connected to bottom flipper 965. Also connected to the flipper is D-hub 971, rotary actuator 960, and rotary action mount plate 969. The bottom shelf rail flipper assembly further includes left side rail suction mount 975 mounted on one end to the left side vacuum cup rail 977 and having a downward facing vacuum cup 976 disposed on the opposite end. Gusset 978 is also attached to left side vacuum cup rail 977.

FIG. 29 shows an isolated, close-up illustration of a bottom flipper assembly 2900 according to an embodiment of the disclosure. FIG. 29 includes bottom flipper vacuum cup 981 connected to bottom flipper 984 at a first end of the flipper. A back side of the vacuum cup is connected to a venturi valve 985 for flow of air from the pneumatic distribution assembly to or from the vacuum cup. Attached to the other end of the flipper is D-Hub 982, rotary actuator 980, and rotary action mount plate 983.

FIG. 30 is an isolated, up-close illustration of an ejector mechanism 3000 according to an embodiment of the disclosure. In an embodiment, ejector mechanism 3000 is the same as ejector assembly 862 in FIG. 17. As shown here, the ejector mechanism includes an ejector 658, an ejector bracket 660, and a ball bearing carriage 654 positioned on one end and a bracket 650 on an opposite end. Brackets 650 and 652 mount to a main frame beam from FIG. 6. Ball bearing carriage 654, ejector 658, and ejector bracket 660 all transverse down the linear guide rail 653 using the piston rod.

FIG. 31 is an isolated, up-close illustration of a head actuator assembly 3100 according to an embodiment of the disclosure. The head actuator assembly includes head actuator frame upper assembly 402 and lower head assembly 410. Head actuator frame upper assembly 402 includes head actuator frame assembly 404, and main head beam 406. Lower head assembly 410 includes center beam 412 and multiple head beam sub-assemblies 414 attached on an under side of the center beam.

FIG. 32 is an isolated, up-close illustration of a head actuator frame upper assembly 3200 according to an embodiment of the disclosure. As shown in FIG. 32, this includes piston 430 mounted to main head beam 420 using head beam piston mount plate 422. Head beam mount plate 428 and head mount spacer plate 426 are positioned under the piston 430. The head mount spacer plate 426 is connected to the center beam of the lower head assembly as detailed in FIG. 33.

FIG. 33 shows an isolated, up-close illustration of a lower head assembly 3300, according to an embodiment of the disclosure. In this figure, multiple head beam sub-assemblies 434 are attached to a bottom facing surface of center beam 432.

FIG. 34 illustrates an isolated up-close illustration of a head beam sub-assembly 3400 according to an embodiment of the disclosure. In an embodiment, head beam sub-assembly 3400 may be the same as head beam sub-assembly 434 in FIG. 33. In another embodiment, head beam sub-assembly 3400 may be the same as head beam sub-assembly 414 in FIG. 31. As shown in FIG. 34, head beam sub-assembly 3400 includes a tab striker 450, tab striker piston 444, head suction housing 448, and suction cup 446. It further includes Venturi® value 454 with a push to connect tube fitting with universal thread on each end thereof, 456 and 452. The head beam sub-assembly is mounted to the underside of the center beam as shown in FIG. 33 via gusset 440. Adjacent to the gusset 440 and above the tab striker is a tab striker piston mount 442 that is used to mount the tab striker in place.

FIG. 35 is an isolated, up-close view illustration of a head beam sub-assembly 3500, according to another embodiment of the disclosure. The head beam sub-assembly may also be referred to as a tab striker assembly. As shown in FIG. 35, head beam sub-assembly 3500 includes tab striker 470 with tab striker piston 468. Front shelf pickup housing bottom 472 and front shelf pickup housing top 466 work by clamping onto the tab striker piston (which is mounted to the plate 462) and provides mounting for the head vacuum cups. The cups are used to grab the face of the display (front shelf) and act upon it. The head beam sub-assembly further includes valve 464, gusset 460 which is used for mounting to a downward facing surface of the center beam, and tab striker piston mount 462. Valve 464 may be a Venturi® valve.

FIG. 36 is an isolated, close-up illustration of a back striker rail assembly 3600, according to an embodiment of the disclosure. As shown here, the back striker rail assembly includes main bed mounting beam 530 which has a number of back striker assemblies 532 mounted thereto.

FIG. 37 provides an isolated, up-close illustration of a back striker assembly 3700 according to an embodiment of the disclosure. In an embodiment, back striker assembly 3700 is the same as back striker assembly 532 in FIG. 36. Referring to FIG. 37, the back striker assembly includes a back striker puncher 544, a piston 542, and a back striker plate 540. The back striker plate 540 is what mounts the back striker assembly to the main bed mounting beam, for example, main bed mounting beam 530 in FIG. 36. Reference number 546 is a steel guide rod (Qty: 2), which are used to reinforce the piston during action and guide the effector (back striker head) preventing rotation.

FIG. 38 shows an isolated illustration of an ADAM control cabinet 3800 according to an embodiment of the disclosure. In an embodiment, control cabinet 3800 may be the same as electrical cabinet 514 shown in FIG. 5. The control cabinet includes an electrical cabinet 560 with a latch 566. A wire duct 562 runs wires from an inside of the cabinet, an alarm system 564, and an LED stack light 570 are positioned on an outside of the electrical cabinet and operate to warn a user or operator as to a hazardous condition inside the electrical cabinet. There is also an emergency stop button 571 which can be pressed by an operator in an emergency situation to stop the system from operating. The emergency stop button opens two Allen Bradley (AB) safety contactors that are wired with cross fault detection, also integrating into a cross fault detecting relay control module (Dold). Stated differently, the safety system has two separate loops. The loops are interdependent with physical contactors and state logic driven by a Dold safety relay. The physical AB contactors interrupt power supply to actionable outputs like relays, solenoids, and motor controls. The Dold relay informs the programmable logic controller ("PLC") of state logic, and the PLC then processes the logic through the program acting accordingly (e.g. it sets all output controls states Null, goes into Emergency Stop loop). The E-Stop loop runs continuously until the emergency stop cross fault loops are closed again (physical circuits closing through AB), and the yellow button is pressed (reset logic circuit through Dold relay), which then changes the state logic sent the PLC, which the PLC then acts accordingly by exiting the Emergency Stop loop and checking current states.

Referring now to FIG. 39, an isolated, close-up view of the control box 3900 is provided. In an embodiment, control box 3900 may be the same as external control box 513 shown in FIG. 5. As shown in FIG. 39, the control box 3900 includes an enclosure 576 which is mounted to the ADAM machine (for example as shown in FIG. 5) via control box mount 575. In an embodiment, enclosure 576 may be an aluminum corrosion-resistant washdown enclosure. The control box comprises a number of buttons including a Start button 578, a Reset button 577, a Stop button 579, a light/alarm button 580, an Emergency Stop button 581, and a bulkhead cord grip 582 for the electrical controls.

FIG. 40 is an isolated, up-close illustration of a pneumatic solenoid assembly 4000, according to an embodiment of the disclosure. In an embodiment, pneumatic solenoid assembly 4000 is the same as pneumatic solenoid assembly 515 in FIG. 5. As shown in FIG. 40, manifold 614, manifold 612, and manifold 612, and manifold 610, respectively, are attached to a mount plate 616. Valve 628 in FIG. 41 has two outlets-one feeds into the port number 613 in FIG. 40 fitting on manifold 614, the other outlet feeds manifold 610. Manifolds 614, 612, and 610 daisy chain together through 613 fittings on either ends. In various embodiments, pneumatic components of the disclosed system can be found in one or more of the injector assembly, the erector assembly, the main actuator assembly, the back striker assembly, and/or in the side action assemblies. In an embodiment, pneumatic components may include the injector piston in FIG. 12 and/or the stop gate piston and injector piston of the injector assembly. In another embodiment, the pneumatic components include one or more of erector pistons 895 (as shown in FIG. 19), erector vacuum assemblies using venturi valves for suction, bottom vacuum pistons (bottom flipper venturis 962), bottom vacuum assemblies using venturi valves for suction, and ejector piston 658 is used to eject the display after the fold is completed. In an embodiment, pneumatic components may include main actuator assembly pistons 901(*a*) and 901(*b*). In an embodiment, pneumatic components may include head main actuator piston 430 (as shown in FIG. 32), tab striker pistons 444 as included in each of the head beam sub-assemblies (and as shown in FIG. 34), and head vacuum assemblies using venturi valves for suction 454 as included in each of the head beam sub-assemblies (and as shown in FIG. 30). In another embodiment, pneumatic components may include back striker pistons 542 (as shown in FIG. 37). In an embodiment, the pneumatic components may include rail vacuum assemblies using venturi valves, bottom shelf vacuum XXX in FIG. XX which is used to hold the bottom shelf as it doesn't have a shelf support rail to prevent rebounding, side striker pistons, flipper stroke pistons (8 for shelf support rails and 1 for holding the bottom front shelf to prevent a collision with the back shelf when the back strikers actuate.

FIG. 41 is an isolated, up-close illustration of an air intake 4100, according to an embodiment of the disclosure.

The air intake 4100 includes components 620, 624, 626, and 628, attached to the ADAM via brackets 622. 620 is a shut off dump valve which operates to stop the flow of air on the intake when the lever is pulled and it purges the outlet side. Reference number 624 is a filter/regulator which filters the air for oil and particulates, and regulates the pressure. Reference number 626 is a soft start dump valve which ramps up pressure after solenoid activation, and dumps the outlet air when the solenoid is deactivated. Finally, reference number 628 is a 4-way valve with two push to connect fittings for ⅜ trunk lines feeding the solenoid manifold arrays in FIG. 40.

FIG. 42 illustrates an ADAM machine including a control box 690, air intake controller 692, pneumatic solenoid assembly 694, and control cabinet 696. In an embodiment, the control box 690 may be the same as control box 3900 in FIG. 39. In an embodiment, the air intake controller 692 is the same as the air intake controller 4100 in FIG. 41. In an embodiment, the pneumatic solenoid assembly 694 is the same as the pneumatic solenoid assembly 4000 in FIG. 40. In an embodiment, the control cabinet 696 is the same as the control cabinet 3800 in FIG. 38.

FIGS. 43 through 54 illustrate the process of folding PPW displays using a system with an ADAM, according to an embodiment of the disclosure. The process starts with an empty autofeeder 310 as shown in FIG. 43. As shown in FIG. 44, a number of flat PPW displays 320 are loaded into the autofeeder 310 on the "load side" (x). In an embodiment, the number of PPW displays can be 40 displays. In other embodiments, the number of PPW displays can be more or less than 40 displays.

Referring now to FIG. 45, with the PPW displays 320 loaded and the load door closed, an operator engages a production cycle of the autofeeder by pressing a "reset" button, followed by a "start" button. The loaded stack of PPWs will then be automatically pushed from the "load" side (x) of the autofeeder to the "staged" side (y) of the autofeeder by the autofeeder push plate assembly 403 shown in FIG. 4. In an embodiment, the "reset" button may be yellow and the "start" button may be green. In another embodiment, the "reset" and "start" button are disposed on the external control box of the ADAM. The auto feeder doesn't have any buttons or operator controls. There is a control panel that houses terminals and solenoid manifolds (behind the right infeed guide) which is not shown in the FIGs. The ADAM cabinet feeds power and logic from 566 to the auto feed system through a 24 wire quick connect cable. This cable houses the two motor controls, four solenoid valves, and input/output for four photo eyes. There is also a ¼ air line that connects the ADAM air supply to the auto feed. In the main air truncation there is a three way fitting that creates a branch for powering the auto feed, still using the emergency air purging from the ADAM air system that is equipped as per FIG. 41. In an embodiment, the auto feed trunk branch has a ¼ quick connect fitting, and the auto feeder has a receiving ¼ quick connect fitting on the same panel as its electrical components. In an embodiment, there is a 24 wire electrical cable and a double ended ¼ inch quick connect air line that connect the ADAM to the auto feeder.

Next, as illustrated in FIG. 45 and FIG. 46, the staged stack of PPW displays is raised from an initial height ($h_1$) to a raised pickup height ($h_2$). Referring now to FIG. 4, it is the $Z_1$ and $Z_2$ lift paddle assemblies, 304(*a*) and 304(*b*), of the autofeeder which raise the PPW displays from the initial height $h_1$ to the raised pickup height $h_2$. The PPW injector mechanism of the autofeeder (see PPW injector mechanism 306 in FIG. 4) picks up the top PPW display 320 from the stack of PPW displays for insertion into the ADAM machine. The PPW injector mechanism is pneumatic. In an embodiment, it uses four (4) 4-inch pistons with vacuum cups attached via a custom rod end manifold. The pistons extend from a mounting plate that is affixed to a linear guide bearing and pneumatic piston rod end. After the PPW pickup pistons have reached down and grabbed the top display, then retracted, the PPW injector piston is actuated therein injecting the PPW display via linear guide rail into the ADAM.

Referring now to FIG. 47, the autofeeder 310 inserts a top PPW display into ADAM 350. For purposes of clarity of the system components, the PPW display is not depicted in FIG. 47 itself, but can be seen in FIGS. 44 to 46. The ADAM machine 350 receives the single PPW display from the autofeeder and transports it with conveyor rollers 312 to the folding staged position as shown in FIG. 48. The bottom side of the display 320(*a*) is the first end of the display that is inserted into the conveyor rollers and the top side of the display 320(*b*) is the opposite side of the display which enters the conveyor rollers last. In various embodiments, conveyor rollers in FIG. 48 are the same as the conveyor rollers 312 of the in-feed conveyor assembly 760 in FIG. 7, the in-feed conveyor assembly 900 illustrated in FIG. 9, and/or the in-feed conveyor assembly 860 detailed above regarding FIG. 17.

Referring back to FIG. 7, the ADAM uses the in-feed conveyor assembly 760, drive roller assembly 702, and conveyor roller assembly 719 to pull the folded PPW display from the autofeeder into the ADAM. As the PPW moves along the conveyor, it passes the in-feed photo-eye 738, which confirms the presence and position of the display. The PPW display is moved into a "staging" position which is reached when the PPW is stopped against the injector bottom stop gate by the injector bottom stop assembly 716. In an embodiment, the staged photo-eye verifies that the display is now in the correct staging position. A second check by the in-feed photo eye 738 ensures that the PPW display is properly staged and ready for the next operation.

Referring now to FIG. 49, the ADAM will use several components, including in-feed conveyor rollers 312, an erector assembly (not referenced in FIG. 49, but detailed above regarding FIGS. 17 through 19), a bottom suction assembly (not shown in FIG. 48, but detailed above regarding FIGS. 14 and 15), an injector assembly (not shown in FIG. 48, but detailed above regarding FIGS. 11 through 13), and an ejector assembly generally indicated as 390 (and further detailed above regarding FIG. 30) to erect and square the PPW display to prepare for the folding actions of the ADAM machine. Also shown in FIG. 49 are back striker assemblies 362, as further described in later figures.

Referencing FIG. 17, in an embodiment, before the PPW display is erected, the injector assembly 815 pushes the PPW display sideways against a squaring bar 818 to ensure that it is correctly aligned (in FIG. 17, injector assembly 715 pushes the PPW display against squaring bar 718).

After injection and alignment, the ADAM grabs and erects the display. Referring to FIG. 8, bottom suction assemblies 814 (see also bottom suction assemblies 714 in FIG. 7), rise to grip the back face of the display 320(*d*). At the same time, the erector assembly 880, moves over and down 90 degrees to grab the side of the PPW. Looking at FIG. 18, the erector assembly 1800 uses the multiple suction cups 889 mounted along the erector suction beam 884 to grab the side of the PPW. The bottom suction cups of the bottom suction assemblies retract to hold the PPW securely against the conveyor rollers to prevent the back of the display from lifting off the bed. Then, the erector beam 870 in FIG. 17 (or 884 in FIG. 18), which is also called the side action assembly beam, rotates the display 90 degrees, transforming the PPW display from a flattened display into a rectangular, erected display. FIG. 49 depicts the PPW display 320 in an erected state, whereas FIG. 48 illustrates the single display in a flattened, un-erected state.

In an embodiment, the erect-check photo-eye 861 (also called the orientation photo-eye) determines if the PPW has successfully erected into the correct orientation. It checks whether the display is upright (by detecting a solid panel) or upside down (by detecting no panel or incomplete opening). If the display is correctly oriented, the ejector assembly squares the display by compressing the erected display against the injector stop gate from an upper right corner.

Referring to FIG. 50, the main actuator assembly 330 (see above description regarding FIGS. 20, 21, 31, and 32) and head actuator assembly 340 (see above description regarding FIGS. 31, 33, and 34) descend from their initial positions, capturing the front face 320(*c*) of the display 320 with suction cups 342 disposed in a number of head beam assemblies. These head beam assemblies correspond to front shelves that will be formed by the folding of the display front face 320(*c*). In an embodiment, suction cups 342 are the same as the suction cups 415 in the head beam sub-assemblies 414 in FIG. 31, and/or suction cups 446 in the head beam sub-assemblies illustrated by FIG. 34.

Then, as generally shown in FIG. 50, the head actuator assembly 340 ascends with the front shelf portions suctioned to the head beam sub-assemblies, while simultaneously, side strikers 344 are used to collapse left and right side gussets 320(*e*) of the front shelf portions, and the vacuum of the head beam sub-assemblies releases, forming the front shelves.

In an embodiment, side strikers 344 are the same as the side striker assembly 2700 in FIG. 27. In another embodiment, the side strikers 344 are the same as side striker assembly 927 shown in FIG. 23. The side strikers are part of the pneumatic distribution assembly and are powered by pressurized air. In an embodiment, the side strikers use a 4-inch ¾ bore pneumatic cushioned dual acting front mounted piston.

Then, as shown in FIG. 51, the head actuator assembly descends such that head beam sub-assemblies 350 disposed on an underside of head center beam 341 descend into display face 320(*c*) at front shelf areas forcing the front shelves down and into position. In an embodiment, at this point flippers in the side action assemblies of the erector assembly are used to push shelf support rails down and under the shelf rails of each front shelf. Referring to FIG. 24 which illustrates a side action assembly (of which there are four right side action assemblies and four left side action assemblies), flipper stroke piston 932 actuates, using flipper 936 to push down on the corresponding shelf support rail. After the stroke is completed, flipper 936 rotates via piston rotary piston 934, to flip the shelf support rail under the shelf rail and hold it in place for the tab striker action. In an embodiment, flipper 936 performs three key functions: (i) forming the shelf support rail through linear actuation; (ii) folding the shelf support rail via rotary actuation; and (iii) acting as a backer during the tab striker operation to support the front shelf and prevent the flimsy cardboard from collapsing during the tab strike. The flippers are utilized for both tab striking operations: (1) for latching the front shelf to the shelf support rail, and (2) for securing the back shelf to the front shelf via thumb tabs.

Next, tab strikers in the head beam assemblies 350 actuate to press the front shelves into locking tabs 358 of the corresponding shelf support rail causing the front shelves to latch and preventing the front shelves from rebounding. Referring to FIG. 35, tab striker 470 would actuate to press the front shelf into the shelf support rail locking tabs, the flippers then release their hold on the shelf support rails by rotating back to their “A” (“starting”) position. When the flipper rotates back to “A”, that allows the shelf support rail to use the memory of the cardboard and spring back in the direction of the retracting flippers. The shelf support rails locking tabs (locked from the 470 tab striker being fired by 468 piston) prevent the shelf support rail from retracting. Tab striker 470 then retracts allowing the front shelf to utilize the same spring back memory in the cardboard of the front shelf. Tension from the shelf support rail spring back, and the front shelf springs back, while both components are interlocked through the locking tabs and receiving tab holes, which allows for the final formation of the front shelf assembly. Finally, the head actuator assembly retracts from the display as illustrated in FIG. 52.

Once the head actuator assembly is raised, back strikers 361 located in a number of back striker assemblies 360 corresponding to each of the front shelves, push back shelves in the back face of the display 320(*d*) corresponding to each of the front shelves upward and towards the latched front selves. In an embodiment, back striker 361 may be the same as back striker 544 in FIG. 37. Then, the back strikers hold the back shelves in place for the next operation.

Next, as generally shown in FIG. 53, the lower head assembly including the center beam 341 descends toward the display and captures the back shelf portions, preventing them from falling back down while the back strikers 361 retract. Tab strikers in the head beam sub-assemblies 350 actuate, pressing thumbs tabs 371 of the display. Each thumb tab 371 is acted upon by tab striker head 470 driven by tab striker piston 468 (as shown in FIG. 52) of the back shelves into the receiving hold of the corresponding front shelves. Bottom suction assemblies 375 use suction to grab and hold the display while the tab strikers, head actuator assembly 330, and flippers, retract. In an embodiment, bottom suction assemblies 375 are the same as bottom suction assembly 1400 in FIG. 14 and/or bottom suction assembly 1500 in FIG. 15.

Finally, as illustrated in FIG. 54, the main actuator assembly 330 retracts from the display and the ejector assembly 390 actuates while the conveyer rollers run, effectively discharging an assembled PPW display from the ADAM machine.

As mentioned above, the disclosed system including the ADAM machine comprises multiple components and assemblies interacting with each other to perform the receiving, erecting, folding, and discharging operations set forth herein.

In an embodiment of the disclosure, if a “not fully erected” display is detected by the erect-check/orientation photo-eye, the system resets the display back into the staging position and repeats the squaring and erecting process. If the display still fails to erect fully or is detected as upside down (both conditions are recognized by the same erect-check/orientation photo-eye), the system enters a fault mode, triggers an alarm, and emergency stops, awaiting operator intervention.

CONCLUSION

Different examples and aspects of the systems and methods are disclosed herein that include a variety of components, features, and functionality. It should be understood that the various examples and aspects of the systems and methods disclosed herein may include any of the components, features, and functionality of any of the other examples and aspects of the systems and methods disclosed herein in any combination, and all of such possibilities are intended to be within the spirit and scope of the present disclosure.

Many modifications and other examples of the disclosure set forth herein will come to mind to one of ordinary skill in the art to which the disclosure pertains having the benefit of the teachings presented in the foregoing descriptions and the associated drawings.

What is claimed is:

1. A method for folding displays using an Automatic Display Assembly Machine (“ADAM”), the method comprising:
- inserting a Pre-Packaged Weekender (“PPW”) display into the ADAM for assembly;
- receiving, using an in-feed conveyor of the ADAM, the PPW display and transporting it with conveyor rollers to a folding staged position;
- squaring, using an injector assembly, the PPW display for erecting;
- erecting, using an erector assembly comprising a side action beam and a bottom suction assembly, the PPW display to form a rectangular, erected PPW display,
  - wherein the side action beam is a lateral beam comprising a number of suction cup rail assemblies disposed along a length thereof, and
  - wherein the side action beam actuates 90 degrees and uses the number of suction cup rail assemblies to grab and erect the PPW display;
- lowering a main actuator assembly and a head actuator assembly of the ADAM toward the erected PPW display;
- capturing, using a number of suction cups of a number of head beam assemblies disposed on a downward facing surface of a center head beam of the head actuator assembly, a first face of the erected PPW display,
  - wherein the first face of the erected PPW display comprises a number of front shelves corresponding to a number of back shelves disposed on a second face of the erected PPW display, and wherein each front shelf of the number of front shelves corresponds to one of the number of head beam assemblies;

lifting, using the head beam assemblies, the number of front shelves of the erected PPW display, and collapsing, using side strikers of side action assemblies, left and right side-gussets of the number of front shelves, wherein the side action assemblies comprise flippers, flipper rotary pistons, and flipper stroke pistons;

releasing, by removing suction from the number of suction cups of the number of head beam assemblies, the first face of the erected PPW display;

holding, by lowering the head actuator assembly, the number of front shelves into place;

forming and folding, using the flippers of the side action assemblies, shelf support rails corresponding to the number of front shelves;

pressing, using tab strikers of the head beam assemblies, the number of front shelves into receiving pockets of the corresponding shelf support rails, to form latched front shelves;

pushing, using back strikers of a number of back striker assemblies, the number of back shelves towards the number of front shelves;

lowering, using the head actuator assembly, the number of head beam assemblies toward the back striker assemblies;

retracting the back striker assemblies while using the head beam assemblies to capture the back shelves and prevent them from lowering;

locking the back shelves into the front shelves by actuating the tab strikers to press a thumb tab connected to each back shelf into a receiving hold of the corresponding front shelf while using the flippers to hold the front shelves in place;

holding, using the bottom suction assembly, the PPW display while retracting the tab strikers and the center head beam of the head actuator assembly along with the flippers, creating an assembled PPW display; and discharging the assembled PPW display.

2. The method of claim 1, wherein the PPW display is a first PPW display of a number of PPW displays, and wherein the PPW display is inserted into the ADAM using an autofeeder the method further comprising:

loading the number of PPW displays into the autofeeder at a first height;

engaging the autofeeder to move the number of PPW displays from a load side to a staged side of the autofeeder; and raising, using the autofeeder, the number of PPW displays from the first height to a second height.

3. The method of claim 2, wherein the first PPW display is inserted into the ADAM using a PPW injector mechanism of the autofeeder.

4. The method of claim 2, wherein the engaging of the autofeeder to move the number of PPW displays from the load side to the staged side of the autofeeder comprises:

resetting the autofeeder; and starting a production cycle of the autofeeder, wherein the production cycle comprises:

pushing the number of PPW displays from the load side to the stage side of the autofeeder, and raising the number of PPW displays from the first height to the second height using a number of lift paddle assemblies.

5. The method of claim 2, further comprising:

inserting, using a PPW injector mechanism of the autofeeder, a second PPW display into the ADAM machine for assembly; and receiving, using the ADAM machine, the second PPW display from the auto feeder and transporting it with the conveyor rollers to the folding staged position.

6. The method of claim 1, wherein the lifting of the front shelves of the erected PPW display and the collapsing of the left and right side-gussets of the front shelf occur simultaneously.

7. The method of claim 1, wherein the latched front shelves are further formed by:

forcing the front shelves down;

pushing, using the flippers, a shelf support rail down and under a shelf rail of each of the front shelves;

pressing, using the tab strikers, the front shelves onto locking tabs of the shelf support rails; and retracting the center head beam from the erected PPW display.

8. The method of claim 1, wherein the discharging of the assembled PPW comprises:

retracting the main actuator assembly; and actuating an ejector assembly while the conveyor runs.

9. The method of claim 1, further comprising performing, while the PPW display is moving along the conveyor rollers and using an in-feed photo-eye, an initial positioning check of the PPW display to verify a presence and position of the PPW display prior to the squaring and the erecting.

10. The method of claim 9, further comprising staging, using the erector assembly, the PPW display prior to erecting and squaring, wherein the staging comprises:

stopping movement of the PPW display along the conveyor rollers using a stop gate to halt its forward movement;

verifying that the PPW display is in the folding staged position using a staging photo-eye; and performing a second positioning check using the in-feed photo-eye to confirm the PPW display position.

11. The method of claim 10, further comprising pushing, using an injector mechanism of the injector assembly, the PPW display against a squaring bar to align prior to erecting.

12. The method of claim 1, wherein the squaring of the PPW display comprises shifting, using the injector assembly, the PPW display over to a squaring bar to prepare for erecting.

13. The method of claim 12, wherein the erecting further comprises:

raising the bottom suction assembly to grip the second face of the PPW display with a number of bottom suction cups;

moving the erector assembly over and down to grab a side of the PPW display using vacuum cups from the number of suction cup rail assemblies;

retracting the number of bottom suction cups to hold the PPW display against the conveyor rollers and prevent the PPW display from lifting off the conveyor rollers; and rotating the side action beam of the erector assembly, transforming the PPW display into the erected PPW display.

14. The method of claim 13, further comprising:

verifying, using an erect-check photo-eye, that the erected PPW display is in an erect position, wherein if the erect-check photo-eye detects a solid panel, the erected PPW display is fully erect, and wherein if the erect-check photo-eye detects no panel or an incomplete opening, the erected PPW display is not fully erect.

15. The method of claim 13, further comprising:

releasing the vacuum cups from the side of the PPW display; and pushing, using the ejector mechanism, the erected PPW display at an upper right corner so that it compresses against a stop gate to form a squared, erected PPW display.

16. The method of claim 1, wherein the forming and folding of the shelf support rails comprises:

actuating the flipper stroke pistons of the side action assemblies to cause the flippers to push down on a number of support rail portions corresponding to the number of front shelves; and rotating the flippers via the flipper rotary pistons, to flip the number of support rail portions under the corresponding shelf rails and hold them in place during the actuating of the tab strikers.

* * * * *